US008321306B2

(12) United States Patent
Cirpus et al.

(10) Patent No.: US 8,321,306 B2
(45) Date of Patent: Nov. 27, 2012

(54) ARCHITECTURAL DESIGN FOR SELLING PROJECT-BASED SERVICES APPLICATION SOFTWARE

(75) Inventors: Vytas Cirpus, Waldsee (DE); Otfried Von Geisau, Sinsheim (DE); Volker Faisst, Ilvesheim (DE)

(73) Assignee: SAP AG, Walldorf (DE)

( * ) Notice: Subject to any disclaimer, the term of this patent is extended or adjusted under 35 U.S.C. 154(b) by 615 days.

(21) Appl. No.: 12/327,590

(22) Filed: Dec. 3, 2008

(65) Prior Publication Data

US 2010/0138269 A1 Jun. 3, 2010

(51) Int. Cl.
  G06Q 10/00 (2012.01)
  G06F 15/02 (2006.01)
(52) U.S. Cl. .............................. 705/28; 705/9
(58) Field of Classification Search ...................... 705/28
  See application file for complete search history.

(56) References Cited

U.S. PATENT DOCUMENTS

| | | |
|---|---|---|
| 4,947,321 A | 8/1990 | Spence et al. |
| 5,550,734 A | 8/1996 | Tarter et al. |
| 5,560,005 A | 9/1996 | Hoover et al. |
| 5,586,312 A | 12/1996 | Johnson et al. |
| 5,632,022 A | 5/1997 | Warren et al. |
| 5,634,127 A | 5/1997 | Cloud et al. |
| 5,680,619 A | 10/1997 | Gudmundson et al. |
| 5,704,044 A | 12/1997 | Tarter et al. |
| 5,710,917 A | 1/1998 | Musa et al. |
| 5,768,119 A | 6/1998 | Havekost et al. |
| 5,822,585 A | 10/1998 | Noble et al. |
| 5,832,218 A | 11/1998 | Gibbs et al. |
| 5,848,291 A | 12/1998 | Milne et al. |
| 5,867,495 A | 2/1999 | Elliott et al. |
| 5,881,230 A | 3/1999 | Christensen et al. |
| 5,893,106 A | 4/1999 | Brobst et al. |
| 5,918,219 A | 6/1999 | Isherwood |
| 5,987,247 A | 11/1999 | Lau |
| H1830 H | 1/2000 | Petrimoulx et al. |
| 6,028,997 A | 2/2000 | Leymann et al. |
| 6,038,393 A | 3/2000 | Iyengar et al. |
| 6,049,838 A | 4/2000 | Miller et al. |
| 6,070,197 A | 5/2000 | Cobb et al. |
| 6,151,582 A | 11/2000 | Huang et al. |

(Continued)

FOREIGN PATENT DOCUMENTS

WO WO 2004/083984 9/2004

(Continued)

OTHER PUBLICATIONS

"Navigational Interface for ERP System", WO 00/23874, Apr. 27, 2000, to Rush, Gary W. et al.*

(Continued)

Primary Examiner — Garcia Ade
(74) Attorney, Agent, or Firm — Fish & Richardson P.C.

(57) ABSTRACT

Methods, systems, and apparatus, including computer program products, for implementing a software architecture design for a software application implementing the selling of project-based services are disclosed. The application is structured as multiple process components interacting with each other through service interfaces, and multiple service operations, each being implemented for a respective process component. The process components include a Project Processing process component that supports the management of projects, a Supplier Invoice Processing process component that manages supplier invoices, an Accounting process component that records relevant business transactions, a Customer Invoice Processing process component that manages customer invoices, and a Goods and Service Acknowledgement process component that receives a confirmation from an employee of goods received or services rendered.

22 Claims, 48 Drawing Sheets

U.S. PATENT DOCUMENTS

| | | |
|---|---|---|
| 6,167,563 A | 12/2000 | Fontana et al. |
| 6,167,564 A | 12/2000 | Fontana et al. |
| 6,177,932 B1 | 1/2001 | Galdes et al. |
| 6,182,133 B1 | 1/2001 | Horvitz |
| 6,208,345 B1 | 3/2001 | Sheard et al. |
| 6,237,136 B1 | 5/2001 | Sadhiro |
| 6,272,672 B1 | 8/2001 | Conway |
| 6,311,170 B1 | 10/2001 | Embrey |
| 6,338,097 B1 | 1/2002 | Krenzke et al. |
| 6,424,991 B1 | 7/2002 | Gish |
| 6,434,740 B1 | 8/2002 | Monday et al. |
| 6,442,748 B1 | 8/2002 | Bowman-Amuah |
| 6,445,782 B1 | 9/2002 | Elfe et al. |
| 6,446,045 B1 | 9/2002 | Stone et al. |
| 6,446,092 B1 | 9/2002 | Sutter |
| 6,473,794 B1 | 10/2002 | Guheen et al. |
| 6,493,716 B1 | 12/2002 | Azagury et al. |
| 6,571,220 B1 | 5/2003 | Ogino et al. |
| 6,594,535 B1 | 7/2003 | Costanza |
| 6,601,233 B1 | 7/2003 | Underwood |
| 6,601,234 B1 | 7/2003 | Bowman-Amuah |
| 6,606,744 B1 | 8/2003 | Mikurak |
| 6,609,100 B2 | 8/2003 | Smith et al. |
| 6,671,673 B1 | 12/2003 | Baseman et al. |
| 6,678,882 B1 | 1/2004 | Hurley et al. |
| 6,687,734 B1 | 2/2004 | Sellink et al. |
| 6,691,151 B1 | 2/2004 | Cheyer et al. |
| 6,721,783 B1 | 4/2004 | Blossman et al. |
| 6,738,964 B1 | 5/2004 | Zink et al. |
| 6,747,679 B1 | 6/2004 | Finch et al. |
| 6,750,885 B1 | 6/2004 | Finch et al. |
| 6,764,009 B2 | 7/2004 | Melick et al. |
| 6,772,216 B1 | 8/2004 | Ankireddipally et al. |
| 6,789,252 B1 | 9/2004 | Burke et al. |
| 6,845,499 B2 | 1/2005 | Srivastava et al. |
| 6,847,854 B2 | 1/2005 | Discenzo |
| 6,859,931 B1 | 2/2005 | Cheyer et al. |
| 6,889,197 B2 | 5/2005 | Lidow |
| 6,889,375 B1 | 5/2005 | Chan et al. |
| 6,895,438 B1 | 5/2005 | Ulrich |
| 6,898,783 B1 | 5/2005 | Gupta et al. |
| 6,904,399 B2 | 6/2005 | Cooper et al. |
| 6,907,395 B1 | 6/2005 | Hunt et al. |
| 6,954,736 B2 | 10/2005 | Menninger et al. |
| 6,985,939 B2 | 1/2006 | Fletcher et al. |
| 6,990,466 B1 | 1/2006 | Hu |
| 7,003,474 B2 | 2/2006 | Lidow |
| 7,031,998 B2 | 4/2006 | Archbold |
| 7,043,448 B2 | 5/2006 | Campbell |
| 7,047,518 B2 | 5/2006 | Little et al. |
| 7,050,056 B2 | 5/2006 | Meyringer |
| 7,050,873 B1 | 5/2006 | Discenzo |
| 7,055,136 B2 | 5/2006 | Dzoba et al. |
| 7,058,587 B1 | 6/2006 | Horne |
| 7,069,536 B2 | 6/2006 | Yaung |
| 7,072,855 B1 | 7/2006 | Godlewski et al. |
| 7,076,766 B2 | 7/2006 | Wirts et al. |
| 7,117,447 B2 | 10/2006 | Cobb et al. |
| 7,120,597 B1 | 10/2006 | Knudtzon et al. |
| 7,120,896 B2 | 10/2006 | Budhiraja et al. |
| 7,131,069 B1 | 10/2006 | Rush et al. |
| 7,155,403 B2 | 12/2006 | Cirulli et al. |
| 7,155,409 B1 | 12/2006 | Stroh |
| 7,181,694 B2 | 2/2007 | Reiss et al. |
| 7,184,964 B2 | 2/2007 | Wang |
| 7,194,431 B1 | 3/2007 | Land et al. |
| 7,197,740 B2 | 3/2007 | Beringer et al. |
| 7,200,569 B2 | 4/2007 | Gallagher et al. |
| 7,206,768 B1 | 4/2007 | deGroeve et al. |
| 7,216,091 B1 | 5/2007 | Blandina et al. |
| 7,219,107 B2 | 5/2007 | Beringer |
| 7,222,786 B2 | 5/2007 | Renz et al. |
| 7,225,240 B1 | 5/2007 | Fox et al. |
| 7,249,044 B2 | 7/2007 | Kumar et al. |
| 7,257,254 B2 | 8/2007 | Tunney |
| 7,283,973 B1 | 10/2007 | Loghmani et al. |
| 7,293,254 B2 | 11/2007 | Bloesch et al. |
| 7,299,970 B1 | 11/2007 | Ching |
| 7,315,830 B1 | 1/2008 | Wirtz et al. |
| 7,322,024 B2 | 1/2008 | Carlson et al. |
| 7,324,966 B2 | 1/2008 | Scheer |
| 7,353,180 B1 | 4/2008 | Silverstone et al. |
| 7,356,492 B2 | 4/2008 | Hazi et al. |
| 7,367,011 B2 | 4/2008 | Ramsey et al. |
| 7,370,315 B1 | 5/2008 | Lovell et al. |
| 7,376,601 B1 | 5/2008 | Aldridge |
| 7,376,604 B1 | 5/2008 | Butcher |
| 7,376,632 B1 | 5/2008 | Sadek et al. |
| 7,383,201 B2 | 6/2008 | Matsuzaki et al. |
| 7,386,833 B2 | 6/2008 | Granny et al. |
| 7,406,716 B2 | 7/2008 | Kanamori et al. |
| 7,415,697 B1 | 8/2008 | Houlding |
| 7,418,409 B1 | 8/2008 | Goel |
| 7,418,424 B2 | 8/2008 | Martin et al. |
| 7,448,022 B1 | 11/2008 | Ram et al. |
| 7,451,432 B2 | 11/2008 | Shukla et al. |
| 7,460,654 B1 | 12/2008 | Jenkins et al. |
| 7,461,030 B2 | 12/2008 | Hibler et al. |
| 7,469,233 B2 | 12/2008 | Shooks et al. |
| 7,516,088 B2 | 4/2009 | Johnson et al. |
| 7,523,054 B2 | 4/2009 | Tyson-Quah |
| 7,529,699 B2 | 5/2009 | Fuse et al. |
| 7,536,325 B2 | 5/2009 | Randell et al. |
| 7,536,354 B1 | 5/2009 | deGroeve et al. |
| 7,546,520 B2 | 6/2009 | Davidson et al. |
| 7,546,575 B1 | 6/2009 | Dillman et al. |
| 7,565,640 B2 | 7/2009 | Shukla et al. |
| 7,624,371 B2 | 11/2009 | Kulkarni et al. |
| 7,631,291 B2 | 12/2009 | Shukla et al. |
| 7,640,195 B2 | 12/2009 | Von Zimmermann et al. |
| 7,640,291 B2 | 12/2009 | Maturana et al. |
| 7,644,390 B2 | 1/2010 | Khodabandehloo et al. |
| 7,657,406 B2 | 2/2010 | Tolone et al. |
| 7,657,445 B1 | 2/2010 | Goux |
| 7,665,083 B2 | 2/2010 | Demant et al. |
| 7,668,761 B2 | 2/2010 | Jenkins et al. |
| 7,672,888 B2 | 3/2010 | Allin et al. |
| 7,681,176 B2 | 3/2010 | Wills et al. |
| 7,693,586 B2 | 4/2010 | Dumas et al. |
| 7,703,073 B2 | 4/2010 | Illowsky et al. |
| 7,739,160 B1 | 6/2010 | Ryan et al. |
| 7,742,985 B1 | 6/2010 | Digrigoli et al. |
| 7,747,980 B2 | 6/2010 | Illowsky et al. |
| 7,765,156 B2 | 7/2010 | Staniar et al. |
| 7,765,521 B2 | 7/2010 | Bryant |
| 7,788,145 B2 | 8/2010 | Wadawadigi et al. |
| 7,788,319 B2 | 8/2010 | Schmidt |
| 7,793,256 B2 | 9/2010 | Charisius et al. |
| 7,793,258 B2 | 9/2010 | Sundararajan et al. |
| 7,797,698 B2 | 9/2010 | Diament et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,886,041 B2 | 2/2011 | Outhred et al. |
| 7,895,568 B1 | 2/2011 | Goodwin et al. |
| 7,904,350 B2 | 3/2011 | Ayala et al. |
| 7,912,755 B2 | 3/2011 | Perry et al. |
| 7,917,889 B2 | 3/2011 | Devarakonda et al. |
| 7,925,985 B2 | 4/2011 | Moore |
| 8,001,519 B2 | 8/2011 | Conallen et al. |
| 2001/0052108 A1 | 12/2001 | Bowman-Amuah |
| 2002/0026394 A1* | 2/2002 | Savage et al. .................. 705/34 |
| 2002/0042756 A1 | 4/2002 | Kumar et al. |
| 2002/0049622 A1* | 4/2002 | Lettich et al. .................... 705/7 |
| 2002/0073114 A1* | 6/2002 | Nicastro et al. ............... 707/500 |
| 2002/0078046 A1 | 6/2002 | Uluakar et al. |
| 2002/0082892 A1 | 6/2002 | Raffel et al. |
| 2002/0103660 A1* | 8/2002 | Cramon et al. ................... 705/1 |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1* | 9/2002 | Cirulli et al. ..................... 705/1 |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |

| | | | | | | |
|---|---|---|---|---|---|---|
| 2002/0184111 A1* | 12/2002 | Swanson ............. 705/26 | | 2006/0143029 A1 | 6/2006 | Akbay et al. |
| 2002/0188486 A1 | 12/2002 | Gil et al. | | 2006/0206352 A1 | 9/2006 | Pulianda |
| 2002/0198798 A1 | 12/2002 | Ludwig et al. | | 2006/0248504 A1 | 11/2006 | Hughes |
| 2002/0198828 A1 | 12/2002 | Ludwig et al. | | 2006/0274720 A1 | 12/2006 | Adams et al. |
| 2003/0009754 A1 | 1/2003 | Rowley et al. | | 2006/0287939 A1 | 12/2006 | Harel et al. |
| 2003/0069774 A1 | 4/2003 | Hoffman et al. | | 2006/0288350 A1 | 12/2006 | Grigorovitch et al. |
| 2003/0074271 A1 | 4/2003 | Viswanath et al. | | 2007/0011650 A1 | 1/2007 | Hage et al. |
| 2003/0074360 A1 | 4/2003 | Chen et al. | | 2007/0075916 A1 | 4/2007 | Bump et al. |
| 2003/0083762 A1 | 5/2003 | Farrah et al. | | 2007/0094098 A1 | 4/2007 | Mayer et al. |
| 2003/0084127 A1 | 5/2003 | Budhiraja et al. | | 2007/0094261 A1 | 4/2007 | Phelan et al. |
| 2003/0130860 A1 | 7/2003 | Datta et al. | | 2007/0129964 A1 | 6/2007 | Helmolt et al. |
| 2003/0182206 A1 | 9/2003 | Hendrix et al. | | 2007/0129984 A1 | 6/2007 | von Helmolt et al. |
| 2003/0212602 A1 | 11/2003 | Schaller | | 2007/0129985 A1 | 6/2007 | Helmolt et al. |
| 2003/0233290 A1 | 12/2003 | Yang et al. | | 2007/0143164 A1 | 6/2007 | Kaila et al. |
| 2004/0015367 A1 | 1/2004 | Nicastro et al. | | 2007/0150332 A1 | 6/2007 | Grichnik et al. |
| 2004/0034578 A1 | 2/2004 | Oney et al. | | 2007/0150387 A1* | 6/2007 | Seubert et al. ........... 705/31 |
| 2004/0093268 A1 | 5/2004 | Ramchandani et al. | | 2007/0150855 A1 | 6/2007 | Jeong |
| 2004/0111304 A1 | 6/2004 | Meka et al. | | 2007/0156430 A1 | 7/2007 | Kaetker et al. |
| 2004/0111639 A1 | 6/2004 | Schwartz et al. | | 2007/0156474 A1 | 7/2007 | Scherberger et al. |
| 2004/0128180 A1 | 7/2004 | Abel et al. | | 2007/0156475 A1 | 7/2007 | Berger et al. |
| 2004/0133481 A1 | 7/2004 | Schwarze et al. | | 2007/0156476 A1* | 7/2007 | Koegler et al. ............ 705/7 |
| 2004/0153359 A1 | 8/2004 | Ho et al. | | 2007/0156482 A1 | 7/2007 | Bagheri |
| 2004/0158506 A1 | 8/2004 | Wille | | 2007/0156489 A1 | 7/2007 | Berger et al. |
| 2004/0172510 A1 | 9/2004 | Nagashima et al. | | 2007/0156493 A1 | 7/2007 | Tebbe et al. |
| 2004/0181470 A1 | 9/2004 | Grounds | | 2007/0156499 A1* | 7/2007 | Berger et al. ............ 705/9 |
| 2004/0181538 A1 | 9/2004 | Lo et al. | | 2007/0156500 A1 | 7/2007 | Merkel et al. |
| 2004/0205011 A1 | 10/2004 | Northington et al. | | 2007/0156538 A1 | 7/2007 | Peter et al. |
| 2004/0236639 A1 | 11/2004 | Candadai et al. | | 2007/0156550 A1 | 7/2007 | Der Emde et al. |
| 2004/0236687 A1 | 11/2004 | Tyson-Quah | | 2007/0156731 A1 | 7/2007 | Ben-Zeev |
| 2004/0243489 A1 | 12/2004 | Mitchell et al. | | 2007/0162893 A1 | 7/2007 | Kaetker et al. |
| 2004/0254866 A1 | 12/2004 | Crumbach et al. | | 2007/0168303 A1 | 7/2007 | Kaetker et al. |
| 2004/0255152 A1 | 12/2004 | Kanamori et al. | | 2007/0174068 A1 | 7/2007 | Alfandary et al. |
| 2005/0010501 A1 | 1/2005 | Ward, Jr. | | 2007/0174145 A1 | 7/2007 | Hetzer et al. |
| 2005/0033588 A1* | 2/2005 | Ruiz et al. ............ 705/1 | | 2007/0174811 A1 | 7/2007 | Kaetker et al. |
| 2005/0044015 A1 | 2/2005 | Bracken et al. | | 2007/0186209 A1 | 8/2007 | Kaetker et al. |
| 2005/0060235 A2* | 3/2005 | Byrne ................. 705/26 | | 2007/0197877 A1 | 8/2007 | Decorte et al. |
| 2005/0060408 A1 | 3/2005 | McIntyre et al. | | 2007/0198391 A1 | 8/2007 | Dreyer et al. |
| 2005/0065828 A1 | 3/2005 | Kroswek et al. | | 2007/0214065 A1 | 9/2007 | Kahlon et al. |
| 2005/0108680 A1 | 5/2005 | Cheng et al. | | 2007/0220046 A1 | 9/2007 | Kaetker et al. |
| 2005/0113092 A1 | 5/2005 | Coppinger et al. | | 2007/0220143 A1 | 9/2007 | Lund et al. |
| 2005/0114829 A1 | 5/2005 | Robin et al. | | 2007/0233539 A1 | 10/2007 | Suenderhauf et al. |
| 2005/0125310 A1 | 6/2005 | Hazi et al. | | 2007/0233541 A1 | 10/2007 | Schorr et al. |
| 2005/0144125 A1 | 6/2005 | Erbey et al. | | 2007/0233574 A1 | 10/2007 | Koegler et al. |
| 2005/0144226 A1 | 6/2005 | Purewal | | 2007/0233575 A1 | 10/2007 | Berger et al. |
| 2005/0156500 A1 | 7/2005 | Birecki et al. | | 2007/0233598 A1 | 10/2007 | Der Emde et al. |
| 2005/0160104 A1 | 7/2005 | Meera et al. | | 2007/0234282 A1 | 10/2007 | Prigge et al. |
| 2005/0165784 A1 | 7/2005 | Gomez et al. | | 2007/0239508 A1 | 10/2007 | Fazal et al. |
| 2005/0177435 A1 | 8/2005 | Lidow | | 2007/0239569 A1 | 10/2007 | Lucas et al. |
| 2005/0203760 A1 | 9/2005 | Gottumukkala et al. | | 2007/0265862 A1 | 11/2007 | Freund et al. |
| 2005/0203813 A1 | 9/2005 | Welter et al. | | 2008/0004929 A9 | 1/2008 | Raffel et al. |
| 2005/0209732 A1 | 9/2005 | Audimoolam et al. | | 2008/0017722 A1 | 1/2008 | Snyder et al. |
| 2005/0209943 A1 | 9/2005 | Ballow et al. | | 2008/0027831 A1 | 1/2008 | Gerhardt |
| 2005/0216325 A1 | 9/2005 | Ziad et al. | | 2008/0065437 A1 | 3/2008 | Dybvig |
| 2005/0222896 A1 | 10/2005 | Rhyne et al. | | 2008/0120129 A1 | 5/2008 | Seubert et al. |
| 2005/0235020 A1 | 10/2005 | Gabelmann et al. | | 2008/0147507 A1 | 6/2008 | Langhammer |
| 2005/0240592 A1 | 10/2005 | Mamou et al. | | 2008/0162382 A1 | 7/2008 | Clayton et al. |
| 2005/0246250 A1 | 11/2005 | Murray | | 2008/0208707 A1 | 8/2008 | Erbey et al. |
| 2005/0246482 A1 | 11/2005 | Gabelmann et al. | | 2008/0215354 A1 | 9/2008 | Halverson et al. |
| 2005/0256775 A1 | 11/2005 | Schapler et al. | | 2009/0037287 A1 | 2/2009 | Baitalmal et al. |
| 2005/0256882 A1 | 11/2005 | Able et al. | | 2009/0037492 A1 | 2/2009 | Baitalmal et al. |
| 2005/0257125 A1 | 11/2005 | Roesner et al. | | 2009/0063112 A1 | 3/2009 | Hader et al. |
| 2005/0257197 A1 | 11/2005 | Herter et al. | | 2009/0171716 A1 | 7/2009 | Suenderhauf et al. |
| 2005/0262192 A1 | 11/2005 | Mamou et al. | | 2009/0171818 A1 | 7/2009 | Penning et al. |
| 2005/0284934 A1 | 12/2005 | Ernesti et al. | | 2009/0172699 A1 | 7/2009 | Jungkind et al. |
| 2005/0288987 A1 | 12/2005 | Sattler et al. | | 2009/0189743 A1 | 7/2009 | Abraham et al. |
| 2005/0289020 A1 | 12/2005 | Bruns et al. | | 2009/0192858 A1 | 7/2009 | Johnson |
| 2005/0289079 A1 | 12/2005 | Krishan et al. | | 2010/0070324 A1 | 3/2010 | Bock et al. |
| 2006/0004802 A1 | 1/2006 | Phillips et al. | | 2010/0070331 A1 | 3/2010 | Koegler et al. |
| 2006/0053063 A1 | 3/2006 | Nagar | | 2010/0070336 A1 | 3/2010 | Koegler et al. |
| 2006/0064344 A1 | 3/2006 | Lidow | | 2010/0070395 A1 | 3/2010 | Elkeles et al. |
| 2006/0074704 A1 | 4/2006 | Shukla et al. | | 2010/0070555 A1 | 3/2010 | Duparc et al. |
| 2006/0074731 A1 | 4/2006 | Green et al. | | 2010/0100464 A1 | 4/2010 | Ellis et al. |
| 2006/0080338 A1 | 4/2006 | Seubert et al. | | 2010/0138269 A1 | 6/2010 | Cirpus et al. |
| 2006/0085243 A1 | 4/2006 | Cooper et al. | | 2011/0252395 A1 | 10/2011 | Charisius et al. |
| 2006/0085294 A1 | 4/2006 | Boerner et al. | | | | |
| 2006/0085336 A1 | 4/2006 | Seubert et al. | | | | |
| 2006/0089886 A1 | 4/2006 | Wong | | | | |
| 2006/0095439 A1 | 5/2006 | Buchmann et al. | | | | |
| 2006/0129978 A1 | 6/2006 | Abrari et al. | | | | |

FOREIGN PATENT DOCUMENTS

| | | |
|---|---|---|
| WO | WO 2005/114381 | 12/2005 |

OTHER PUBLICATIONS

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

Anon.; "Sequenst Corp Bell Atlantic: Bell Atlantic Selects Sequent for Video-on-Demand Program; Sequent Moves to Sieze Opportunity in New Market"; Business Wire; Dec. 6, 1994.

Anon.; "State of the Art Reports™ 13,000 MAS 90® for WINDOWS® Shipments in First Nine Months of Availability"; PR Newswire; Apr. 28, 1997.

Arch-int, S. et al.; "Development of Industrial Information Systems on the Web Using Busienss Components"; Computers in Industry; vol. 60; 2003; pp. 231-250.

Astudillo, H.; "How Conceptual System Architecture Leads to Business Process"; ACM; 2000; pp. 35-36.

Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.

Avery, S.; "Buyer's Guide to Software for Purchasing 2000.(Directory)"; Purchasing, vol. 129, No. 1; p. 179; Jul. 13, 2000.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.

Fellner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

"Hudson's Bay Company Realizes Fast ROI with the Oracle E-Business Suite"; PR Newswire; New York; Jan. 15, 2002; p. 1.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Linthicum, D.S.; "Chapter 9: RPCs, Messaging, and B2B Application Integration"; B2B Application Integration: E-Business Enable Your Enterprise; 2001; pp. 167-181.

Nori A.K. et al.; "Composite Applications: Process Based Application Development"; Lecture Notes in Computer Science; vol. 2444; Aug. 2003; pp. 48-53.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development"; The Data Base for Advances in Information Systems; 2003; pp. 45-46.

SAP AG; "Designing Cross Solutions"; SAP XAPPS, [online]; Sep. 2003; pp. 1-2; http://www.sap.com/belux/platform/netweaver/pdf/BWP_CAF.pdf.

Schmid, H.A.; "Business Entity Components and Buisness Process Components"; Joop; vol. 12, No. 6; Oct. 1999; pp. 6-10, 12-15.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.

Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.

Thomas, A.; "Enterprise JavaBeans Server Component Model for Java"; [online]; Dec. 1997; http://www.cs.indiana.edu/classes/b649-gann/ejb-white-paper.pdf.

Vergil Technology Ltd.; "Vergil Composite Application Builder Suite"; Product Datasheet [online]; 2003; pp. 1-5; http://www.webservicesmall.com.docs/VCAB_datasheet.pdf.

Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.

International Search Report and Written Opinion of the International Searching Authority issued in International Application No. PCT/EP2006/012625; Apr. 3, 2007; 8 pages.

International Preliminary Report on Patentability issued in International Application No. PCT/EP2006/012625; Jul. 1, 2008; 7 pages.

International Search Report and Written Opinion of the International Searching Authority issued in International Application No. PCT/EP2006/012614; Mar. 16, 2007; 7 pages.

International Preliminary Report on Patentability issued in International Application No. PCT/US2006/012614; Jul. 1, 2008; 6 pages.

International Search Report and Written Opinion of the International Searching Authority issued in International Application No. PCT/EP2006/012618; Apr. 3, 2007; 8 pages.

International Preliminary Report on Patentability issued in International Application No. PCT/EP2006/012618; Jul. 1, 2008; 7 pages.

International Search Report and Written Opinion of the International Searching Authority issued in International Application No. PCT/EP2006/012613; May 3, 2007; 6 pages.

International Preliminary Report on Patentability issued in International Application No. PCT/EP2006/012613; Jul. 1, 2008; 6 pages.

International Search Report and Written Opinion of the International Searching Authority issued in International Application No. PCT/EP2006/012624; Mar. 30, 2007; 9 pages.

International Preliminary Report on Patentability issued in International Application No. PCT/EP2006/012624; Jul. 1, 2008; 8 pages.

International Search Report and Written Opinion of the International Searching Authority issued in International Application No. PCT/EP2006/012623; May 7, 2007; 8 pages.

International Preliminary Report on Patentability issued in International Application No. PCT/EP2006/012623; Jul. 1, 2008; 7 pages.

International Search Report and Written Opinion of the International Searching Authority issued in International Application No. PCT/EP2006/012620; Mar. 21, 2007; 7 pages.

International Preliminary Report on Patentability issued in International Application No. PCT/EP2006/012620; Jul. 1, 2008; 6 pages.

International Search Report and Written Opinion of the International Searching Authority issued in International Application No. PCT/EP2006/012619; Apr. 19, 2007; 8 pages.

International Preliminary Report on Patentability issued in International Application No. PCT/EP2006/012619; Jul. 1, 2008; 7 pages.

International Search Report and Written Opinion of the International Searching Authority issued in International Application No. PCT/EP2006/012621; Apr. 19, 2007; 8 pages.

International Preliminary Report on Patentability issued in International Application No. PCT/EP2006/012621; Jul. 1, 2008; 7 pages.

International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/323,041; Apr. 30, 2009; 26 pages.
Office Action issued in U.S. Appl. No. 11/322,612; May 11, 2009; 24 pages.
Office Action issued in U.S. Appl. No. 11/322,772; Mar. 25, 2009; 12 pages.
Office Action issued in U.S. Appl. No. 11/323,590; Jan. 9, 2009; 23 pages.
Office Action issued in U.S. Appl. No. 11/396,288; Jan. 2, 2009; 18 pages.
Office Action issued in U.S. Appl. No. 11/396,288; Apr. 15, 2008; 26 pages.
Office Action issued in U.S. Appl. No. 11/397,029; Jul. 21, 2009; 28 pages.
Office Action issued in U.S. Appl. No. 11/323,040; Jul. 24, 2009; 35 pages.
Office Action issued in U.S. Appl. No. 11/323,590; Jul. 10, 2009; 32 pages.
Office Action issued in U.S. Appl. No. 11/322,816; Jul. 23, 2006; 41 pages.
Office Action issued in U.S. Appl. No. 11/322,851; Sep. 2, 2009; 32 pages.
Office Action issued in U.S. Appl. No. 11/323,590; Dec. 30, 2009; 31 pages.
Office Action issued in U.S. Appl. No. 11/322,482; Jan. 7, 2010; 19 pages.
Office Action issued in U.S. Appl. No. 11/322,772; Dec. 9, 2009; 14 pages.
Office Action issued in U.S. Appl. No. 11/323,039; Sep. 4, 2009; 36 pages.
Office Action issued in U.S. Appl. No. 11/323,634; Sep. 10, 2009; 15 pages.
Office Action issued in U.S. Appl. No. 11/322,383; Nov. 12, 2009; 29 pages.
Office Action issued in U.S. Appl. No. 11/396,258; Nov. 25, 2009; 9 pages.
Office Action issued in U.S. Appl. No. 12/333,085; Jun. 25, 2009; 9 pages.
Office Action issued in U.S. Appl. No. 11/396,288; Aug. 19, 2009; 20 pages.
"American Software Announces ASP Pricing Model for It's a-Applications Expense Business Solution"; PR Newswire; Mar. 6, 2000; 2 pages.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; "Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.
Lockamy III, et al.; "Linking SCOR Planning Practices to Supply Chain Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Office Action issued in U.S. Appl. No. 11/322,772; Jul. 12, 2010; 18 pages.
Office Action issued in U.S. Appl. No. 11/322,398 on Apr. 2, 2010; 39 pages.
Notice of Allowance issued in U.S. Appl. No. 11/322,398 on Jul. 23, 2010; 38 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.

Notice of Allowance issued in U.S. Appl. No. 11/396,259 on Mar. 29, 2010; 19 pages.
Notice of Allowance issued in U.S. Appl. No. 11/396,259 on Jul. 6, 2010; 6 pages.
Notice of Allowance issued in U.S. Appl. No. 11/396,288; May 20, 2010; 15 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.
Office Action issued in U.S. Appl. No. 11/323,039; Apr. 14, 2010; 15 pages.
Office Action issued in U.S. Appl. No. 11/322,851; May 12, 2010; 15 pages.
Office Action issued in U.S. Appl. No. 11/322,845; Jul. 15, 2010; 16 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Advisory Action issued in U.S. Appl. No. 11/322,612; Jun. 24, 2010; 3 pages.
Notice of Allowance issued in U.S. Appl. No. 11/397,026 on Mar. 29, 2010; 17 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 12/233,554 on May 14, 2010; 11 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Notice of Allowance issued in U.S. Appl. No. 11/967,865 on Mar. 31, 2010; 16 pages.
Notice of Allowance issued in U.S. Appl. No. 11/322,482; Jul. 13, 2010; 5 pages.
Office Action issued in U.S. Appl. No. 11/323,590; Jun. 21, 2010; 25 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Mar. 23, 2010; 5 pages.
Anonymous; "Mastering Management"; Motor Age, vol. 25, No. 10; Oct. 2006; pp. 1-3.
Bin et al.; "Component Model Optimization for Distributed Real-Time Embedded Software"; IEEE International Conference on Systems, Man and Cybernetics; Oct. 13, 2004; 6 pages.
Cascallar, Eduardo et al.; "Assessment in the Evaluation of Self-Regulation as a Process"; Educational Psychology Review; vol. 18, No. 3; Sep. 2006; pp. 297-306.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cool, David W.; "Activity Fund Accounting"; School Business Affairs; vol. 49, No. 6; Jun. 1983; pp. 50-52.
Cox et al.; "A Formal Model for Component Based Software"; IEEE; Aug. 7, 2002; 8 pages.
Ferscha et al.; "A Light-Weight Component Model for Peer-to-Peer Applications"; IEEE; Mar. 23, 2004.
Finin et al.; "KQML as an Agent Communication Language"; retrieved on Jul. 26, 2011; pp. 456-463. <http://portal.acm.org/citation.cfm?id=191322>.
Flissi et al.; "A Component-based Software Infrastructure for Ubiquitous Computing"; IEEE; Jul. 4, 2005.
Gerin et al.; "Flexible and Executable Hardware/Software Interface Modeling for Multiprocessor SOC Design Using SystemC"; IEEE; 2007; pp. 390-395.
Gould; "Integrating the Manufacturing Enterprise"; Automative Design & Production; 119, 1; ABI/INFORM Global; Jan. 2007; 3 pages.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.
Kalakota et al.; "Readings in Electronic Commerce"; Addison-Wesley Longman, Inc.; 1995; ISBN: 0-201-88060-1.
Kremic, Tibor; "Outsourcing Decision Support: A Survey of Benefits, Risks, and Decision Factor"; Supply Chain Management; V. 11; 2006; pp. 467-482.
Orsburn; "Spares Management Handbook"; McGrawHill; 1991; ISBN: 0-8306-7626-0.
Papazoglou et al; "Service-Oriented Computing Research Road Map"; http://infolab.uvt.nl/pub/papazogloump-2006-96.pdf; Mar. 1, 2006; 29 pages.
Sarjoughian et al.; "CoSMOs: A Visual Environment for Component Based Modeling, Experimental Design and Simulation"; ACM; 2009; pp. 1-9.
SAP AG; "SAP NetWeaver Visual Composer: User Guide (SAP NetWeaver Visual Composer release 6.0)"; Document version 1.1; 2004; pp. 1-208.
SAP AG; "Powered by SAP NetWeaver Partner Program—Frequently Asked Questions"; May 2005; 10 pages. [online] http://www.lionbridge.com/NR/rdonlyres/4940BE1F/DA46/412E/AB16/F049BD865CA1/0/PBMWFAQ_50070686_en.pdf.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.
Strelich, Thomas P. et al.; "Simulation-Based Transformation with the Service Integration/Interoperation Infrastructure"; Technology Review Journal; Fall/Winter 2005; pp. 99-115.
Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.
Notice of Allowance issued in U.S. Appl. No. 12/233,554 on Sep. 17, 2010; 10 pages.
Notice of Allowance issued in U.S. Appl. No. 12/233,554 on Feb. 22, 2011; 7 pages.
Notice of Allowance issued in U.S. Appl. No. 12/233,554 on Jun. 27, 2011; 7 pages.
Office Action issued in U.S. Appl. No. 12/233,550 on Jan. 12, 2011; 29 pages.
Notice of Allowance issued in U.S. Appl. No. 12/233,550 on May 11, 2011; 20 pages.
Office Action issued in U.S. Appl. No. 12/333,146 on Sep. 6, 2011; 21 pages.
Office Action issued in U.S. Appl. No. 11/323,634 on Apr. 29, 2011; 8 pages.
Office Action issued in U.S. Appl. No. 11/322,973 on Dec. 7, 2010; 13 pages.
Office Action issued in U.S. Appl. No. 11/322,973 on May 27, 2011; 15 pages.
Notice of Allowance issued in U.S. Appl. No. 11/396,327 on Nov. 30, 2010; 28 pages.
Notice of Allowance issued in U.S. Appl. No. 11/396,327 on Sep. 28, 2011; 31 pages.
Office Action issued in U.S. Appl. No. 11/404,147 on Nov. 24, 2010; 27 pages.

Office Action issued in U.S. Appl. No. 11/404,147 on Aug. 4, 2011; 26 pages.
Office Action issued in U.S. Appl. No. 12/233,479 on Oct. 27, 2011; 24 pages.
Office Action issued in U.S. Appl. No. 12/332,965 on Oct. 11, 2011; 6 pages.
Notice of Allowance issued in U.S. Appl. No. 12/233,462 on Feb. 2, 2011; 11 pages.
Notice of Allowance issued in U.S. Appl. No. 12/233,462 on May 18, 2011; 6 pages.
Notice of Allowance issued in U.S. Appl. No. 12/233,462 on Sep. 2, 2011; 7 pages.
Notice of Allowance in U.S. Appl. No. 12/233,462 on Dec. 12, 2011; 6 pages.
Office Action issued in U.S. Appl. No. 12/233,289 on Oct. 27, 2011; 15 pages.
Office Action issued in U.S. Appl. No. 12/233,457 on May 26, 2011; 19 pages.
Notice of Allowance issued in U.S. Appl. No. 12/233,457 on Nov. 3, 2011; 12 pages.
Office Action issued in U.S. Appl. No. 11/967,483 on Aug. 20, 2010; 10 pages.
Office Action issued in U.S. Appl. No. 11/967,483 on Mar. 4, 2011; 6 pages.
Office Action issued in U.S. Appl. No. 12/327,232 on May 26, 2011; 20 pages.
Notice of Allowance issued in U.S. Appl. No. 12/327,232 on Nov. 2, 2011; 16 pages.
Office Action issued in U.S. Appl. No. 12/327,701 on Nov. 8, 2011; 20 pages.
Notice of Allowance issued in U.S. Appl. No. 12/333,085; Sep. 13, 2010; 8 pages.
Office Action issued in U.S. Appl. No. 12/233,087 on Aug. 18, 2011; 42 pages.
Notice of Allowance issued in U.S. Appl. No. 12/233,534 on Oct. 20, 2010; 15 pages.
Notice of Allowance issued in U.S. Appl. No. 12/233,534 on Jan. 31, 2011; 15 pages..
Notice of Allowance issued in U.S. Appl. No. 12/233,534 on May 16, 2011; 12 pages.
Notice of Allowance issued in U.S. Appl. No. 11/322,382 on Sep. 20, 2010; 6 pages.
Notice of Allowance issued in U.S. Appl. No. 11/322,382 on Jan. 6, 2011; 7 pages.
Notice of Allowance issued in U.S. Appl. No. 11/322,382 on Jul. 25, 2011; 5 pages.
Office Action issued in U.S. Appl. No. 11/396,312 on Sep. 10, 2010; 23 pages.
Office Action issued in U.S. Appl. No. 11/322,611 on Sep. 16, 2010; 21 pages.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowanced issued in U.S. Appl. No. 11/322,398 on May 27, 2011; 21 pages.
Notice of Allowanced issued in U.S. Appl. No. 11/322,398 on Oct. 18, 2011; 7 pages.
Office Action issued in U.S. Appl. No. 11/322,383 on May 12, 2010; 23 pages.
Office Action issued in U.S. Appl. No. 11/322,383 on Nov. 12, 2009; 23 pages.
Office Action issued in U.S. Appl. No. 11/396,236 on Oct. 28, 2010; 19 pages.
Examiner's Answer to Appeal Brief issued in U.S. Appl. No. 11/396,236 on Nov. 10, 2011; 19 pages.
Notice of Allowance issued in U.S. Appl. No. 11/396,259 on Oct. 15, 2010; 6 pages.
Notice of Allowance issued in U.S. Appl. No. 11/396,259 on Jan. 20, 2011; 6 pages.
Notice of Allowance issued in U.S. Appl. No. 11/396,259 on Aug. 5, 2011; 7 pages.
Office Action issued in U.S. Appl. No. 11/396,288 on Oct. 17, 2011; 38 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/396,250 on Dec. 7, 2011; 6 pages.
Notice of Allowance issued in U.S. Appl. No. 11/396,258 on Jul. 28, 2010; 9 pages.
Notice of Allowance issued in U.S. Appl. No. 11/396,258 on Nov. 16, 2010; 8 pages.
Notice of Allowance issued in U.S. Appl. No. 11/396,258 on Jun. 28, 2011; 9 pages.
Office Action issued in U.S. Appl. No. 11/396,252 on Nov. 10, 2011; 18 pages.
Notice of Allowance issued in U.S. Appl. No. 11/322,851 on Sep. 2, 2011; 8 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Notice of Allowance issued in U.S. Appl. No. 11/322,845; Nov. 13, 2011; 9 pages.
Office Action issued in U.S. Appl. No. 11/323,040 on Nov. 5, 2010; 33 pages.
Office Action issued in U.S. Appl. No. 11/323,040 on Jul. 26, 2011; 34 pages.
Office Action issued in U.S. Appl. No. 11/397,026; Jul. 21, 2009; 28 pages.
Notice of Allowance issued in U.S. Appl. No. 11/397,026 on Nov. 15, 2010; 7 pages..
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages.
Notice of Allowance issued in U.S. Appl. No. 11/397,026 on Nov. 4, 2011; 8 pages.
Notice of Allowance issued in U.S. Appl. No. 12/233,520 on Nov. 10, 2011; 22 pages.
Office Action issued in U.S. Appl. No. 12/233,417 on Apr. 7, 2011; 32 pages.
Notice of Allowance issued in U.S. Appl. No. 12/233,417 on Sep. 14, 2011; 11 pages.
Notice of Allowance issued in U.S. Appl. No. 11/968,054 on Sep. 7, 2010; 11 pages.
Notice of Allowance issued in U.S. Appl. No. 11/968,054 on Aug. 2, 2011; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,458 on Oct. 12, 2011; 19 pages.
Office Action issued in U.S. Appl. No. 12/233,557 on Sep. 16, 2010; 16 pages.
Office Action issued in U.S. Appl. No. 11/967,489 on Sep. 28, 2011; 7 pages.
Office Action issued in U.S. Appl. No. 12/233,557 on Mar. 4, 2011; 19 pages.

Office Action issued in U.S. Appl. No. 12/233,489 on May 13, 2011; 15 pages.
Office Action issued in U.S. Appl. No. 11/967,393 on Apr. 15, 2011; 12 pages.
Notice of Allowance issued in U.S. Appl. No. 11/967,393 on Nov. 9, 2011; 9 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Oct. 6, 2010; 6 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
Notice of Allowance issued in U.S. Appl. No. 12/233,550 on Jan. 9, 2012; 11 pages.
Office Action issued in U.S. Appl. No. 12/333,146 on Feb. 2, 2012; 21 pages.
Notice of Allowance issued in U.S. Appl. No. 11/323,634 on Jan. 25, 2012; 5 pages.
Notice of Allowance issued in U.S. Appl. No. 12/233,534 won Dec. 28, 2011; 7 pages.
Notice of Allowance issued in U.S. Appl. No. 11/396,258 on Feb. 3, 2012; 12 pages.
Office Action issued in U.S. Appl. No. 11/967,489 on Feb. 6, 2012; 9 pages.

* cited by examiner

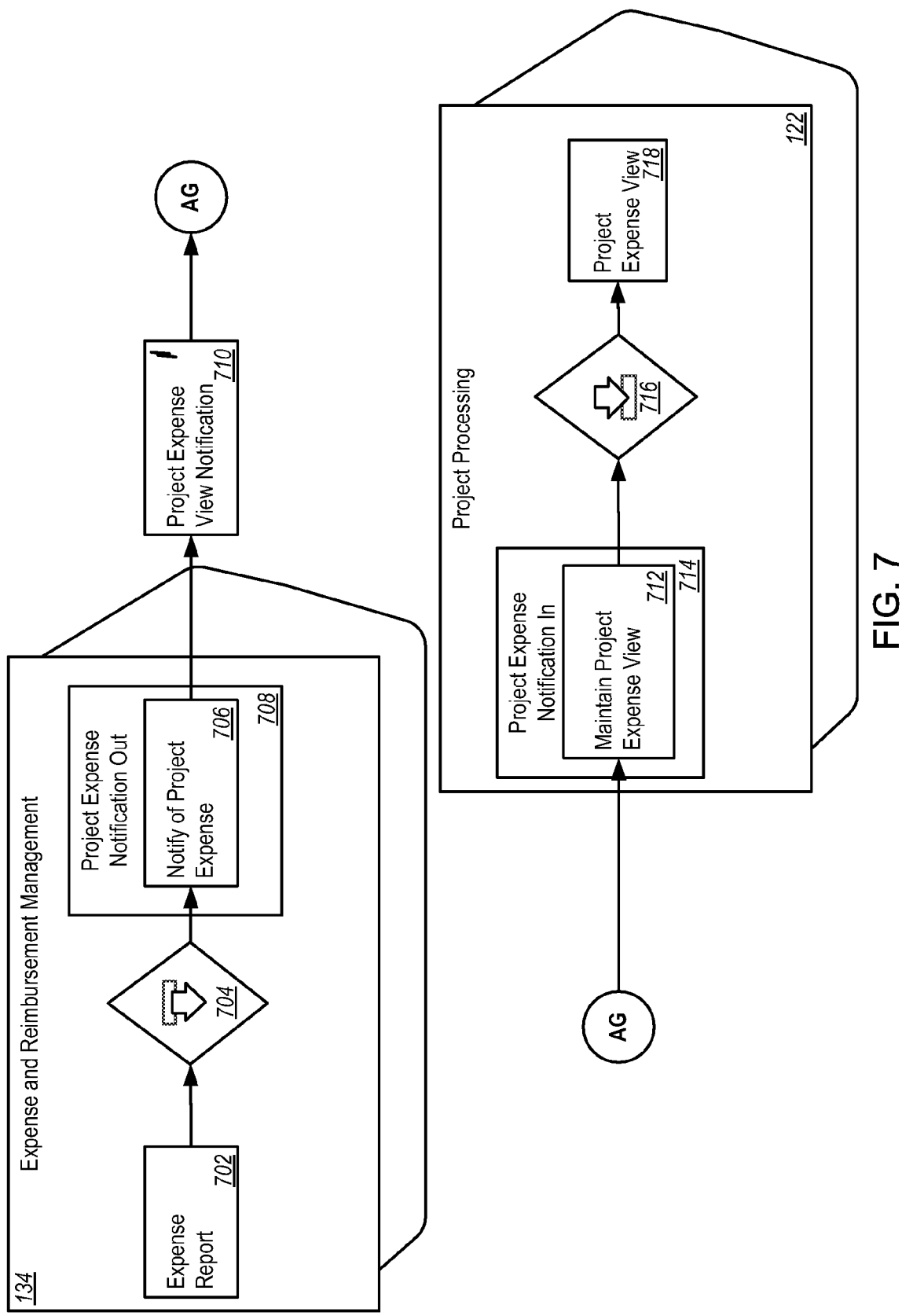

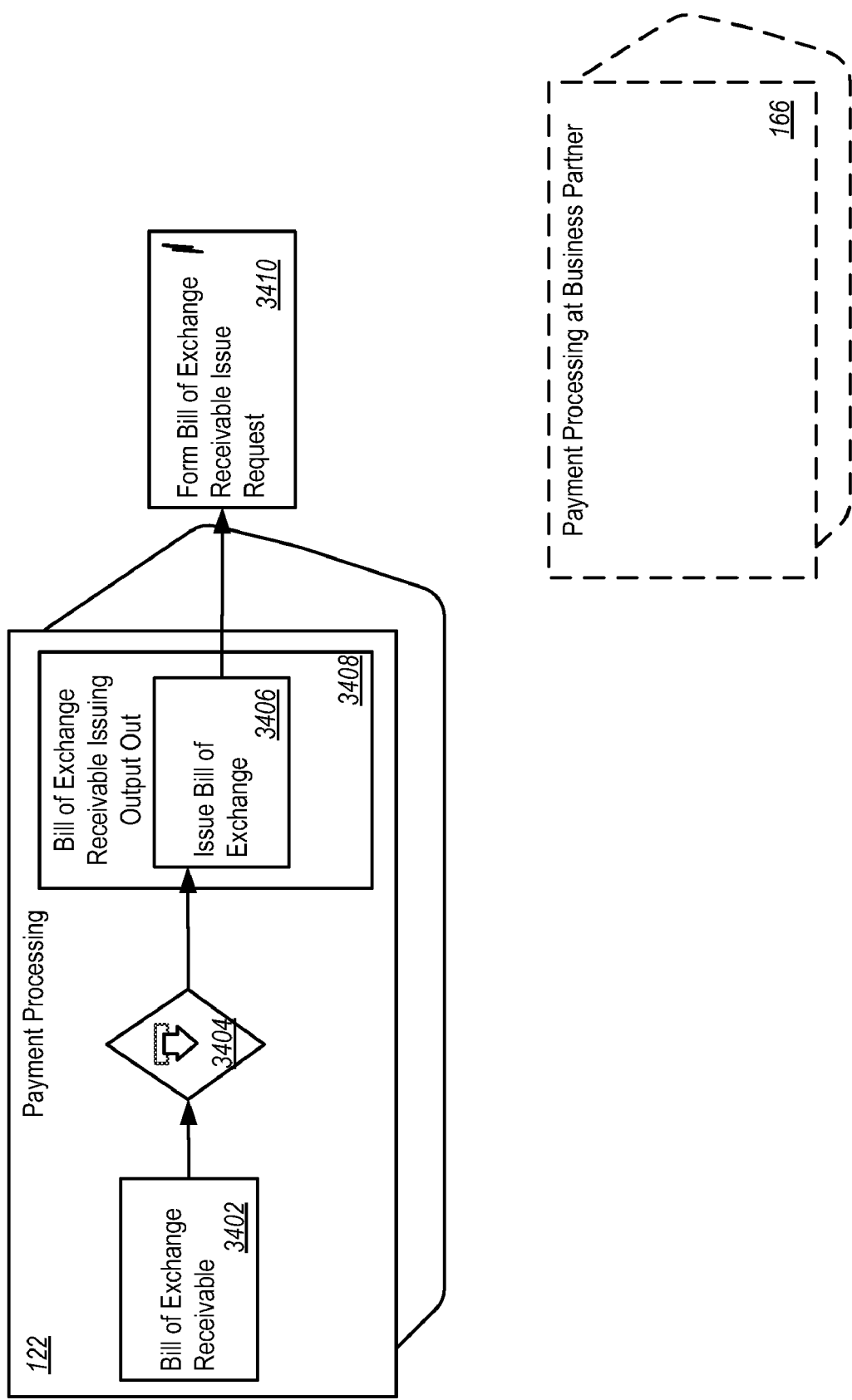

US 8,321,306 B2

ARCHITECTURAL DESIGN FOR SELLING PROJECT-BASED SERVICES APPLICATION SOFTWARE

BACKGROUND

The subject matter of this patent application relates to computer software architecture, and more particularly to the architecture of application software for selling project-based services.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a selling project-based services software application.

In its various aspects, the present subject matter can be implemented as methods, systems, and apparatus, including computer program products, for implementing a software architecture design for a software application implementing time recording. The software application is structured as multiple process components interacting with each other through service interfaces, and multiple service operations, each being implemented for a respective process component. The process components include an Accounting Coding Block Distribution Processing process component, a Project Processing process component, an Accounting process component, a Pricing Engine process component, a Customer Project Invoice Preparation process component, a Project Processing process component, a Balance of Foreign Payment Management process component, a Payment Processing process component, a Due Item Processing process component, a Costing process component, a Time and Labor Management process component, a Customer Relationship Auxiliaries Processing process component, a Customer Invoice Processing process component, a Sales Order Processing process component, a Customer Quote Processing process component, an Opportunity Processing process component, an Expense and Reimbursement Management process component, an Inventory Processing process component, a Supplier Invoice Processing process component, a Purchase Request Processing process component, a Purchase Order Processing process component, a Goods and Services Acknowledgement process component, and a Purchasing Contract Processing process component.

In its various aspects, the subject matter can further be implemented as methods, systems, and apparatus, including computer program products, implementing a software architecture design for a software application that is adapted to interact with externals software systems through the service operations described in reference to external process components, or a subcombination of them.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

FIG. 7 is a block diagram showing interactions between an Expense and Reimbursement Management process component and a Project Processing process component.

FIG. 34 is a block diagram showing interactions between the Payment Processing process component and the Payment Processing at Business Partner process component.

DETAILED DESCRIPTION

Figure 1A:
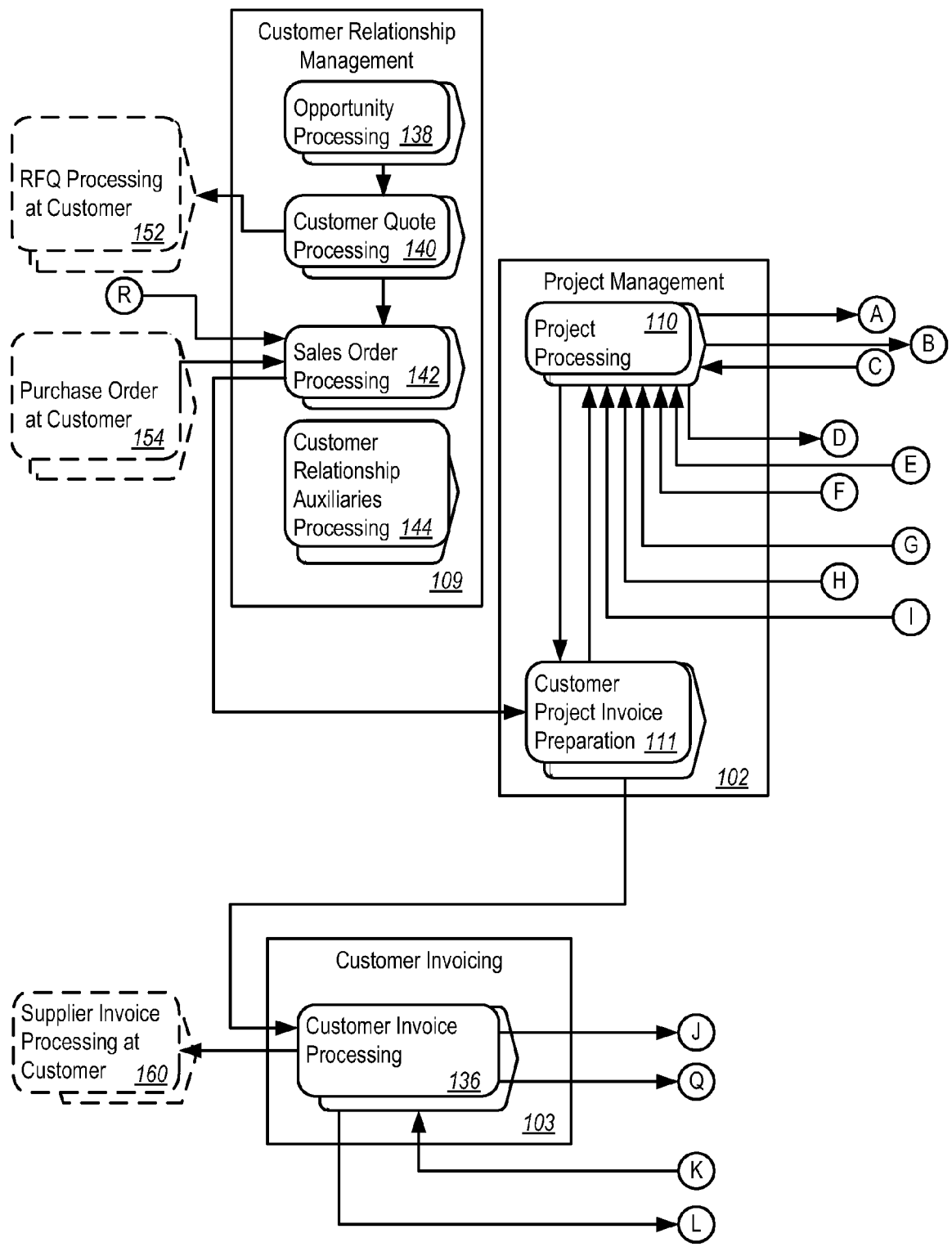
FIGS. 1A, 1B, 1C, 1D, and 1E is a block diagram of a software architectural design for a time recording software application.
Figure 1B:
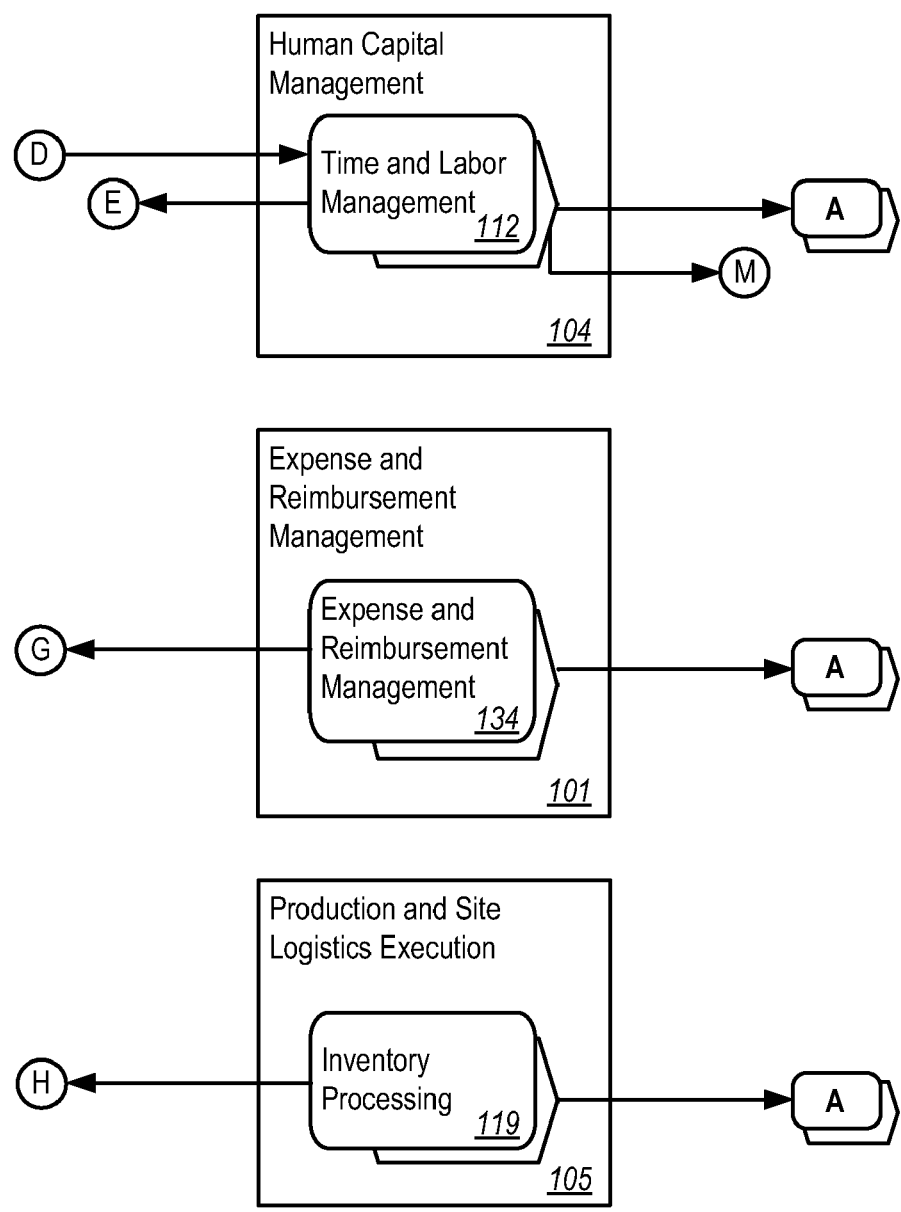
Figure 1C:
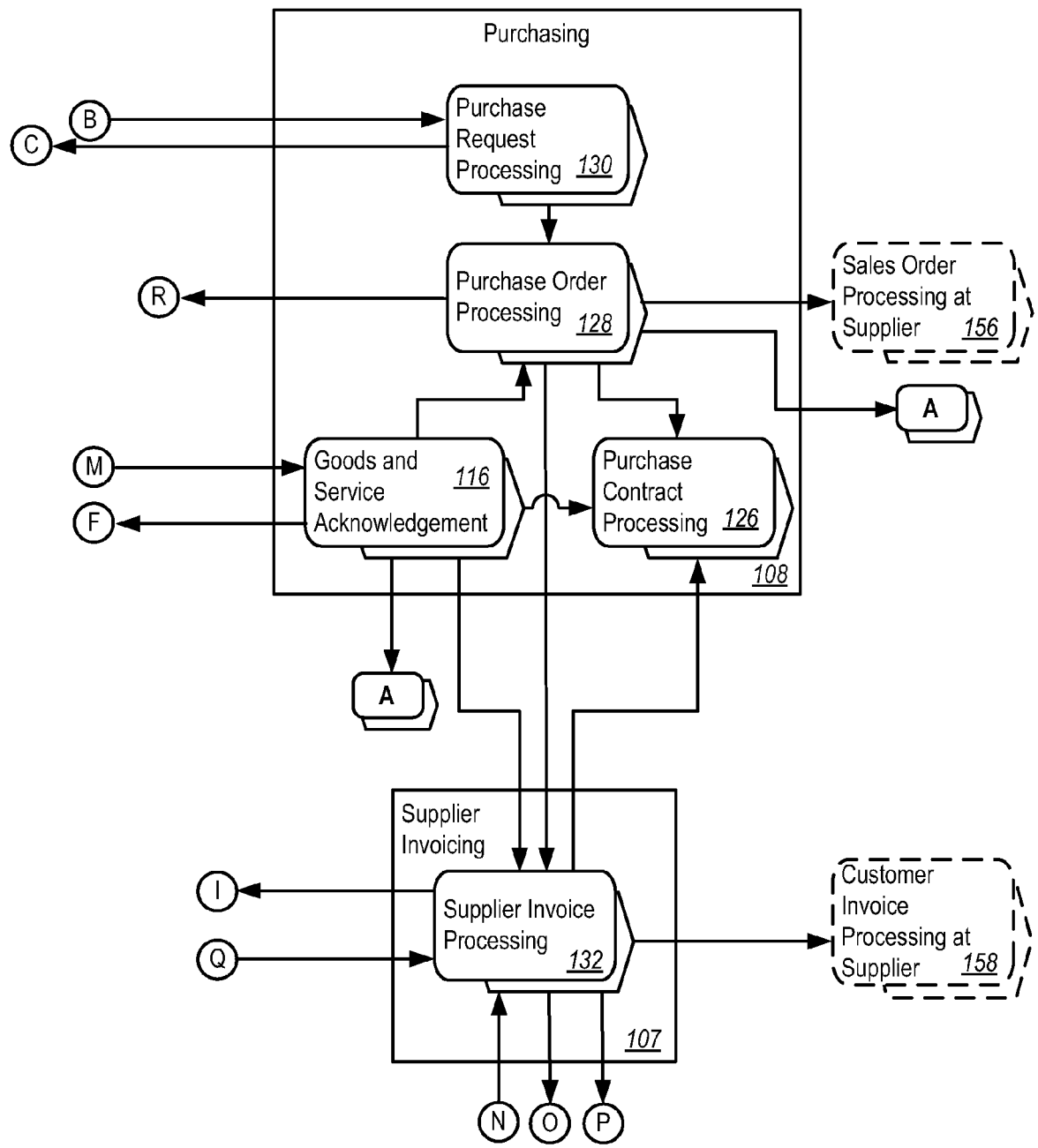
Figure 1D:
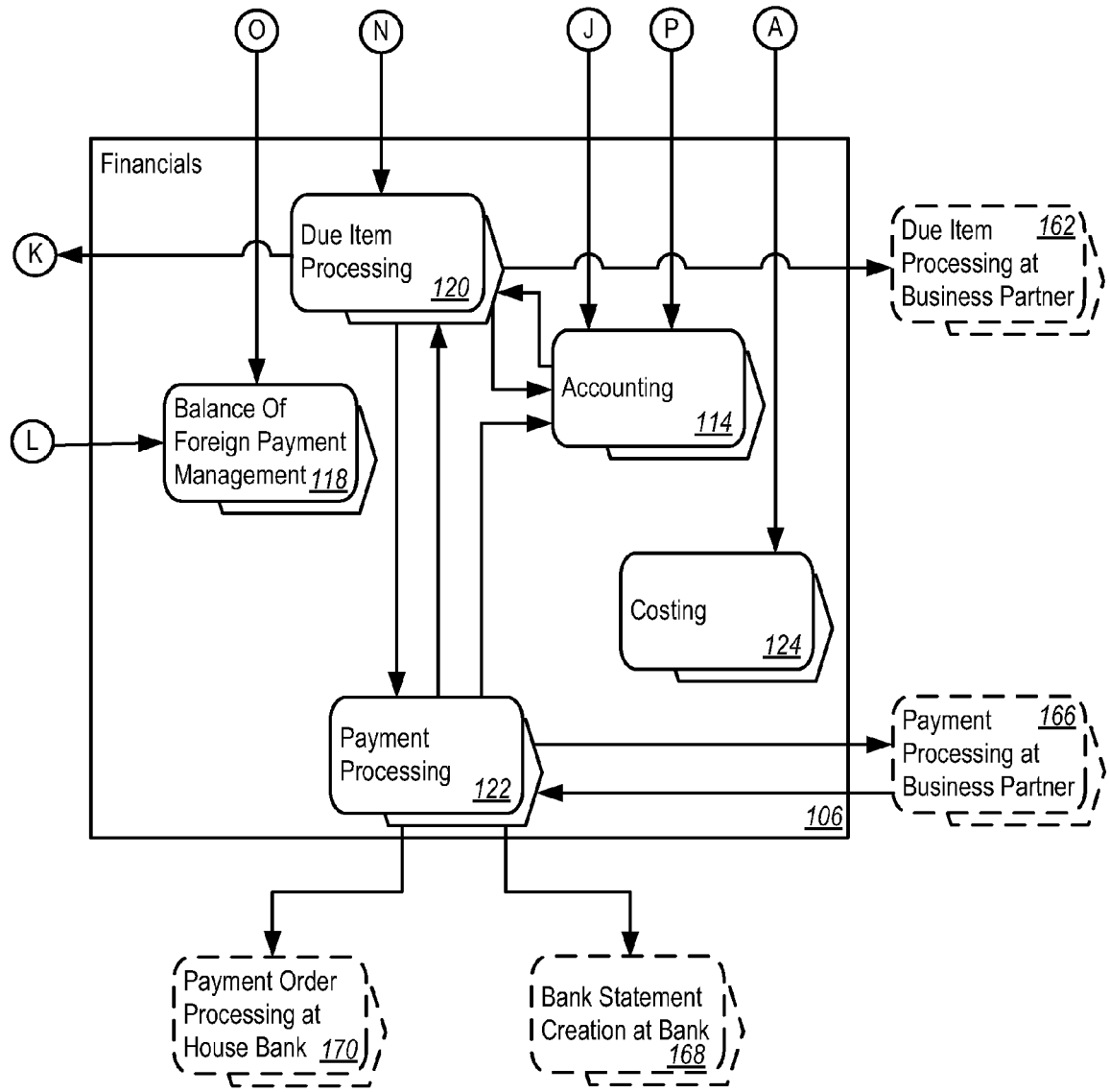
Figure 1E:
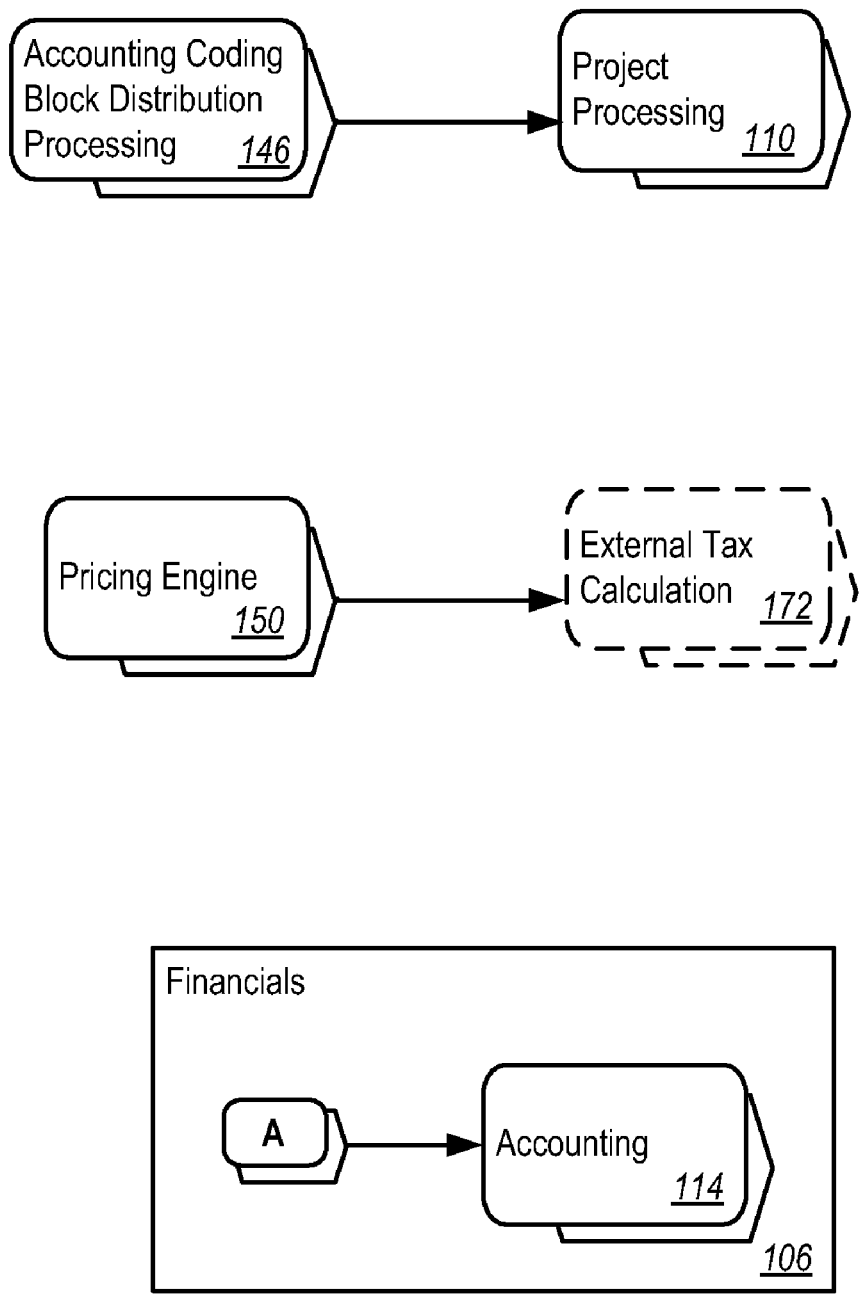

FIG. 1 shows the software architectural design for a sell project-based services software application. The sell project-based services application is software that implements a complete process of selling project-based services to customers. This can include customer acquisition, sales order processing, project execution, service procurement, service invoicing, and monitoring customer payments.

As shown in FIG. 1, the sell project-based services design includes a Project Management deployment unit 102, a Human Capital Management deployment unit 104, a Financials deployment unit 106, a Purchasing deployment unit 108, a Customer Invoicing deployment unit 103, a Supplier Invoicing deployment unit 107, a Customer Relationship Management deployment unit 109, an Expense and Reimbursement Management deployment unit 101, and a Production and Site Logistics Execution deployment unit 105.

The Project Management deployment unit 102 includes a Project Processing process component 110 and a Customer Project Invoice Preparation processing component 111. The Project Processing process component 110 is responsible for structuring, planning, and executing simple short-term measures and complex projects. The Customer Project Invoice Preparation processing component 111 is responsible for creating invoice requisitions for a customer project based on the expenses incurred, the project progress, and the invoicing agreements.

The Human Capital Management deployment unit 104 includes a Time and Labor Management process component 112. The Time and Labor Management process component 112 supports the management of employees' planned working times, and the recording and valuation of work performed and absence times. The Production and Site Logistics Execution deployment unit 105 includes an Inventory Processing process component 119. The Inventory Processing process component 119 supports the management of inventory and recording of inventory changes. It can also provide services to maintain current stock, content and structure of logistic units and allocations.

The Financials deployment unit 106 includes an Accounting process component 114, a Balance of Foreign Payment Management process component 118, a Due Item Processing process component 120, a Payment Processing process component 122, and a Costing process component 124. The Accounting process component 114 records relevant business transactions for valuation and profitability analysis. The Balance of Foreign Payment Management process component 118 is responsible for the collection, processing, and reporting of receivables and payables according to foreign trade regulations that are required by the financial authority of a country, such as the central bank. The Due Item Processing process component 120 is responsible for the collection, management, and monitoring of trade receivables or payables and corresponding sales tax or withholding tax. The Payment Processing process component 122 is responsible for the processing and management of all payments. The Payment Processing process component 122 can also be responsible for associated communication with financial institutions such as banks, and provides the primary input for liquidity management. The Costing process component 124 is responsible for the estimation of costs for objects such as materials, projects, service products, sales order items, or production lots.

The Purchasing deployment unit 108 includes a Goods and Service Acknowledgement process component 116, a Purchasing Contract Processing process component 126, a Purchase Order Processing process component 128, and a Purchase Request Processing process component 130. The Goods and Service Acknowledgement process component 116 represents a confirmation by an employee of goods received or services rendered. The Purchasing Contract Processing process component 126 is responsible for the creation and maintenance of purchasing contracts. The Purchase Order Processing process component 128 is responsible for the creation and maintenance of purchase orders and purchase order confirmations. The Purchase Request Processing process component 130 is responsible for the creation, changing, and processing of purchase requests to locate appropriate external sources of supply.

The Supplier Invoicing deployment unit 107 includes a Supplier Invoice Processing process component 132. The Supplier Invoice Processing process component 132 is responsible for the management and volume processing of supplier invoices, including exception handling and approval.

The Expense and Reimbursement Management deployment unit 101 includes an Expense and Reimbursement Management process component 134. The Expense and Reimbursement Management process component 134 is responsible for the management and monitoring of expenses incurred by employees, and the reimbursement of such expenses to employees. The Expense and Reimbursement Management process component 134 can be responsible for the entire process of verifying the validity of expenses submitted by internal or external employees, settling the expenses in conformance with legal requirements and company policy, reimbursing the expenses to the employees, transferring the expenses to financial accounting, and transferring taxable amounts to payroll for internal employees.

The Customer Invoicing deployment unit 103 includes a Customer Invoice Processing process component 136. The Customer Invoice Processing process component 136 is responsible for the invoicing of customers for the delivery of goods or the provision of services.

The Customer Relationship Management deployment unit 109 includes an Opportunity Processing process component 138, a Customer Quote Processing process component 140, a Sales Order Processing process component 142, and a Customer Relationship Auxiliaries Processing process component 144. The Opportunity Processing process component 138 is responsible for the development, processing and monitoring of opportunities with the aim to initiate sales and service deals. The Customer Quote Processing process component 140 is responsible for the processing of quotes to customers offering the delivery of goods according to specific terms. The Sales Order Processing process component 142 is responsible for the processing of customers' requests to seller for the delivery of goods, on a specific date, for a specific quantity, and for a specific price. The Customer Relationship Auxiliaries Processing process component 144 is responsible for the processing of supplementary functions that support customer relationship management. For example, a supplementary function can be a view of a project, or the processing of payment card authorization.

The foundation layer, described below, includes an Accounting Coding Block Distribution Processing process component 146 and a Pricing Engine processing component 150. The Accounting Coding Block Distribution Processing process component 146 handles the registration and checking of all accounting objects that can be assigned in a source document for a business transaction, such as cost center, project, or market segment. The Pricing Engine process component 150 handles the processing of price and tax calculations. The process component 158 can dispatch a check request to the Financials deployment unit 106.

A number of external process components, described below, will be used to describe the architectural design. These include an RFQ Processing at Customer process component 152, a Purchase Order Processing at Customer process component 154, a Sales Order Processing at Supplier process component 156, a Customer Invoice Processing at Supplier process component 158, a Supplier Invoice Processing at Customer process component 160, a Payment Processing at Business Partner process component 166, a Bank Statement Creation at Bank process component 168, a Due Item Processing at Business Partner process component 162, a Payment Order Processing at House Bank process component 170 and an External Tax Calculation process component 172.

The RFQ Processing at Customer process component 152 receives messages from the Customer Quote Processing process component 140 related to the creation or update of a customer quote offering the delivery of goods according to specific terms.

The Sales Order Processing process component 142 receives requests for the delivery of goods, on a specific date, for a specific quantity, and for a specific price from the Purchase Order Processing at Customer process component 154.

The Pricing Engine process component 150 requests a tax calculation from the External Tax Collection process component 172

The Supplier Invoice Processing at Customer process component 160 receives messages from the Customer Invoice Processing process component 136. The messages can be invoices to the customers for the delivery of goods or the provision of services.

The Customer Invoice Processing at Supplier process component 158 receives supplier invoices for the delivery of goods or services from the Supplier Invoice Processing process component 132.

The Sales Order Processing at Supplier process component 156 receives purchase orders from the Purchase Order Processing process component 128.

The Payment Processing at Business Partner process component 166, the Bank statement creation at bank process component 168, and the Payment Order Processing at House Bank process component 170 can interact with the Payment Processing process component 122. The Payment Processing process component 122 can send updates to a Payment Processing at Business Partner process component 166, which is used to handle payments at a business partner. The Payment Processing at Business Partner process component 166 can also be responsible for the associated communication with financial institutions such as banks, and can provide the primary input for liquidity management. The Payment Processing process component 122 can also receive messages from the Bank Statement Creation at Bank process component 168. The message can include a bank statement for a bank account. The Payment Processing Process component 122 can send messages to the Payment Order Processing at House Bank process component 170. The messages can include a bank payment order that is a payment order which can be sent to a house bank. The bank payment order can include bank transfers as well direct debits.

Figure 2:
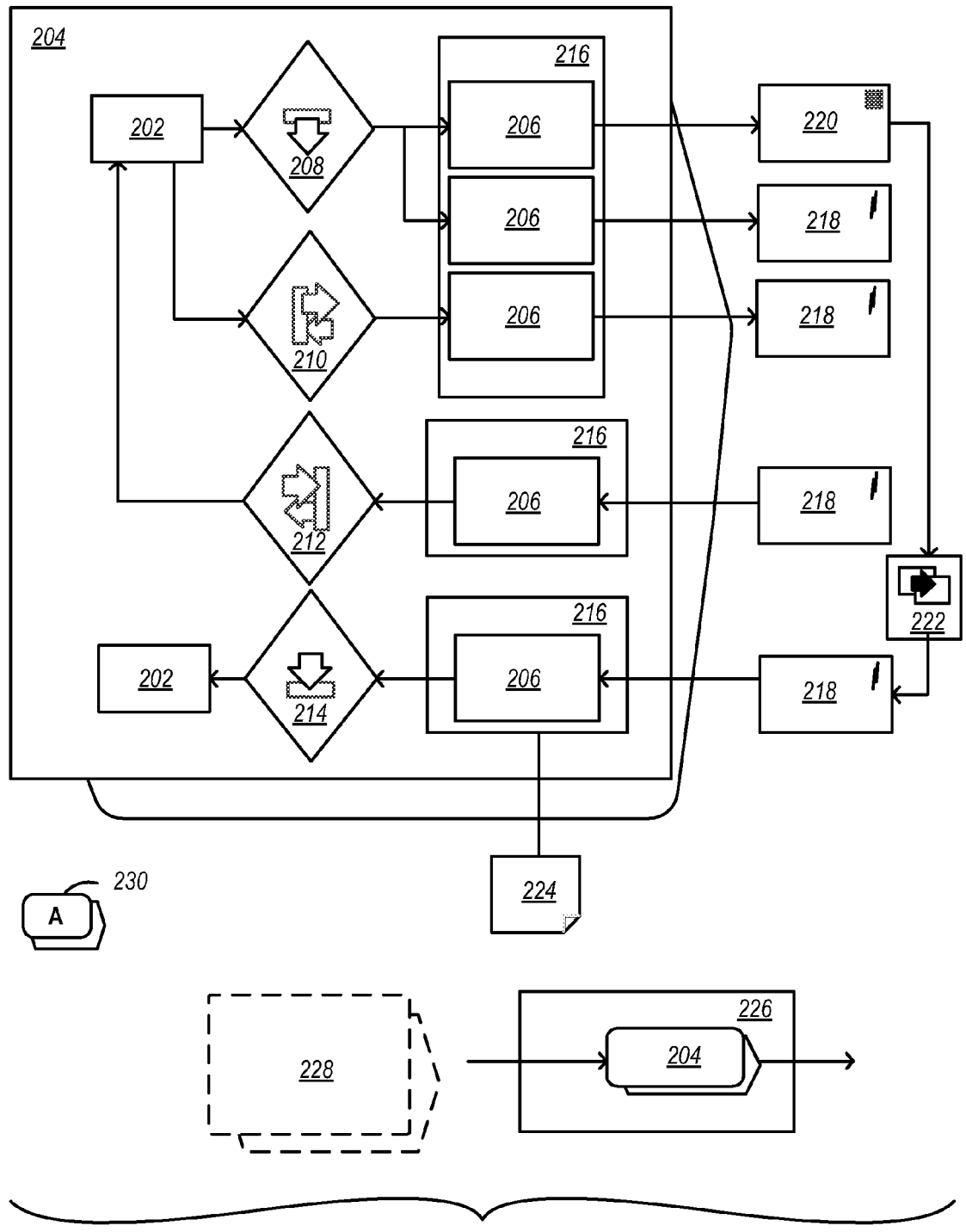
FIG. 2 illustrates the elements of the architecture as they are drawn in the figures.

FIG. 2 illustrates the elements of the architecture as they are drawn in the figures of this patent application. The elements of the architecture include the business object 202, the process component 204, the operation 206, the outbound process agent 208, the synchronous outbound process agent 210, the synchronous inbound process agent 212, the inbound process agent 214, the service interface or interface 216, the message 218, the form message 220, the mapping entity 222, the communication channel template 224, and the deployment unit 226.

Not explicitly represented in the figures is a foundation layer that contains all fundamental entities that are used in multiple deployment units 226. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

A process component of an external system is drawn as a dashed-line process component 228. Such a process component 228 represents the external system in describing interactions with the external system; however, the process component 228 need not represent more of the external system than is needed to produce and receive messages as required by the process component that interacts with the external system.

The connector icon 230 is used to simplify the drawing of interactions between process components 204. Interactions between process component pairs 204 involving their respective business objects 202, process agents (at 208, 210, 212, and 214), operations 206, interfaces 216, and messages (at 218 and 22) are described as process component interactions, which determine the interactions of a pair of process components across a deployment unit boundary, i.e., from one deployment unit 226 to another deployment unit 226. Interactions between process components 204 are indicated in FIGS. 1A-1E by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components 204, but interfaces 216, process agents (at 208, 210, 212, and 214), and business objects 202 that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component 204 is described as being contained in a deployment unit 226. It should be understood, however, that such operational inclusion can be realized in a variety of ways and is not limited to a physical inclusion of the entirety of one element in another.

The architectural elements include the business object 202. A business object 202 is a representation of a type of a uniquely identifiable business entity (an object instance) described by a structural model. Processes operate on business objects. This example business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component 204, is an object that encapsulates transactional data (i.e., data that is valid for a point in time). The term business object will be used generically to refer to a business process object and a master data object, unless the context requires otherwise. Properly implemented, business objects 202 are implemented free of redundancies.

The architectural elements also include the process component 204. A process component 204 is a software package that realizes a business process and generally exposes its functionality as services. The functionality includes the ability to perform all or parts of particular kinds of business transactions. A process component 204 contains one or more semantically related business objects 202. Any business object belongs to no more than one process component. Process components can be categorized as a standard process component, a process component at a business partner, a third party process component, or a user centric process component. The standard process component (named simply process component) is a software package that realizes a business process and exposes its functionality as services. The process component at a business partner is a placeholder for a process component (or other technology that performs the essential functions of the process component) used at a business partner. The third party process component is a process component (or other technology that performs the essential functions of the process component) provided by a third party. The user centric process component is a process component containing user interface parts.

Process components 204 are modular and context-independent. That they are context-independent means that a process component 204 is not specific to any specific application and is reusable. The process component 204 is often the smallest (most granular) element of reuse in the architecture.

The architectural elements also include the operation 206. An operation 206 belongs to exactly one process component 204. A process component 204 generally is able to perform multiple operations 206. Operations 206 can be synchronous or asynchronous, corresponding to synchronous or asynchronous process agents (e.g. at 208, 210, 212, and 214), which will be described below. Operation 206 may be the smallest, separately-callable function, described by a set of data types used as input, output, and fault parameters serving as a signature.

The architectural elements also include the service interface 216, referred to simply as the interface. An interface 216 is a named group of operations 206. Interface 216 typically specifies inbound service interface functionality or outbound service interface functionality. Each operation 206 belongs to exactly one interface 216. An interface 216 belongs to exactly one process component 204. A process component 204 might contain multiple interfaces 216. In some implementations, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations 206 directed to the same other process component 204 are in one interface 216.

The architectural elements also include the message 218. Operations 206 transmit and receive messages 218. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component. In some implementations, the message is a form based message 220 that can be translated into a recognized format for an external process component 228. The form message type 220 is a message type used for documents structured in forms. The form message type 220 can be used for printing, faxing, emailing, or other events using documents structured in forms. In some implementations, the form message type 220 provides an extended signature relative to the normal message type. For example, the form message type 220 can include text information in addition to identification information to improve human reading.

The architectural elements also include the process agent (e.g. at 208, 210, 212, and 214). Process agents do business processing that involves the sending or receiving of messages 218. Each operation 206 will generally have at least one associated process agent. The process agent can be associated with one or more operations 206. Process agents (at 208, 210, 212, and 214) can be either inbound or outbound, and either synchronous or asynchronous.

Asynchronous outbound process agents 208 are called after a business object 202 changes, e.g., after a create, update, or delete of a business object instance. Synchronous outbound process agents 210 are generally triggered directly by a business object 202.

An outbound process agent (208 and 210) will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents (212 and 214) are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents (210 and 212) are used when a process component requires a more or less immediate response from another process component, and is waiting for that response to continue its work.

Operations and process components are described in this specification in terms of process agents. However, in alternative implementations, process components and operations can be implemented without use of agents by using other conventional techniques to perform the functions described in this specification.

The architectural elements also include the communication channel template. The communication channel template is a modeling entity that represents a set of technical settings used for communication. The technical settings can include details for inbound or outbound processing of a message. The details can be defined in the communication channel template. In particular, the communication channel template defines an adapter type, a transport protocol, and a message protocol. In some implementations, various other parameters may be defined based on a selected adapter type. For example, the communication channel template can define a security level, conversion parameters, default exchange infrastructure parameters, processing parameters, download URI parameters, and specific message properties.

The communication channel template 224 can interact with internal or external process components (at 204 and 228). To interact with an internal process component, the communication channel template is received and uploaded to be used with an operation and interface pair. To interact with an external process component, the communication channel template is received and uploaded to be used with an external entity, such as an external bank, business partner, or supplier.

The architectural elements also include the deployment unit 226. A deployment unit 226 includes one or more process components 204 that are deployed together on a single computer system platform. Conversely, separate deployment units can be deployed on separate physical computing systems. For this reason, a boundary of a deployment unit 226 defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components 204 of one instance of one deployment unit 226.

The process components 204 of one deployment unit 226 interact with those of another deployment unit 226 using messages 218 passed through one or more data communication networks or other suitable communication channels. Thus, a deployment unit 226 deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units 226 is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components 204 that interact with other process components 204 or external systems only through messages 218, e.g., as sent and received by operations 206, can also be replaced as long as the replacement supports the operations 206 of the original 204.

In contrast to a deployment unit 226, the foundation layer does not define a limit for application-defined transactions. Deployment units 226 communicate directly with entities in the foundation layer, which communication is typically not message based. The foundation layer is active in every system instance on which the application is deployed. Business objects 202 in the foundation layer will generally be master data objects. In addition, the foundation layer will include some business process objects that are used by multiple deployment units 226. Master data objects and business process objects that should be specific to a deployment unit 226 are assigned to their respective deployment unit 226.

Interactions Between Process Components "Supplier Invoice Processing" and "Accounting"

Figure 3:
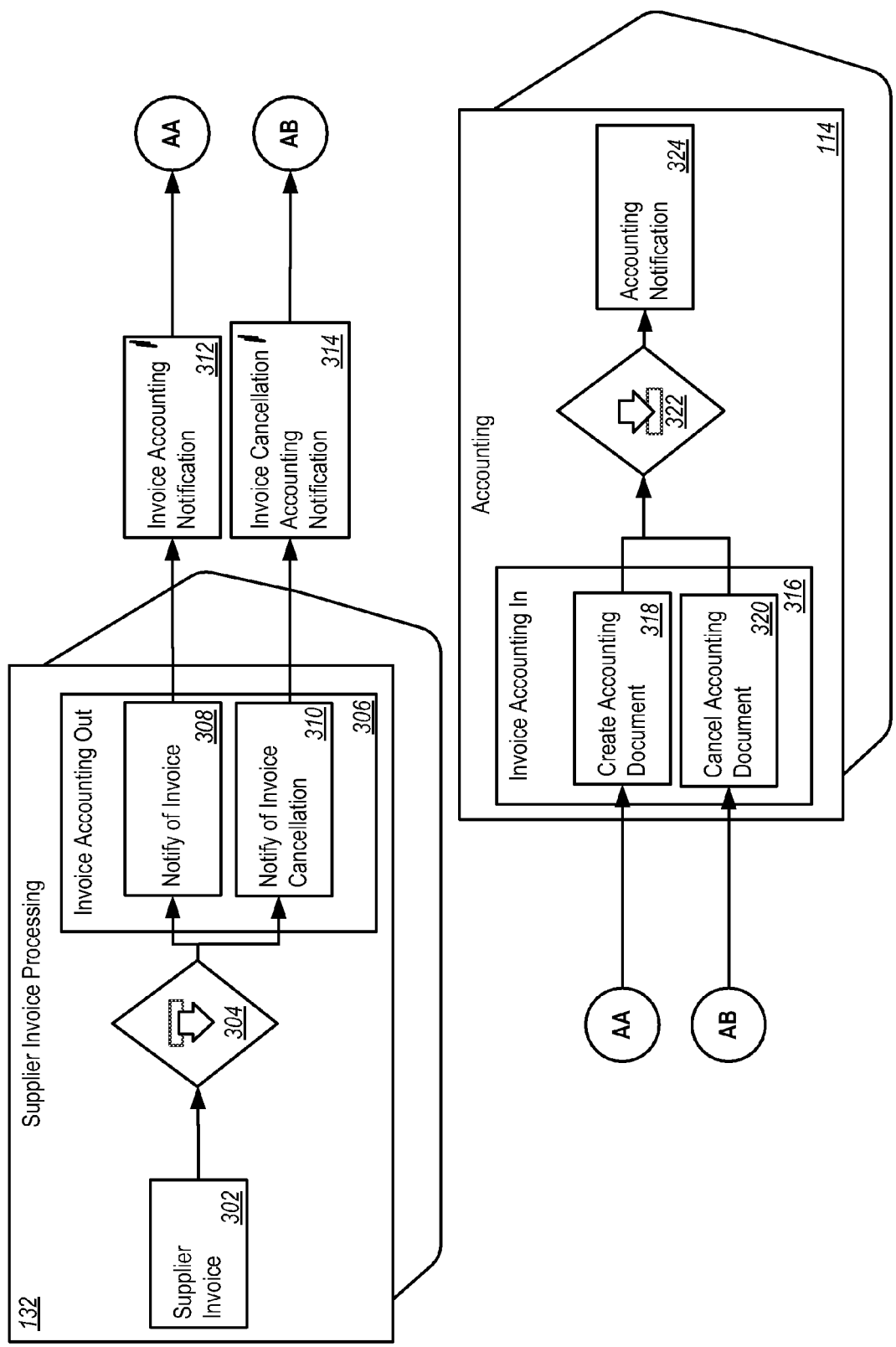
FIG. 3 is a block diagram showing interactions between a Supplier Invoice Processing process component and an Accounting process component.

FIG. 3 is a block diagram showing interactions between the Supplier Invoice Processing process component 132 and the Accounting process component 114 in the architectural design of FIGS. 1A-1E. The interaction starts when a supplier invoice is created or cancelled. The Supplier Invoice Processing process component 132 requests the creation or cancellation of accounting documents from the Accounting process component 114.

As shown in FIG. 3, the Supplier Invoice Processing process component 132 includes a Supplier Invoice business object 302. The Supplier Invoice business object 302 represents a company's obligation to pay the supplier for delivered goods and services. For example, if the company returns goods or complains about services, the supplier can issue a credit memo for an amount equal to or lower than the original invoice, and can refund the money to the company. For example, for invoiced goods that require a duty, a customs duty invoice can be submitted by the customs authority, stating a company's obligation to pay tax on the import or export of goods.

The Supplier Invoice business object 302 uses a Notify of Supplier Invoice to Accounting outbound process agent 304 to invoke a Notify of Invoice operation 308 or a Notify of Invoice Cancellation operation 310. The Notify of Supplier Invoice to Accounting outbound process agent 304 sends a notification about accounting-relevant data from a posted or cancelled supplier invoice, typically to accounting. The Notify of Invoice operation 308 sends a notification about accounting-relevant data from a posted supplier invoice. The Notify of Invoice Cancellation operation 310 sends a notification about accounting-relevant data from a previously posted supplier invoice that is cancelled. The operations 308 and 310 are included in an Invoice Accounting Out interface 306. The Notify of Invoice operation 308 generates an Invoice Accounting Notification message 312.

A Create Accounting Document operation 318 receives the message 312. The Create Accounting Document operation 318 creates an accounting document based on invoice data received from the Customer Invoice Processing process component 136 or the Supplier Invoice Processing process component 132. The received data can be first converted into an accounting notification from which one or more accounting documents can be created according to the relevant sets of books. The Create Accounting Document operation 318 is included in an Invoice Accounting In interface 316. The operation 318 uses a Maintain Accounting Document based on Invoice inbound process agent 322 to update an Accounting Notification business object 324. The Accounting Notification business object 324 represents a notification sent to financial accounting by an operational component regarding a business transaction. In particular, the Accounting Notification business object 324 represents this operational business transaction in a standardized form for all business transaction documents and can contain the data needed to valuate the business transaction.

The Notify of Invoice Cancellation operation 310 generates an Invoice Cancellation Accounting Notification message 314. A Cancel Accounting Document operation 320, in the Invoice Accounting In interface 316, receives the Invoice Cancellation Accounting Notification message 314 from the Supplier Invoice Processing process component 132. The Cancel Accounting Document operation 320 cancels an existing accounting document based on cancellation data received from Customer Invoice Processing process component 136 or the Supplier Invoice Processing process component 132. The received data can be converted into an accounting notification from which one or more reversal accounting documents can be created according to the relevant sets of books. The operation 320 uses the Maintain Accounting Document based on Invoice inbound process agent 322 to update the Accounting Notification business object 324.

Interactions Between Process Components "Payment Processing" and "Payment Order Processing at House Bank"

Figure 4:
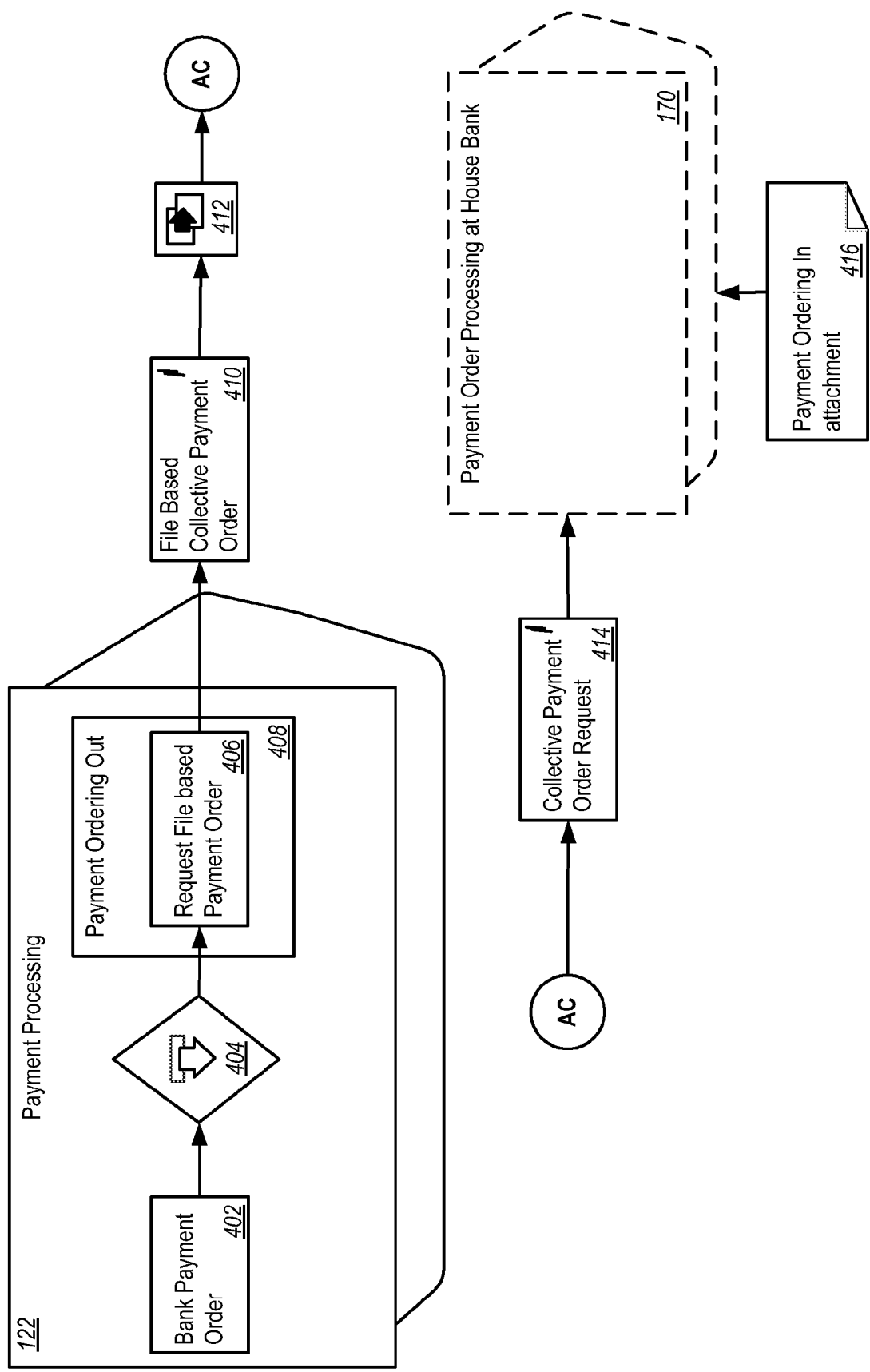
FIG. 4 is a block diagram showing interactions between a Payment Processing process component and a Payment Order Processing at House Bank process component.

FIG. 4 is a block diagram showing interactions between a Payment Processing process component 122 and a Payment Order Processing at House Bank process component 170 in the architectural design of FIGS. 1A-1E. The interaction starts with the requesting of the execution of bank transfers for Germany with file format "DTAZV." The communication can either be direct or based on a file exchange.

The Payment Processing process component 122 includes a Bank Payment Order business object 402. The Bank Payment Order business object 402 represents an order sent to a house bank to make a transfer or direct debit from a specified house bank account in order to fulfill a payment order.

The Bank Payment Order business object 402 uses a Request File Based Payment Order from Bank Payment to House Bank outbound process agent 404 to create a file based bank payment order to be sent to the house bank. The outbound process agent 404 invokes a Request File based Payment Order operation 406. The operation 406 instructs a house bank to make a bank transfer, direct debit, outgoing check, or bill of exchange payable. The Request File based Payment Order operation 406 is included in a Payment Ordering Out interface 408. The Request File based Payment Order operation 406 sends a File Based Collective Payment Order Request message 410 to the Payment Order Processing at House Bank process component 170. The Request File based Payment Order operation 406 generates the File Based Collective Payment Order Request message 410. The message 410 is a request based on a file transfer to a credit institution to carry out one or more payment transactions, such as bank transfers or direct debits. The File based Collective Payment Order Request message 410 uses a Mapping Entity 412 to transform the file-based message type to a Collective Payment Order Request message 414 that can be received by the Payment Order Processing at House Bank process component 170. The message 414 is a request based on a file transfer to a credit institution to carry out one or more payment transactions, such as bank transfers or direct debits for Germany with file format DTAZV. The Payment Order Processing at House Bank process component 170 sends information to the Payment Processing process component 122 using a Payment Ordering In attachment communication channel template 416. The communication channel template 416 can define protocols and parameters used for communication with an external party.

Interactions Between Process Components "Supplier Invoice Processing" and "Balance of Foreign Payment Management"

Figure 5:
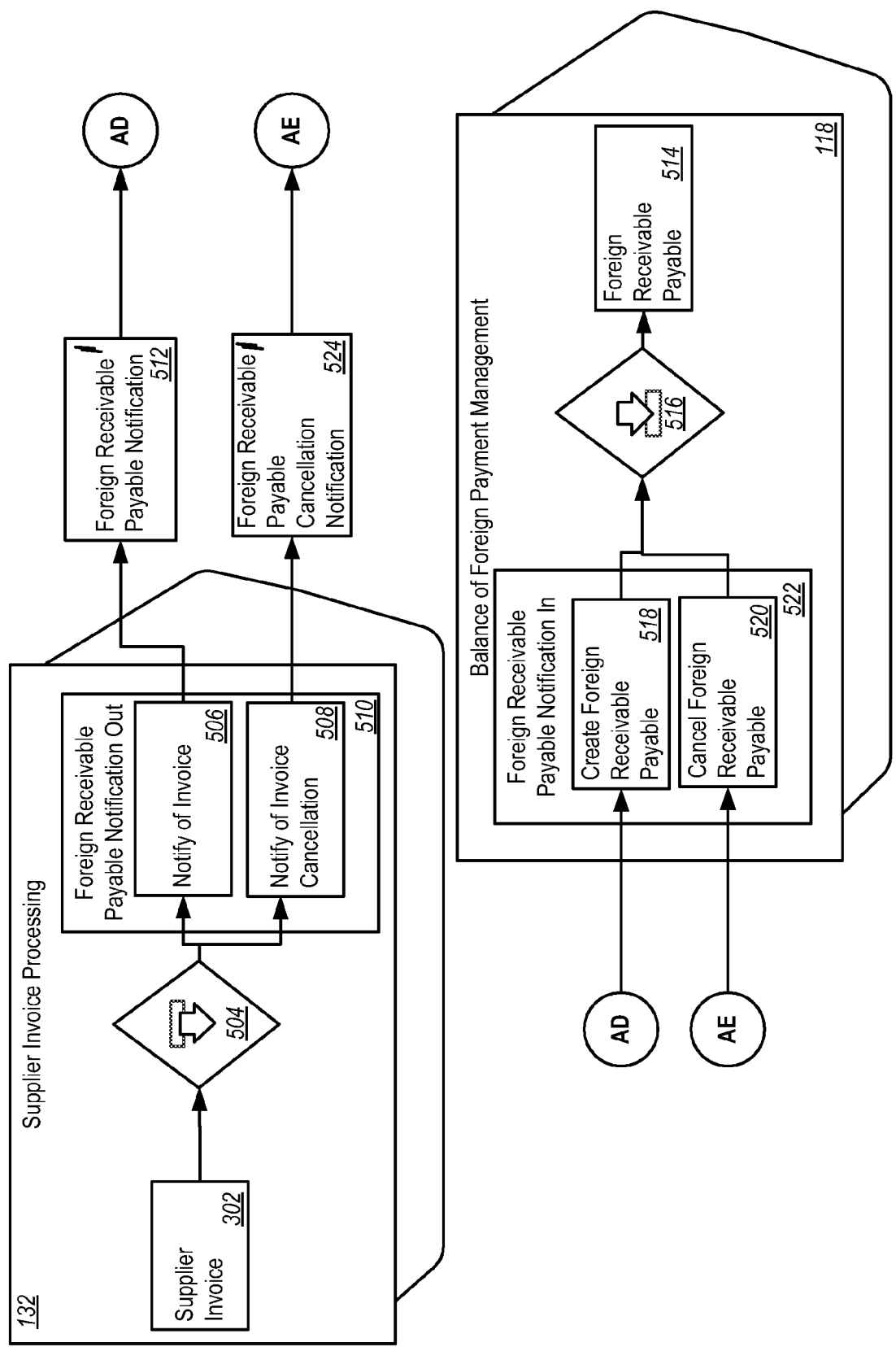
FIG. 5 is a block diagram showing interactions between the Supplier Invoice Processing process component and a Balance of Foreign Payment Management process component.

FIG. 5 is a block diagram showing interactions between the Supplier Invoice Processing process component 132 and the Balance of Foreign Payment Management process component 118 in the architectural design of FIGS. 1A-1E. The interaction starts with the notification of the Balance of Foreign Payment Management process component 118 about the creation or cancellation of a payable (supplier invoice) related to a non-resident seller in the Supplier Invoice Processing process component 132.

As shown in FIG. 5, the Supplier Invoice Processing process component 132 includes the Supplier Invoice business object 302. The Supplier Invoice business object 302 represents a company's obligation to pay the supplier for delivered goods and services. For example, if the company returns goods or complains about services, the supplier can issue a credit memo for an amount equal to or lower than the original invoice, and refunds the money to the company. For example, for invoiced goods that require a duty, a customs duty invoice can be submitted by the customs authority, stating a company's obligation to pay tax on the import or export of goods.

The Supplier Invoice business object 302 uses a Notify of Supplier Invoice to Balance of Foreign Payments Management outbound process agent 504 to invoke a Notice of Invoice operation 506 or a Notice of Invoice Cancellation operation 508. The Notice of Invoice operation 506 sends a notification about a posted supplier invoice. The Notice of Invoice Cancellation operation 508 sends a notification about a previously posted supplier invoice that is cancelled. The operations 506 and 508 are included in a Foreign Receivable Payable Notification Out interface 510. The Notice of Invoice operation 506 generates a Foreign Receivable Payable Notification message 512. The message 512 is a notification about the creation of receivables or payables related to a non-resident business-partner.

A Create Foreign Receivable Payable operation 518 receives the message 512. The Create Foreign Receivable Payable operation 518 creates a receivable or payable from foreign trade. The Create Foreign Receivable Payable operation 518 is included in a Foreign Receivable Payable Notification In interface 522. The operation 518 uses a Maintain Foreign Receivable Payable inbound process agent 516 to update a Foreign Receivable Payable business object 514. The Foreign Receivable Payable business object 514 represents a receivable from or a payable to a non-resident business partner.

The Notice of Invoice Cancellation operation 508 generates a Foreign Receivable Payable Cancellation Notification message 524. A Cancel Foreign Receivable Payable operation 520, in the Foreign Receivable Payable Notification In interface 522, receives the Foreign Receivable Payable Cancellation Notification message 524 from the Supplier Invoice Processing process component 132. The Foreign Receivable Payable Cancellation Notification message 524 is a notification about the cancellation of receivables or payables related to a non-resident business partner. The Cancel Foreign Receivable Payable operation 520 sends a notification about the cancellation of a receivable (customer invoice) related to a non-resident buyer. The operation 520 uses the Maintain Foreign Receivable Payable inbound process agent 516 to update the Foreign Receivable Payable business object 514.

Interactions Between Process Components "Payment Processing at Business Partner" and "Payment Processing"

Figure 6:
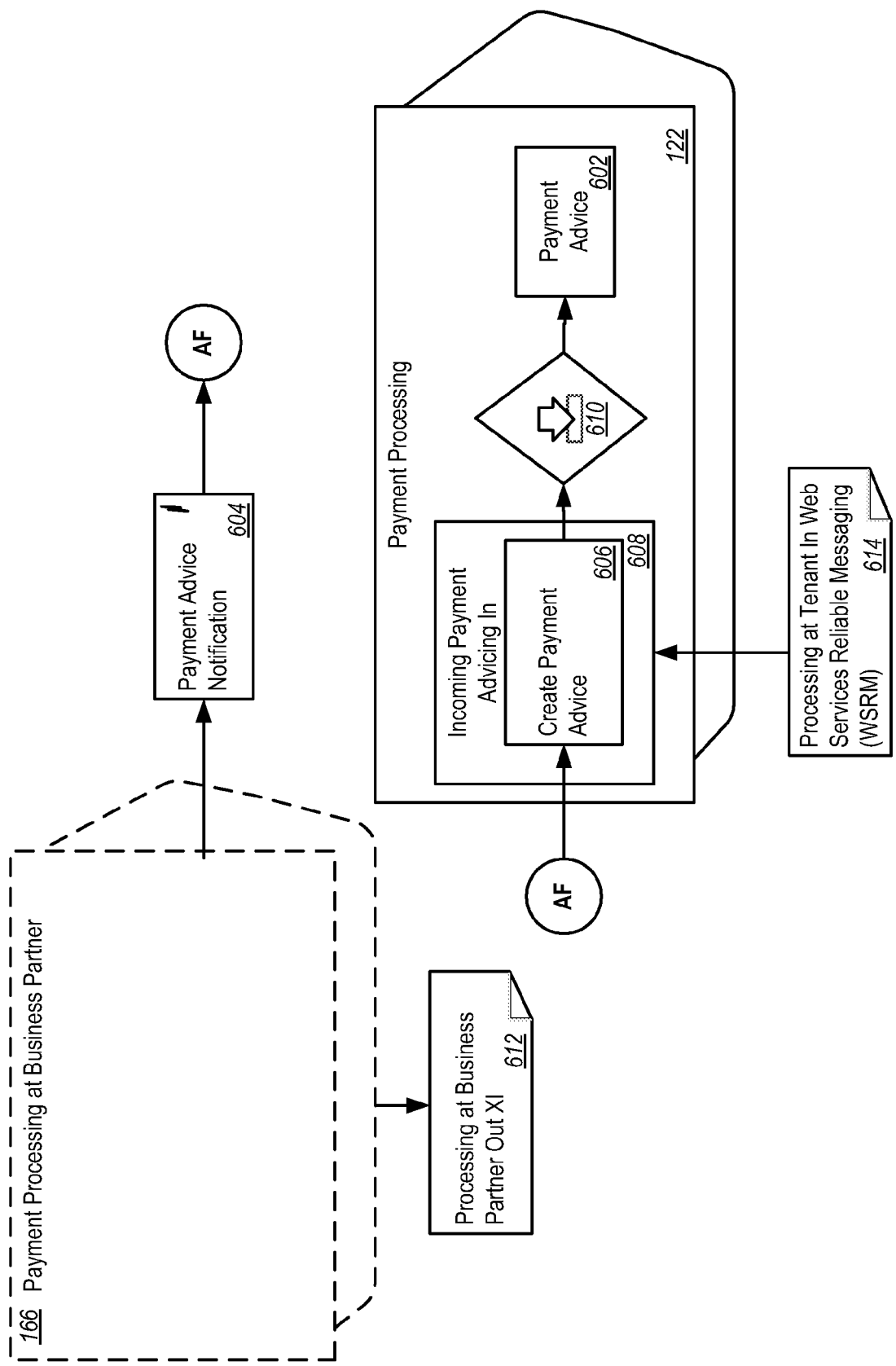
FIG. 6 is a block diagram showing interactions between a Payment Processing at Business Partner process component and the Payment Processing process component.

FIG. 6 is a block diagram showing interactions between a Payment Processing at Business Partner process component 166 and the Payment Processing process component 122 in the architectural design of FIGS. 1A-1E. The interaction starts with the receiving of a payment advice from a business partner.

As shown in FIG. 6, the Payment Processing process component 122 includes the Payment Advice business object 602. The Payment Advice business object 814 represents an announcement of a payment transaction by a business partner to the company, specifying payment reasons. A Payment Advice Notification message 604 is received from the Payment Processing at Business Partner process component 166 by a Create Payment Advice operation 606. The message 604 is a notification of a payment with explanations about the reason for payment. The Create Payment Advice operation 606 is included in an Incoming Payment Advicing In interface 608. The operation 606 creates a payment advice sent from a business partner or house bank concerning future payment transactions. The Create Payment Advice operation 606 uses a Maintain Payment Advice inbound process agent 610 to update a Payment Advice business object 602.

The Payment Processing at Business Partner process component 166 sends information to the Payment Processing process component 122 using a Processing at Business Partner Out XI communication channel template 612. The communication channel template 612 can define protocols and parameters used for communication with an external party. While XI represents Exchange Infrastructure, any similar or suitable third-party or proprietary toll may be used to perform the functions provided by or describe in relation to XI.

The Payment Processing process component 122 receives information from a Processing at Tenant In Web Services Reliable Messaging (WSRM) communication channel template 614. The communication channel template 614 can define protocols and parameters used for communication with an external party.

Interactions Between Process Components "Expense and Reimbursement Management" and "Project Processing"

FIG. 7 is a block diagram showing interactions between an Expense and Reimbursement Management process component 134 and the Project Processing process component 122 in the architectural design of FIGS. 1A-1E. The interaction starts with the notification of the Project Processing process component 122 about the creation or change of an expense report that has recorded an expense on a project.

As shown in FIG. 7, the Expense and Reimbursement Management process component 134 includes an Expense Report business object 702. The Expense Report business object 702 represents a list of receipts for the expenses incurred for the company within a certain period of time that are to be reimbursed to an expense reporter. For example, in the case of a business trip, it can also contain the reason for the trip and general information such as destinations, dates and times, and mileages.

The Expense Report business object 702 uses a Notify of Project Expense from Expense Report to Project Processing outbound process agent 704 to invoke a Notify of Project Expense operation 706. The operation 706 notifies project processing about settlement results related to a project. The Notify of Project Expense operation 706 is included in a Project Expense Notification Out interface 708. The operation 706 sends a Project Expense View Notification message 710. The Project Expense View Notification message 710 is a notification that contains information about expense incurred for a project A Maintain Project Expense View operation 712 receives the Project Expense View Notification message 710. The operation 712 is included in a Project Expense Notification In interface 714. The Maintain Project Expense View operation 712 creates or cancels a project expense. The operation 712 uses a Maintain Project Expense View inbound process agent 716 to update a Project Expense View business object 718. The Project Expense View business object 718 represents a project management view of a project-related expense resulting from a business transaction.

Interactions Between Process Components "Purchase Order Processing" and "Sales Order Processing"

Figure 8A:
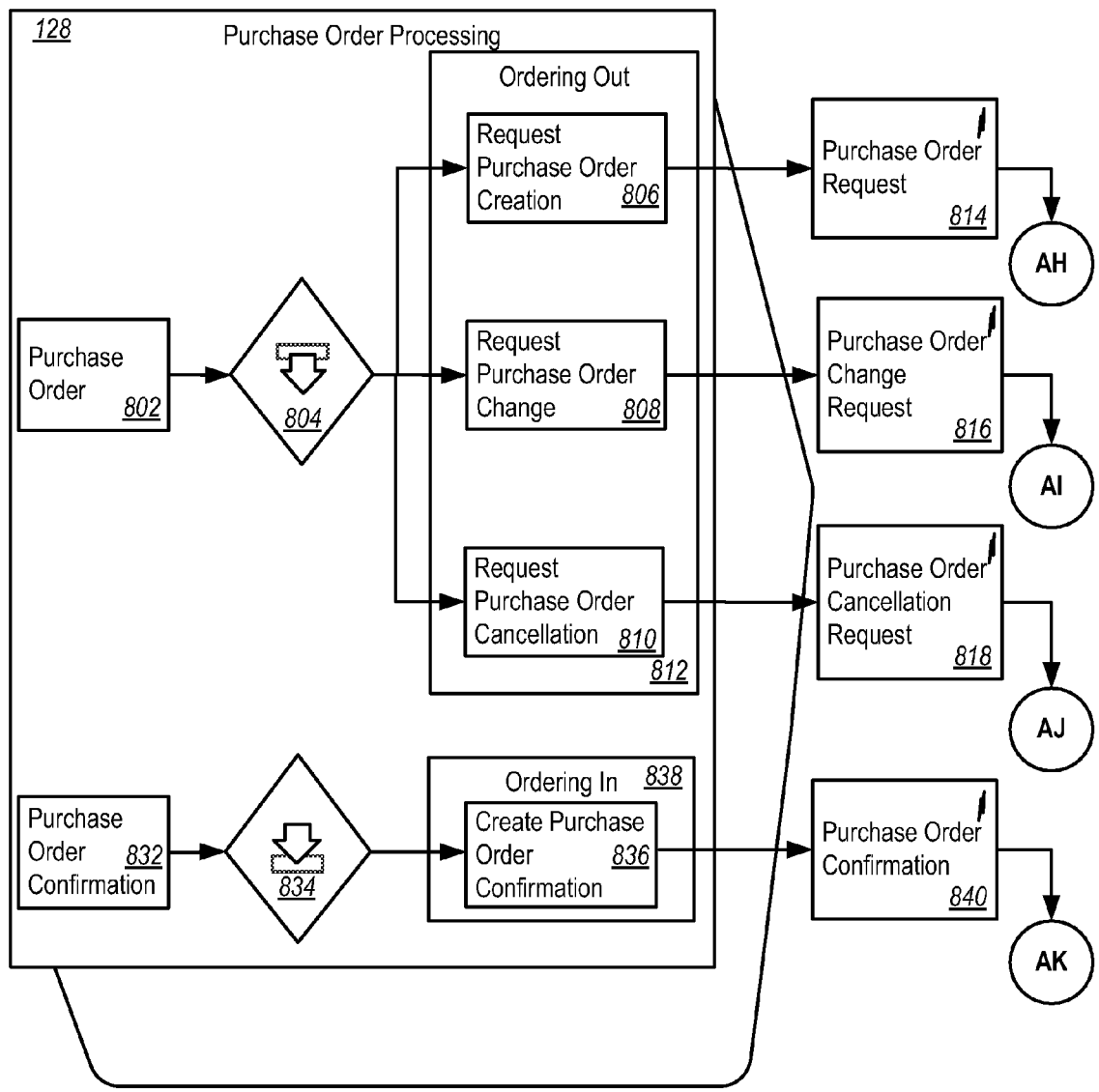
FIGS. 8A and 8B are block diagrams collectively showing interactions between a Purchase Order Processing process component and a Sales Order Processing process component.
Figure 8B:
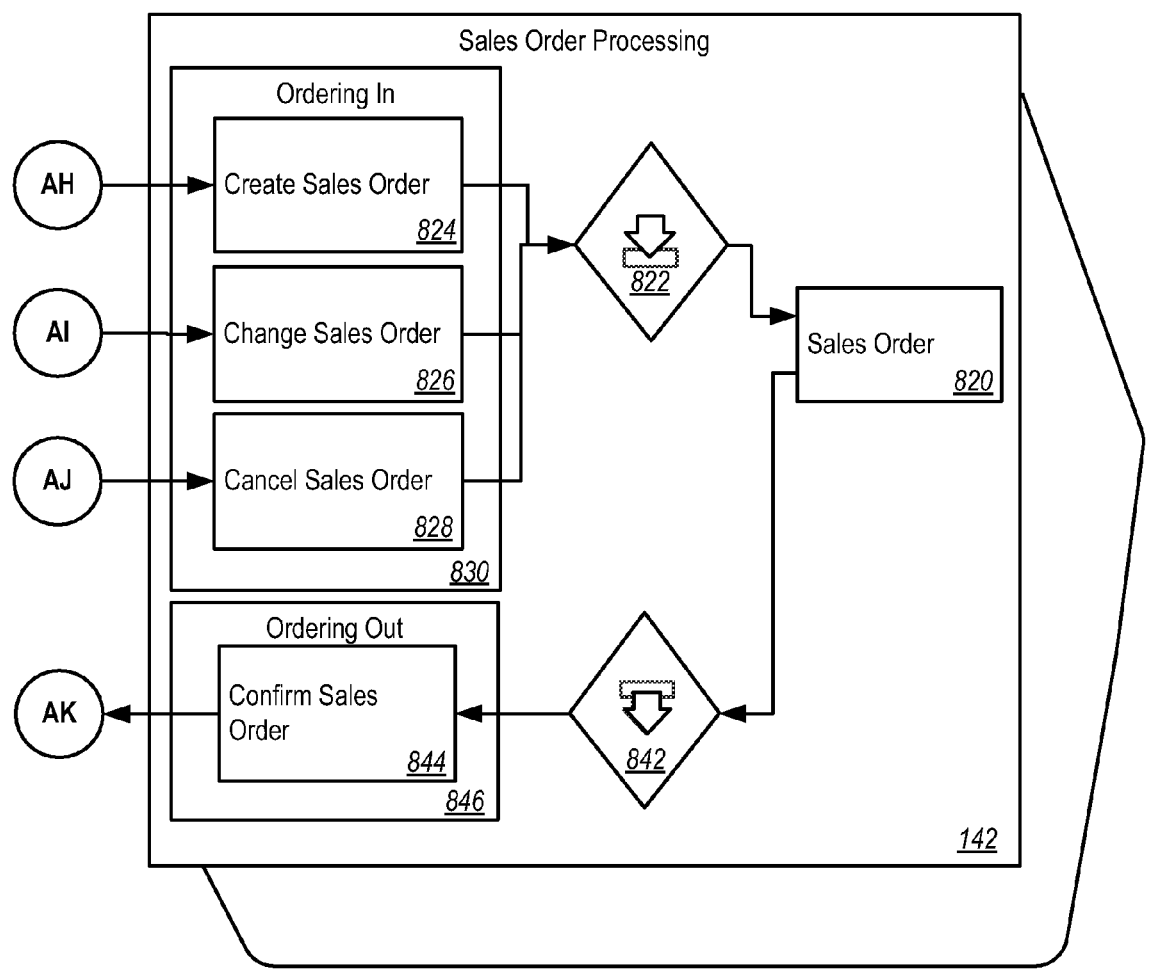

FIGS. 8A and 8B are block diagrams collectively showing interactions between a Purchase Order Processing process component 128 and a Sales Order Processing process component 142 in the architectural design of FIGS. 1A-1E. The interaction starts with the requesting of the creation, update or cancellation of sales orders from the Sales Order Processing process component 142 when a purchase order on the customer's side is created, changed or cancelled.

As shown in FIGS. 8A and 8B, the Purchase Order Processing process component 128 includes a Purchase Order business object 802 and a Purchase Order Confirmation business object 832. The Purchase Order business object 802 represents a request from a buyer to a seller to deliver a specified quantity of material, or perform a specified service, at a specified price within a specified time. The Purchase Order Confirmation business object 832 represents a confirmation from a seller to deliver a specified quantity of goods, or perform a specified service, at a specified price within a specified time.

The Purchase Order business object 802 uses a Request Purchase Order to Supplier outbound process agent 804 to invoke a Request Purchase Order Creation operation 806, a Request Purchase Order Change operation 808, or a Request Purchase Order Cancellation operation 810. The Request Purchase Order Creation operation 806 requests sales order processing at a supplier to process a new purchase order. The Request Purchase Order Change operation 808 requests sales order processing at a supplier to change a previously sent purchase order. The Request Purchase Order Cancellation operation 810 requests sales order processing at a supplier to cancel a previously sent purchase order. The operations 806, 808, and 810 are included in an Ordering Out interface 812. The Request Purchase Order Creation operation 806 generates a Purchase Order Request message 814. The message 814 is a request from a buyer to the seller to deliver goods or provide services.

A Create Sales Order operation 824 receives the Purchase Order Request message 814. The Create Sales Order operation 824 creates the sales order based on the purchase order. The Create Sales Order operation 824 is included in an Ordering In interface 830. The operation 824 uses a Confirm Sales Order to Customer inbound process agent 822 to update a Sales Order business object 820. The Sales Order business object 820 represents an agreement between a seller and a customer concerning the sale and delivery of goods, as well as any services that are associated with these processes, on a specific date, for a specific quantity, and for a specific price.

The Request Purchase Order Change operation 808 generates a Purchase Order Change Request message 816. A Change Sales Order operation 826, in the Ordering In interface 830, receives the Purchase Order Change Request message 816 from the Purchase Order Processing process component 128. The Change Sales Order operation 826 updates the sales order based on changes from the purchase order. The operation 826 uses the Confirm Sales Order to Customer inbound process agent 822 to update the Sales Order business object 820.

The Request Purchase Order Cancellation operation 810 generates a Purchase Order Cancellation Request message 818. A Cancel Sales Order operation 828, in the Ordering In interface 830, receives the Purchase Order Cancellation Request message 818 from the Purchase Order Processing process component 128. The Cancel Sales Order operation 826 cancels the sales order based on the cancellation of a purchase order from the customer. The operation 826 uses the Confirm Sales Order to Customer inbound process agent 822 to update the Sales Order business object 820.

The Sales Order business object 820 uses a Maintain Sales Order outbound process agent 842 to invoke a Confirm Sales Order operation 844. The operation 844 is included in an Ordering Out interface 846. The Confirm Sales Order operation 844 confirms changes in the sales order to the customer. The operation 844 sends a Purchase Order Confirmation message 840.

A Create Purchase Order Confirmation operation 836 receives the Purchase Order Confirmation message 840. The operation 836 is included in an Ordering In interface 838. The Create Purchase Order Confirmation operation 836 creates a purchase order confirmation based on the supplier's response to a purchase order. The operation 836 uses a Create Purchase Order Confirmation inbound process agent 834 to update the Purchase Order Confirmation business object 832.

Interactions Between Process Components "Due Item Processing" and "Customer Invoice Processing"

Figure 9:
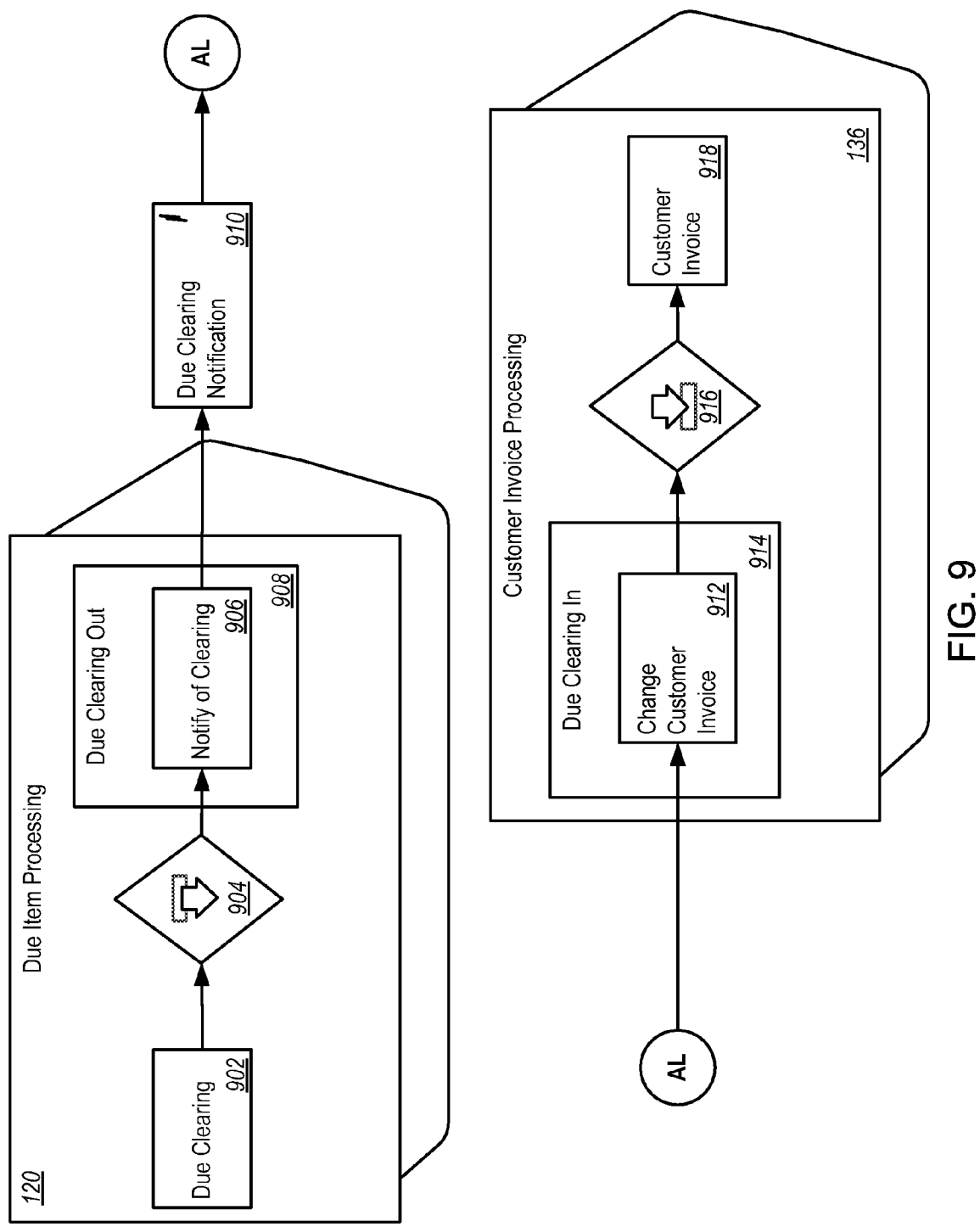
FIG. 9 is a block diagram showing interactions between a Due Item Processing process component and a Customer Invoice Processing process component.

FIG. 9 is a block diagram showing interactions between a Due Item Processing process component 120 and a Customer Invoice Processing process component 136 in the architectural design of FIGS. 1A-1E. The interaction starts with the notification concerning the creation of a due clearing.

As shown in FIG. 9, the Due Item Processing process component 120 includes a Due Clearing business object 902. The Due Clearing business object 902 represents a group of receivables and payables for clearing. The Due Clearing business object 902 uses a Notify of Clearing to Customer Invoice Processing outbound process agent 904 to invoke a Notify of Clearing operation 906. The operation 906 is included in a Due Clearing Out interface 908. The Notify of Clearing operation 906 notifies the Customer Invoice Processing process component 136 about clearing of trade receivables. The operation 906 generates a Due Clearing Notification message 910.

A Change Customer Invoice operation 912 receives the Due Clearing Notification message 910. The operation 912 is included in a Due Clearing In interface 914. The Change Customer Invoice operation 912 changes a customer invoice based on due clearing. The operation 912 uses a Maintain Customer Invoice based on Clearing inbound process agent 916 to update a Customer Invoice business object 918. The Customer Invoice business object 918 represents a binding statement of amounts receivable resulting, for example, from deliveries to a customer, services performed for a customer, adjustments to these receivables, or credit memos to a customer.

Interactions Between Process Components "Supplier Invoice Processing" and "Purchasing Contract Processing"

Figure 10:
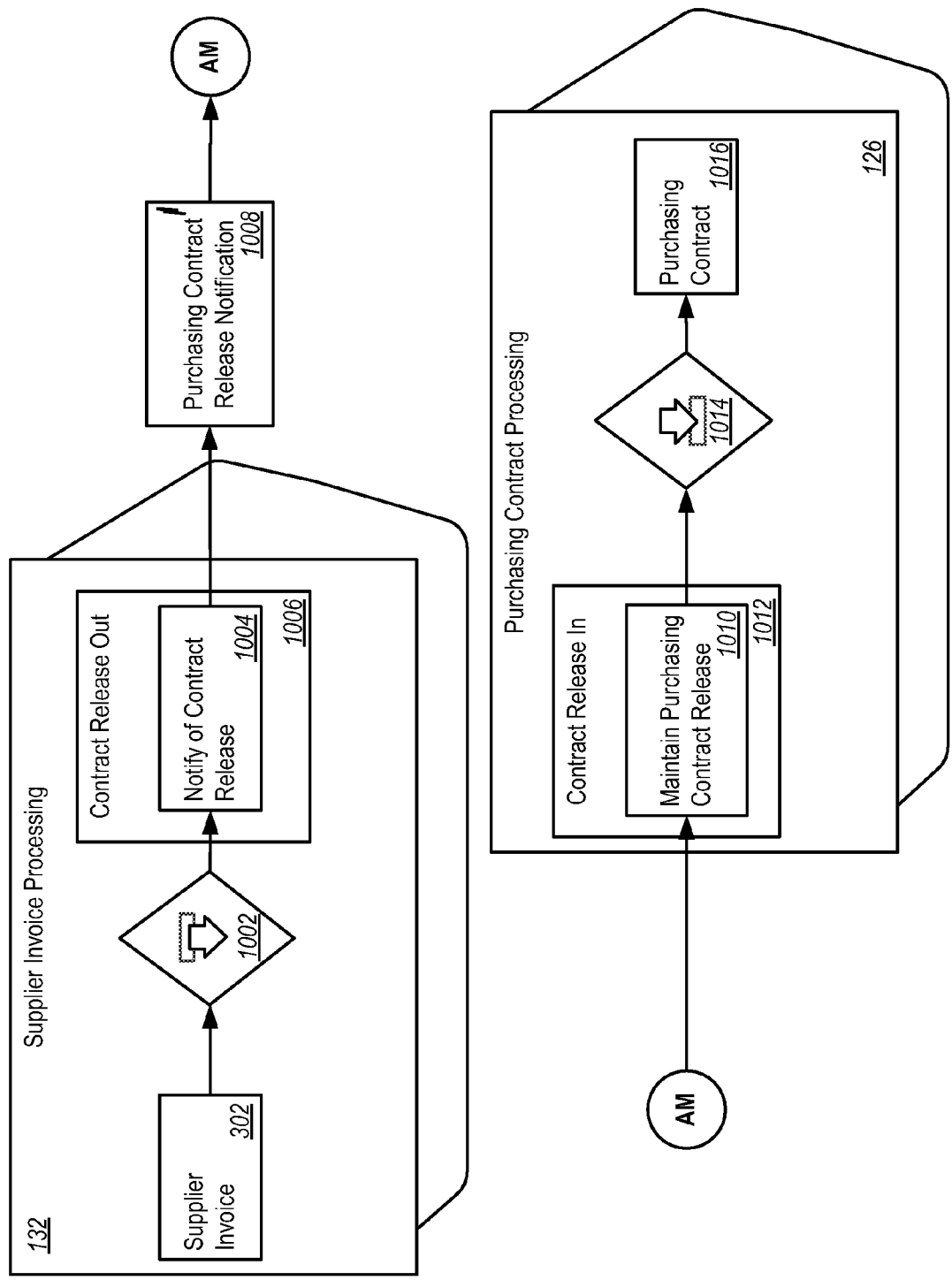
FIG. 10 is a block diagram showing interactions between the Supplier Invoice Processing process component and a Purchasing Contract Processing process component.

FIG. 10 is a block diagram showing interactions between the Supplier Invoice Processing process component 132 and a Purchasing Contract Processing process component 126 in the architectural design of FIGS. 1A-1E. The interaction starts with the notification of the posting of a release made by a supplier invoice against a contract to the Purchasing Contract Processing process component 126.

As shown in FIG. 10, the Supplier Invoice Processing process component 132 includes the Supplier Invoice business object 302. The Supplier Invoice business object 302 represents a company's obligation to pay the supplier for delivered goods and services. For example, if the company returns goods or complains about services, the supplier can issue a credit memo for an amount equal to or lower than the original invoice, and refunds the money to the company. In another example, some invoiced goods may require a duty and as such, a customs duty invoice can be submitted by the customs authority, stating a company's obligation to pay tax on the import or export of goods.

The Supplier Invoice business object 302 uses a Notify of Contract Release from Supplier Invoice to Purchasing Contract Processing outbound process agent 1002 to invoke a Notify of Contract Release operation 1004. The operation 1004 is included in a Contract Release Out interface 1006. The Notify of Contract Release operation 1004 sends a notification about the posting of a supplier invoice that contains a reference to a purchasing contract. The operation 1004 generates a Purchasing Contract Release message 1008.

A Maintain Purchasing Contract Release operation 1010 receives the Purchasing Contract Release message 1008. The operation 1010 is included in a Contract Release In interface 1012. The Maintain Purchasing Contract Release operation 1010 creates the release history of a purchasing contract. The operation 1010 uses a Maintain Purchasing Contract Release inbound process agent 1014 to update a Purchasing Contract business object 1016. The Purchasing Contract business object 1016 represents a legally binding purchase agreement that contains special conditions that are negotiated between a buyer and a seller, covering goods to be supplied or services to be performed. The Purchasing Contract business object 1016 can be valid for a specific period, during which goods and services are released against the contract.

Interactions Between Process Components "Bank Statement Creation at Bank" and "Payment Processing"

Figure 11:
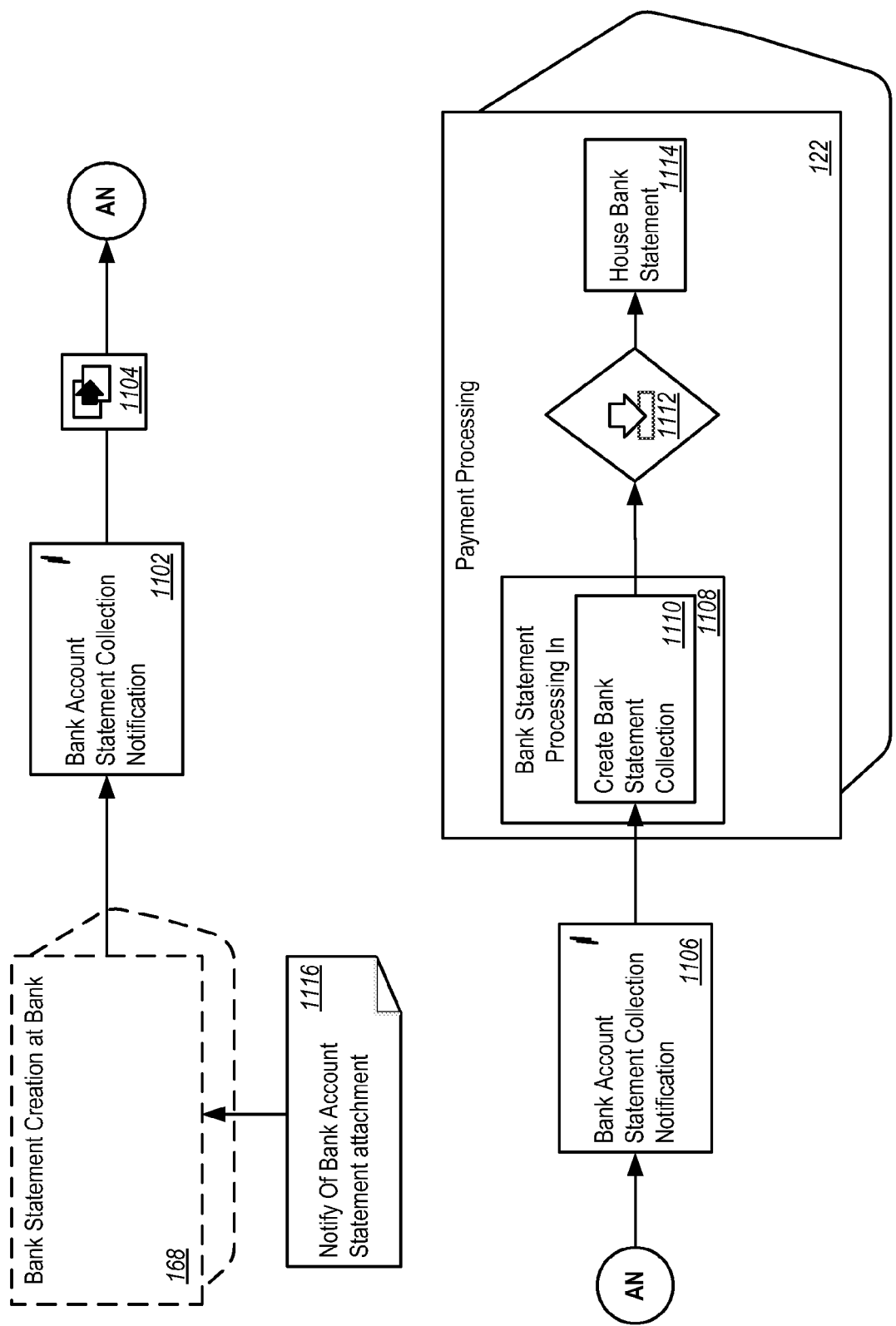
FIG. 11 is a block diagram showing interactions between a Bank Statement Creation at Bank process component and the Payment Processing process component.

FIG. 11 is a block diagram showing interactions between a Bank Statement Creation at Bank process component 168 and the Payment Processing process component 122 in the architectural design of FIGS. 1A-1E. The interaction starts with the notification about transactions on a bank account in the United States with file format BAI2_ST to the Payment Processing process component 122.

As shown in FIG. 11, a bank statement is created at a bank and a Bank Account Statement Collection Notification message 1102 is created. The Bank Account Statement Collection Notification message 1102 uses a Mapping Entity 1104 to transform the BAI2_ST file format message type to a Bank Account Statement Collection Notification message 1106 about a collection of bank statements for a specific bank account that can be received by the Payment Processing process component 122. The Bank Account Statement Collection Notification message 1106 is received in the Payment Processing process component 122. The Payment Processing process component 122 includes a Bank Statement Processing In interface 1108. The interface 1108 includes a Create Bank Statement Collection operation 1110. The operation 1110 creates a collection of bank statements in the Payment Processing process component 122. A Maintain Bank Statement inbound process agent 1112 updates a House Bank Statement business object 1114 with a new bank statement. The House Bank Statement business object 1114 represents a legally binding notification from the house bank about the transactions within a specific time period at a house bank account with a defined starting and closing balance.

The Bank Statement Creation at Bank process component 168 receives information from a Notify of Bank Account Statement attachment communication channel template 1116. The communication channel template 1116 can define protocols and parameters used for communication with an external party.

Interactions Between Process Components "Due Item Processing" and "Supplier Invoice Processing"

Figure 12:
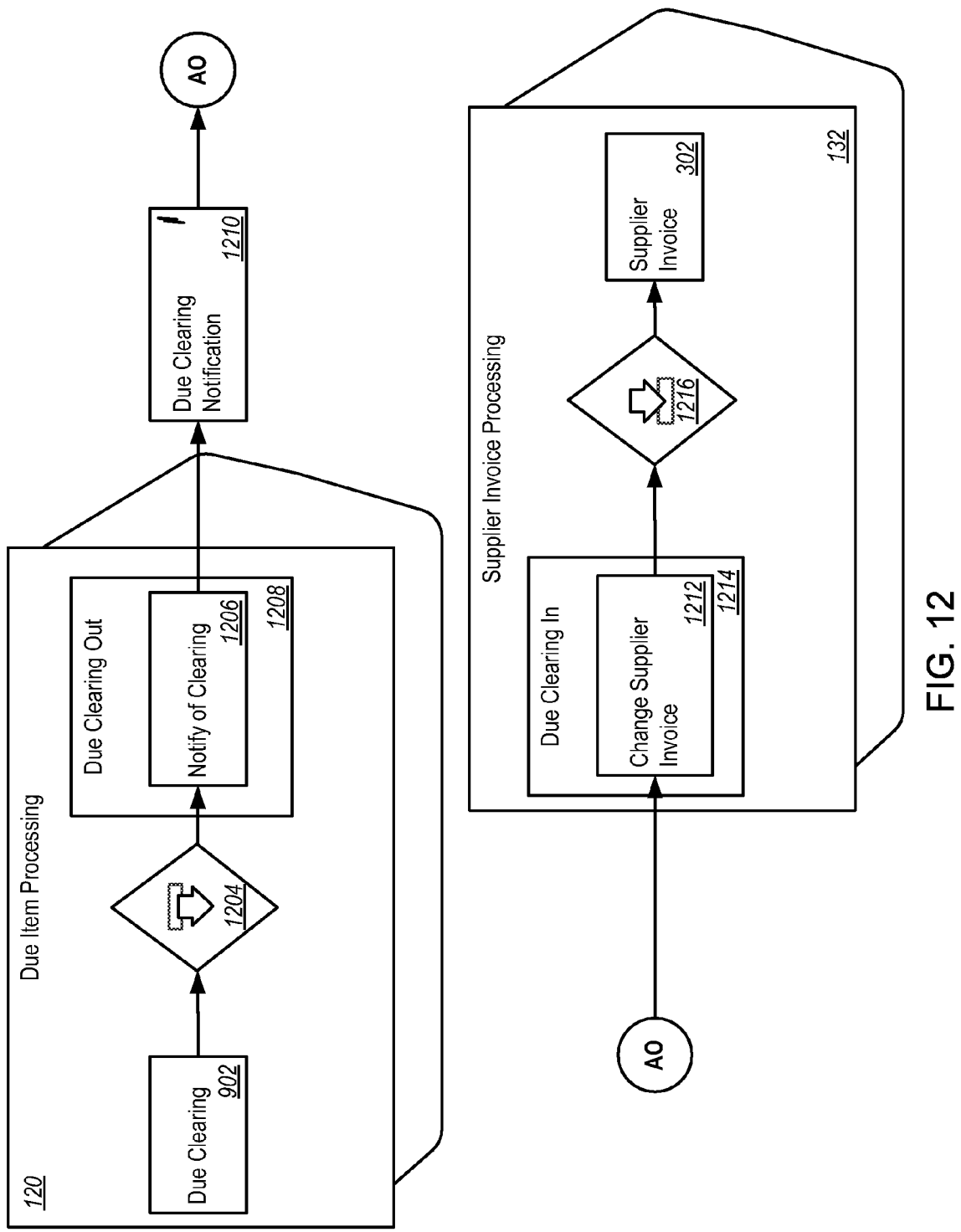
FIG. 12 is a block diagram showing interactions between the Due Item Processing process component and the Supplier Invoice Processing process component.

FIG. 12 is a block diagram showing interactions between the Due Item Processing process component 120 and the Supplier Invoice Processing process component 132 in the architectural design of FIG. 1A-1E. The interaction starts with the notification about a supplier invoice amount that has been cleared.

As shown in FIG. 12, the Due Item Processing process component 120 includes the Due Clearing business object 902. The Due Clearing business object 902 represents a group of receivables and payables for clearing.

The Due Clearing business object 902 uses a Notify of Clearing to Supplier Invoice Processing outbound process agent 1204 to invoke a Notify of Clearing operation 1206. The operation 1206 is included in a Due Clearing Out interface 1208. The Notify of Clearing operation 1206 notifies customer invoice processing about clearing of trade receivables. The operation 1206 sends a Due Clearing Notification message 1210.

A Change Supplier Invoice operation 1212 receives the Due Clearing Notification message 1210. The operation 1212 is included in a Due Clearing In interface 1214. The Change Supplier Invoice operation 1212 changes a supplier invoice based on due clearing. The operation 1212 uses a Change Supplier Invoice based on Due Clearing Notification inbound process agent 1216 to update the Supplier Invoice business object 302. The Supplier Invoice business object 302 represents a company's obligation to pay the supplier for delivered goods and services. For example, if the company returns goods or complains about services, the supplier can issue a credit memo for an amount equal to or lower than the original invoice, and refunds the money to the company. For example, for invoiced goods that require a duty, a customs duty invoice can be submitted by the customs authority, stating a company's obligation to pay tax on the import or export of goods.

Interactions Between Process Components "Customer Quote Processing" and "RFQ Processing at Customer"

Figure 13:
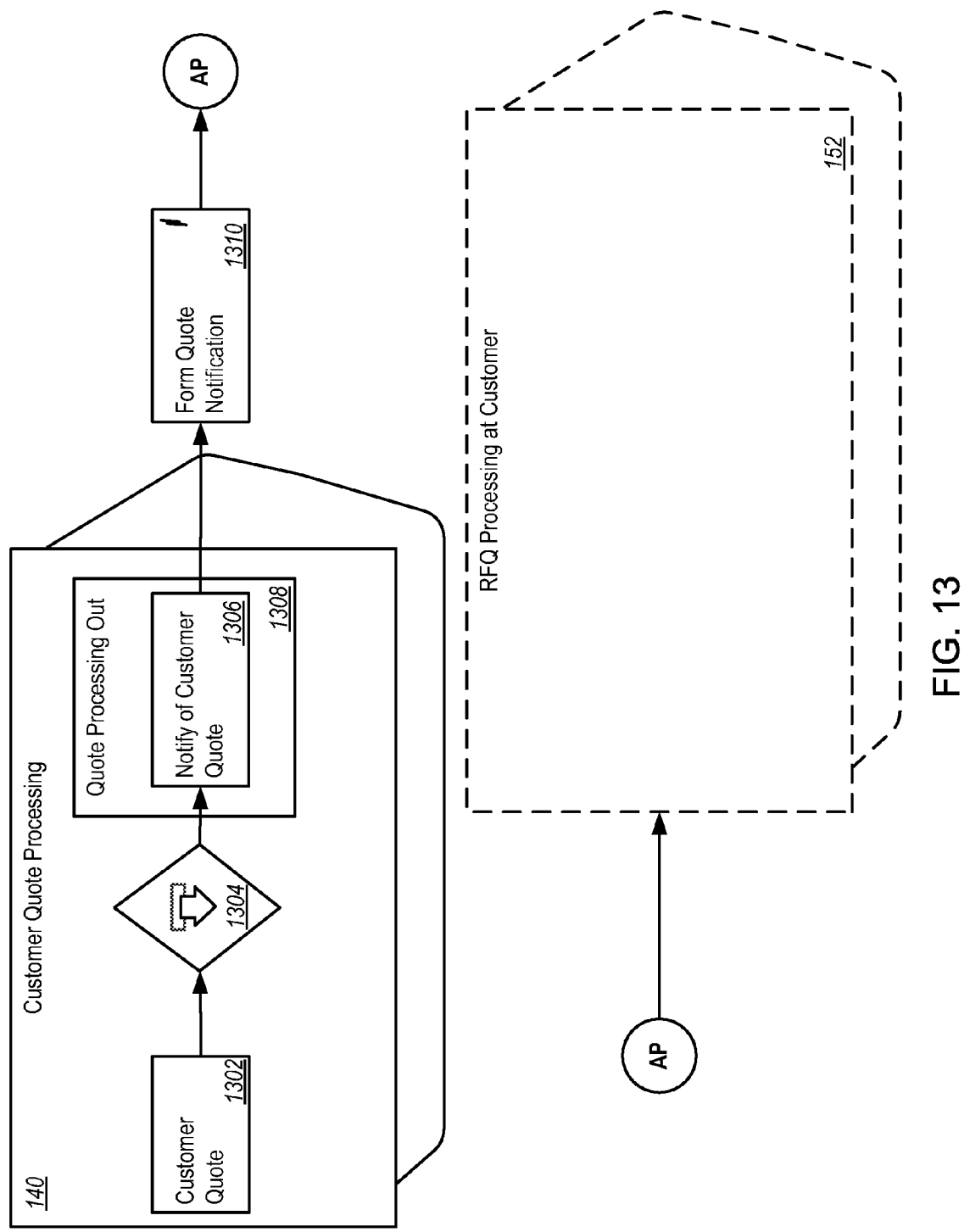
FIG. 13 is a block diagram showing the interactions between a Customer Quote Processing process component and an RFQ Processing at Customer process component.

FIG. 13 is a block diagram showing the interactions between a Customer Quote Processing process component 140 and an RFQ Processing at Customer process component 152 in the architectural design of FIGS. 1A-1E. The interaction starts with the sending of the customer quote by a form output message from the Customer Quote Processing process component 140 to the external purchase order system at a customer.

As shown in FIG. 13, the Customer Quote Processing process component 140 includes a Customer Quote business object 1302. The Customer Quote business object 1302 represents an offer by a seller to a customer for the delivery of goods or services according to fixed terms. The offer can be legally binding for the seller for a specific period of time.

The Customer Quote business object 1302 uses a Notify Customer Quote to Customer outbound process agent 1304 to invoke a Notify of Customer Quote operation 1306. The operation 1306 is included in a Quote Processing Out interface 1308. The Notify of Customer Quote operation 1306 notifies the customer about the customer quote. The operation 1306 generates a Form Quote Notification message 1310. The message 1310 can be sent to the RFQ Processing at Customer process component 152.

Interactions Between Process Components "Accounting Coding Block Distribution Processing" and "Project Processing"

Figure 14:
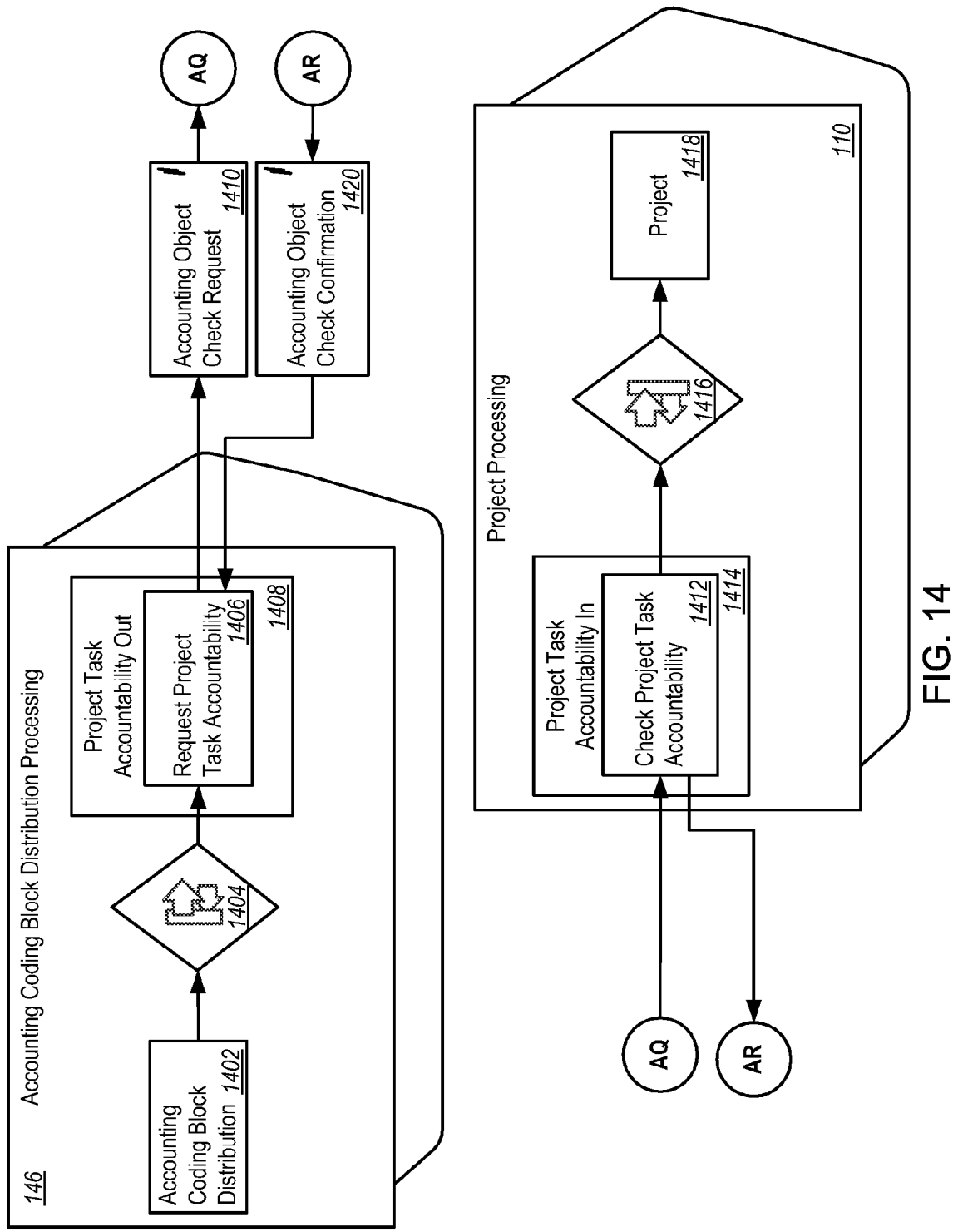
FIG. 14 is a block diagram showing interactions between an Accounting Coding Block Distribution Processing process component and the Project Processing process component.

FIG. 14 is a block diagram showing interactions between an Accounting Coding Block Distribution Processing process component 146 and a Project Processing process component 110 in the architectural design of FIGS. 1A-1E. The interaction starts with the reading of project task accountability information.

As shown in FIG. 14, the Accounting Coding Block Distribution Processing process component 146 includes an Accounting Coding Block Distribution business object 1402. The Accounting Coding Block Distribution business object 1402 represents the distribution of coding blocks to enterprise resources changes, such as expenses or material movements. For example, a coding block is a set of accounting objects to which an enterprise resource change is assigned. The resource change can be valued in accounting.

The Accounting Coding Block Distribution business object 1402 uses a Synchronous Request Project Task Accountability Information outbound process agent 1404 to invoke a Request Project Task Accountability Information operation 1406. The operation 1406 is included in a Project Task Accountability Out interface 1408. The Request Project Task Accountability Information operation 1406 checks the given tasks for existence and availability for expense or resource assignment in financial accounting. The check can occur in the Project Processing process component 110. The Request Project Task Accountability Information operation 1406 sends an Accounting Object Check Request message 1410.

A Check Project Task Accountability operation 1412 receives the Accounting Object Check Request message 1410. The operation 1412 is included in a Project Task Accountability In interface 1414. The Check Project Task Accountability operation 1412 checks whether a task can be posted for accounting. The operation 1412 uses a Synchronous Check Project Task Accountability inbound process agent 1416 to update a Project business object 1418. The Project business object 1418 represents a business undertaking with a defined goal that is to be attained in a specified time frame. For example, the business undertaking can be achieved using predefined funds and planned resources, while reaching an agreed quality level. The project can be characterized by the fact that it is unique and that it involves an element of risk.

The Check Project Task Accountability operation 1412 generates an Accounting Object Check Confirmation message 1420. The Request Project Task Accountability Information operation 1406 receives the Accounting Object Check Confirmation message 1420. The message 1420 is a confirmation about the existence of one or more accounting objects and whether they are permitted for assignment.

Interactions Between Process Components "Customer Project Invoice Preparation" and "Customer Invoice Processing"

Figure 15:
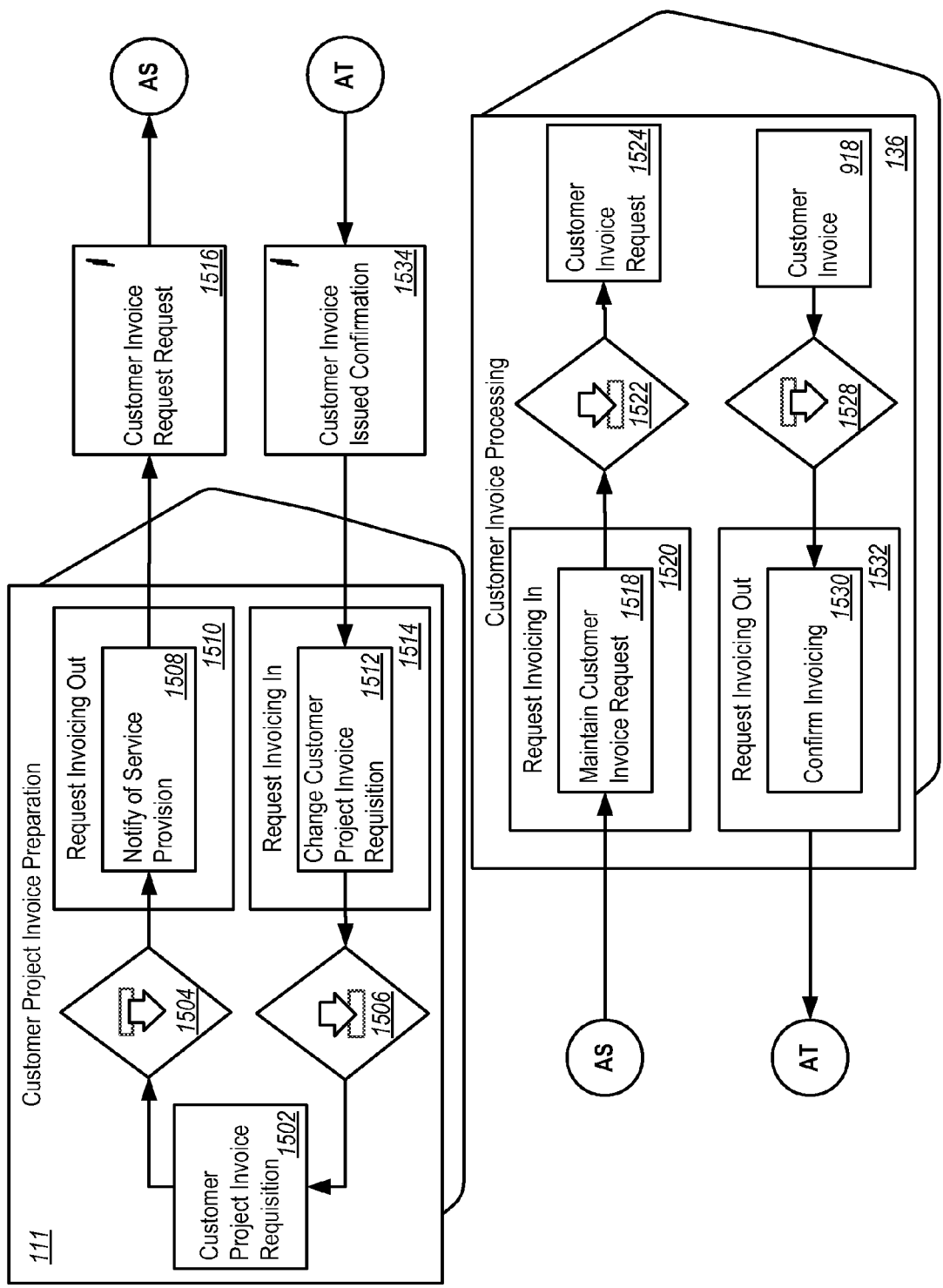
FIG. 15 is a block diagram showing interactions between a Customer Project Invoice Preparation process component and the Customer Invoice Processing process component.

FIG. 15 is a block diagram showing interactions between a Customer Project Invoice Preparation process component 111 and a Customer Invoice Processing process component 136 in the architectural design of FIGS. 1A-1E. The interaction starts with the requesting of the creation, update or cancellation of invoices from the Customer Invoice Processing process component 136. The Customer Invoice Processing process component 136 can confirm the performed action to the requester.

As shown in FIG. 15, the Customer Project Invoice Requisition process component 111 includes a Customer Project Invoice Requisition business object 1502. The Customer Project Invoice Requisition business object 1502 represents an offer by a seller to a customer for the delivery of goods or services according to fixed terms. The offer can be legally binding for the seller for a specific period of time.

The Customer Project Invoice Requisition business object 1502 uses a Request Invoicing from Customer Project Invoice Requisition to Customer Invoice Processing outbound process agent 1504 to invoke a Request Invoicing operation 1508. The Request Invoicing operation 1508 requests the creation of a customer invoice request or updates a customer invoice request previously created. The Request Invoicing operation 1508 is included in a Request Invoicing Out interface 1510. The operation 1508 sends a Customer Invoice Request message 1516.

A Maintain Customer Invoice Request operation 1518 receives the Customer Invoice Request message 1516. The operation 1518 creates, updates, or cancels a customer invoice request. The Maintain Customer Invoice Request operation 1518 is included in a Request Invoicing In interface 1520.

The Maintain Customer Invoice Request operation 1518 uses a Maintain Customer Invoice Request inbound process agent 1522 to update a Customer Invoice Request business object 1524. The Customer Invoice Request business object 1524 represents a request to create one or several customer invoices, or to take account of the data for the underlying business document when creating a customer invoice.

The Customer Invoice business object 918 uses a Confirm Customer Invoice to Customer Project Invoice Preparation outbound process agent 1524 to invoke a Confirm Invoicing operation 1530. The Customer Invoice business object 918 represents a binding statement of amounts receivable resulting, for example, from deliveries to a customer, services performed for a customer, adjustments to these receivables, or credit memos to a customer. The Confirm Invoicing operation 1530 confirms that invoicing has taken place. The operation 1530 is included in a Request Invoicing Out interface 1532. The Confirm Invoicing operation 1530 sends a Customer Invoice Issued Confirmation message 1534 to the Customer Project Invoice Preparation process component 111.

The message 1534 is received in a Change Customer Project Invoice Requisition based on Customer Invoice operation 1512. The Change Customer Project Invoice Requisition based on Customer Invoice operation 1512 confirms that a customer invoice based on a customer project invoice requisition was created or cancelled. The operation 1512 is included in a Request Invoicing In interface 1514. The Change Customer Project Invoice Requisition based on Customer Invoice operation 1512 uses a Change Customer Project Invoice Requisition based on Customer Invoice inbound process agent 1506 to update the Customer Project Invoice Requisition business object 1502.

Interactions Between Process Components "Project Processing" and "Purchase Request Processing"

Figure 16:
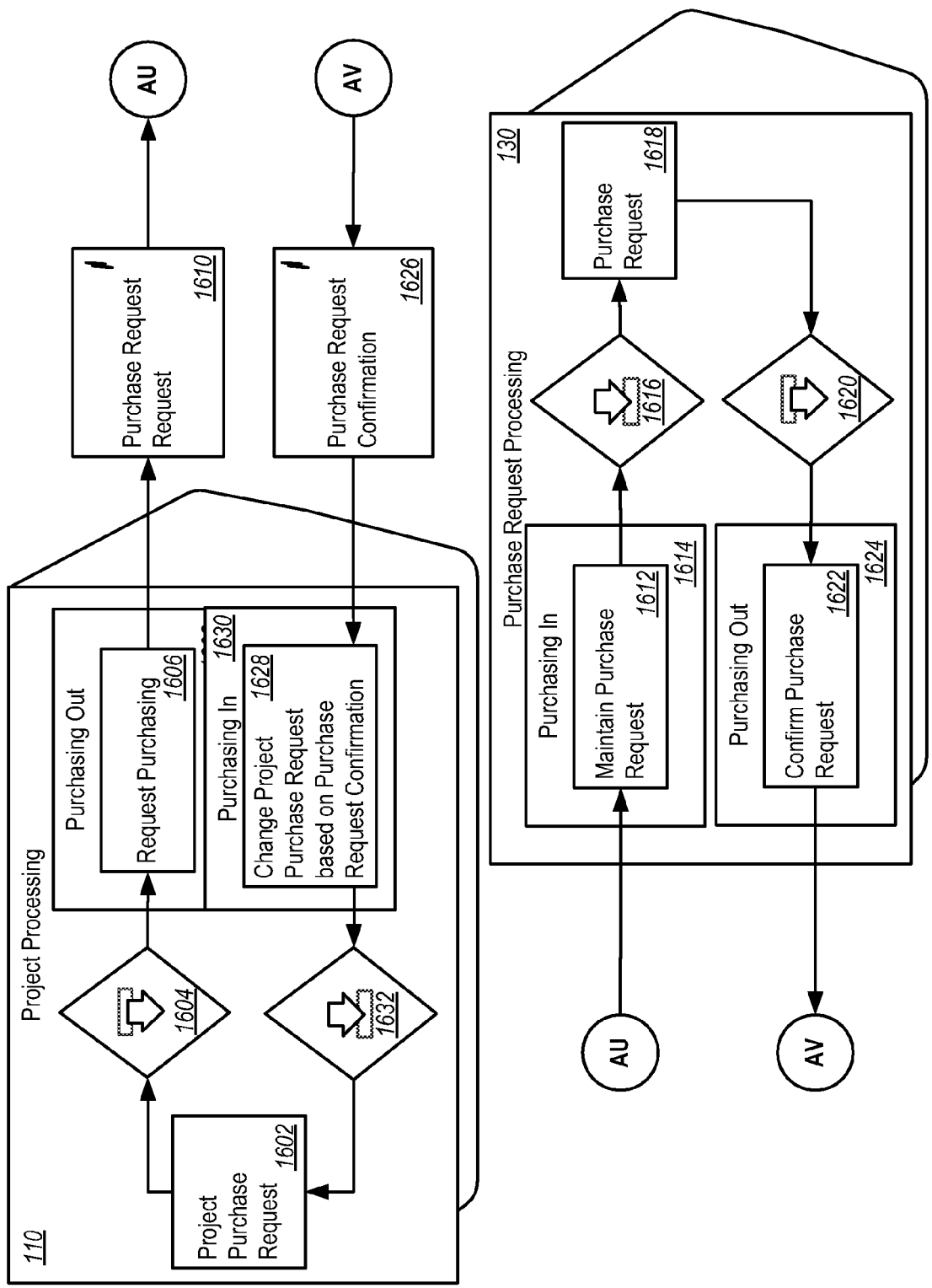
FIG. 16 is a block diagram showing interactions between the Project Processing process component and a Purchase Request Processing process component.

FIG. 16 is a block diagram showing interactions between a Project Processing process component 110 and a Purchase Request Processing process component 130 in the architectural design of FIGS. 1A-1E. The interaction starts with the requesting of the creation of a purchase request, triggered by the Project Processing process component 110. The Purchase Request Processing process component 130 reports the creation of the purchase request back to the Project Processing process component 110.

As shown in FIG. 16, the Project Processing process component 110 includes a Project Purchase Request business object 1602. The Project Purchase Request business object 1602 represents the requesting of the creation of a purchase request, triggered by the Project Processing process component 110. The Purchase Request Processing process component 130 reports the creation of the purchase request back to the Project Processing process component 110.

The Project Purchase Request business object 1602 uses a Request Purchasing from Project Purchase Request to Purchase Request Processing outbound process agent 1604 to invoke a Request Purchasing operation 1606. The Request Purchasing operation 1606 requests that a purchaser procure services externally for a project. The Request Purchasing operation 1606 is included in a Purchasing Out interface 1608. The operation 1606 sends a Purchase Request message 1610 to the Purchase Request Processing process component 130.

A Maintain Purchase Request operation 1612 receives the Purchase Request message 1610. The operation 1612 creates or updates a purchase request. The Maintain Purchase Request operation 1612 is included in a Purchasing In interface 1614. The operation 1612 uses a Maintain Purchase Request inbound process agent 1616 updates a Purchase Request business object 1618. The Purchase Request business object 1618 represents a request or instruction to the purchasing department to purchase specified goods or services in specified quantities at a specified price within a specified time.

The Purchase Request business object 1618 uses a Confirm Purchase Request outbound process agent 1620 to invoke a Confirm Purchase Request operation 1622. The Confirm Purchase Request operation 1622 confirms the creation, change, or cancellation of a purchase request to the requestor. The operation 1622 is included in a Purchasing Out interface 1624. The Confirm Purchase Request operation 1622 sends a Purchase Request Confirmation message 1626.

The Purchase Request Confirmation message 1626 is received in a Change Project Purchase Request based on Purchase Request Confirmation operation 1628. The Change Project Purchase Request based on Purchase Request Confirmation operation 1628 changes the project purchase request based on a confirmation from purchasing about the degree to which a request has been fulfilled. The operation 1628 is included in a Purchasing In interface 1630. The Change Project Purchase Request based on Purchase Request Confirmation operation 1628 uses a Change Project Purchase Request based on Purchase Request Confirmation inbound process agent 1632 to update the Project Purchase Request business object 1602.

Interactions Between Process Components "Customer Invoice Processing" and "Balance of Foreign Payment Management"

Figure 17:
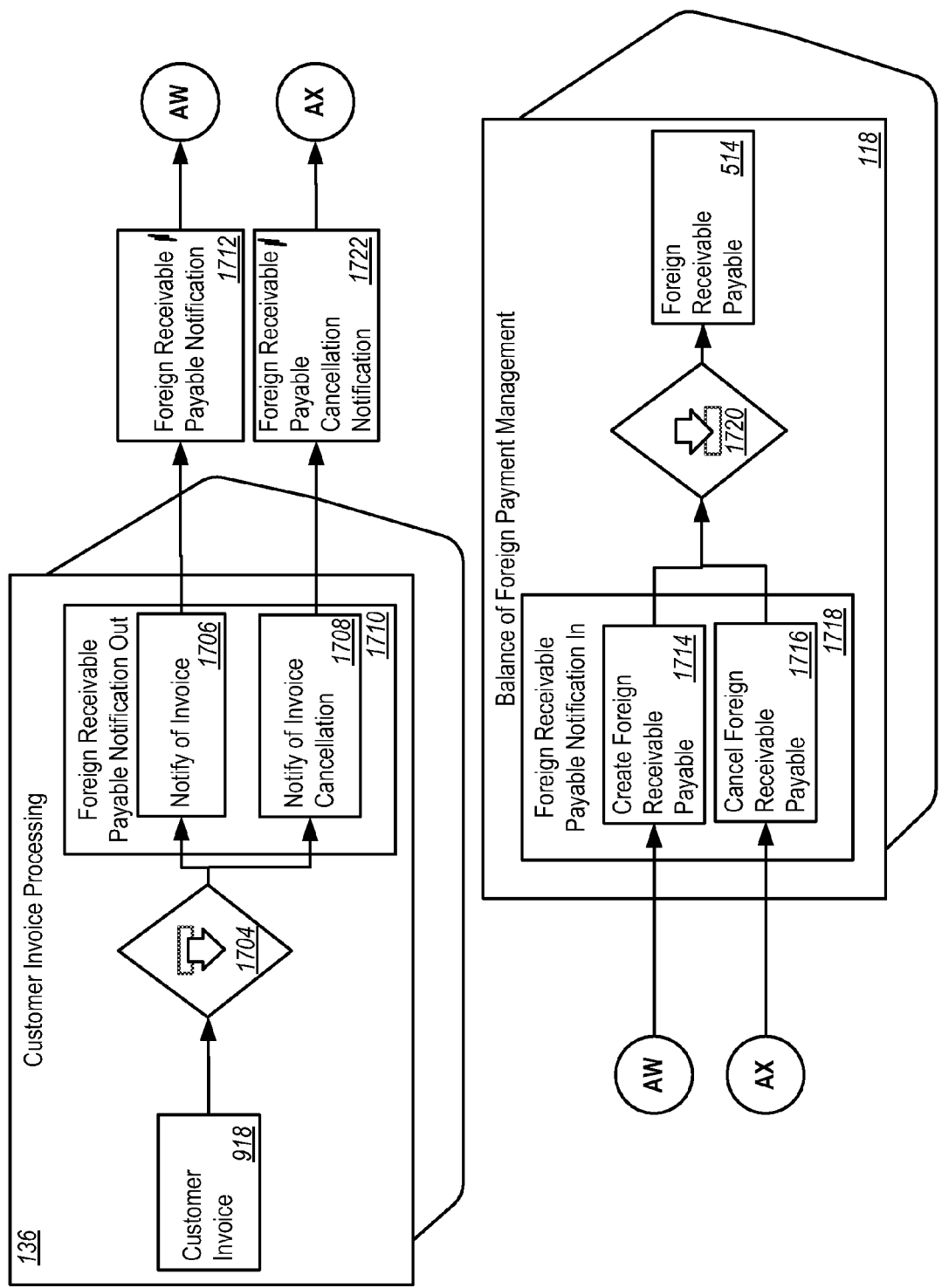
FIG. 17 is a block diagram showing interactions between the Customer Invoice Processing process component and the Balance of Foreign Payment Management process component.

FIG. 17 is a block diagram showing interactions between the Customer Invoice Processing process component 136 and the Balance of Foreign Payment Management process component 118 in the architectural design of FIGS. 1A-1E. The interaction starts with the notification of the Balance of Foreign Payment Management process component 118 about the creation or cancellation of a receivable (customer invoice) related to a non-resident buyer in the Customer Invoice Processing process component 136.

As shown in FIG. 17, the Customer Invoice Processing process component 136 includes the Customer Invoice business object 918. The Customer Invoice business object 918 represents a binding statement of amounts receivable resulting, for example, from deliveries to a customer, services performed for a customer, adjustments to these receivables, or credit memos to a customer.

The Customer Invoice business object 918 uses a Notify of Customer Invoice to Balance of Foreign Payments Management outbound process agent 1704 to invoke a Notify of Invoice operation 1706 or a Notify of Invoice Cancellation operation 1708. The Notify of Invoice operation 1706 informs the Customer Invoice Processing process component 136 about an invoice in order to track a receivable from or a payable to a non-resident business partner. The Notify of Invoice Cancellation operation 1708 informs the Customer Invoice Processing process component 136 about the cancellation of an invoice in order to also cancel information about a receivable from or a payable to a non-resident business partner. The operations 1706 and 1708 are included in a Foreign Receivable Payable Notification out interface 1710. The Notify of Invoice operation 1706 sends a Foreign Receivable Payable Notification message 1712 to the Balance of Foreign Payment Management process component 118.

A Create Foreign Receivable Payable operation 1714 receives the message 1712. The Create Foreign Receivable Payable operation 1714 creates a receivable or payable from a foreign trade. The Create Foreign Receivable Payable operation 1714 is included in a Foreign Receivable Payable Notification In interface 1718. The operation 1714 uses a Maintain Foreign Receivable Payable inbound process agent 1720 to update the Foreign Receivable Payable business object 514. The Foreign Receivable Payable business object 514 represents a receivable from or a payable to a non-resident business partner. The Notify of Invoice Cancellation operation 1708 sends a Foreign Receivable Payable Cancellation Notification message 1722.

A Cancel Foreign Receivable Payable operation 1716, in the Foreign Receivable Payable Notification In interface 1718, receives the Foreign Receivable Payable Cancellation Notification message 1722. The Cancel Foreign Receivable Payable operation 1716 creates a receivable or a payable from foreign trade. The operation 1716 uses the Maintain Foreign Receivable Payable inbound process agent 1720 to update the Foreign Receivable Payable business object 514.

Interactions Between Process Components "Purchase Order Processing" and "Sales Order Processing at Supplier"

Figure 18:
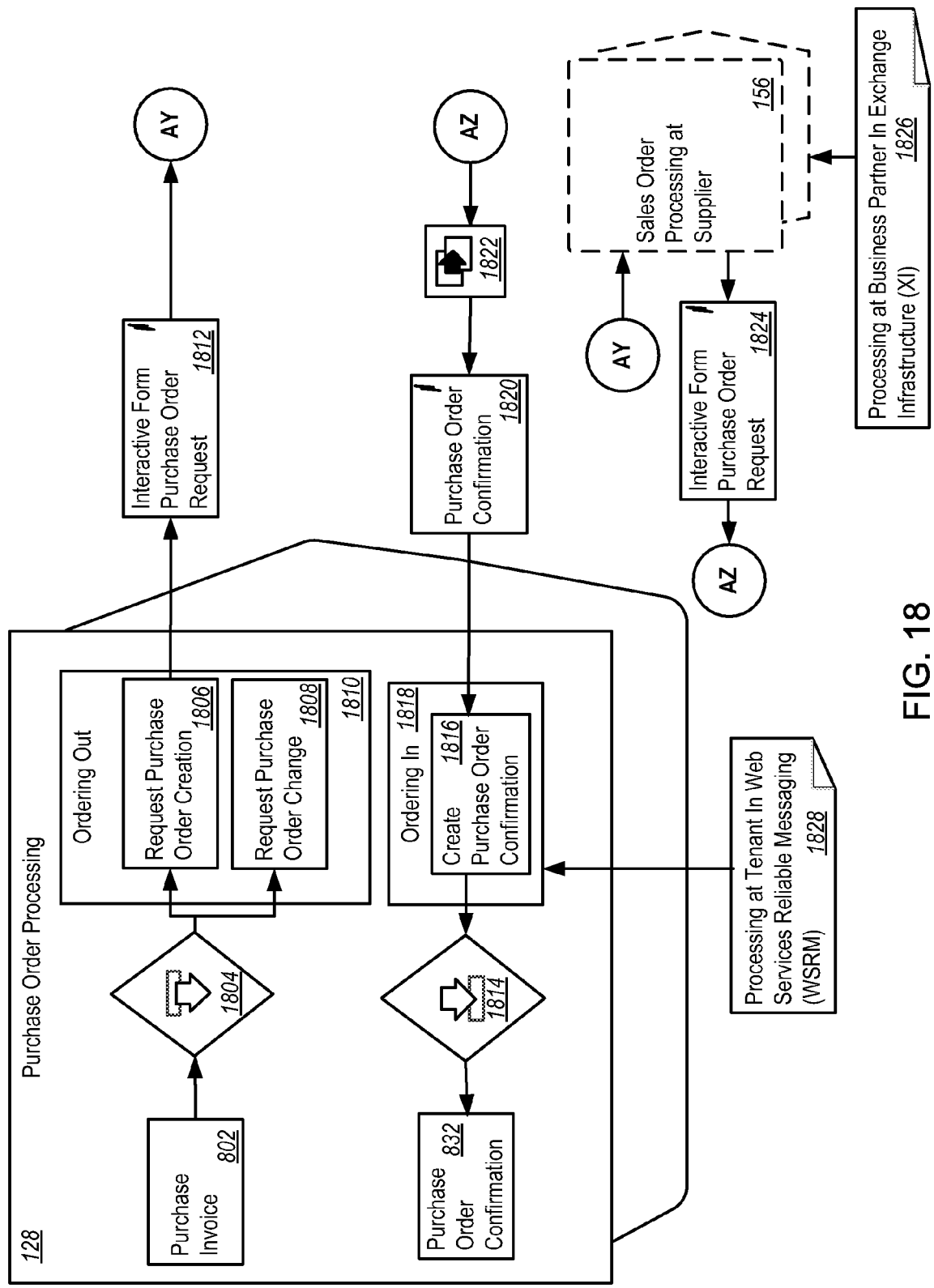
FIG. 18 is a block diagram showing interactions between the Purchase Order Processing process component and a Sales Order Processing at Supplier process component.

FIG. 18 is a block diagram showing interactions between the Purchase Order Processing process component 128 and a Sales Order Processing at Supplier process component 156 in the architectural design of FIGS. 1A-1E. The interaction starts with the requesting of the creation, update, or cancellation of a sales order in the external sales order processing system of the supplier, and the subsequent requesting of the creation, update, or cancellation of a purchase order confirmation in the Purchase Order Processing process component 128 using interactive forms.

As shown in FIG. 18, the Purchase Order Processing process component 128 includes the Purchase Order business object 802. The Purchase Order business object 802 represents a request from a buyer to a seller to deliver a specified quantity of material, or perform a specified service, at a specified price within a specified time.

The Purchase Order business object 802 uses a Request Purchase Order to Supplier outbound process agent 1804 to invoke a Request Purchase Order Creation operation 1806. The operation 1806 is included in an Ordering Out interface 1810. The Request Purchase Order Creation operation 1806 requests sales order processing at the supplier to process a new purchase order. The operation 1806 sends an Interactive Form Purchase Order Confirmation message 1812.

The Purchase Order business object 802 uses the Request Purchase Order to Supplier outbound process agent 1804 to invoke a Request Purchase Order Change operation 1808. The operation 1808 is included in the Ordering Out interface 1810. The Request Purchase Order Change operation 1808 requests sales order processing at the supplier to change a previously sent purchase order. The operation 1808 sends an Interactive Form Purchase Order Confirmation message 1812.

The Sales Order Processing at Supplier process component 156 generates an Interactive Form Purchase Order Request message 1824. The message 1824 is an additional message type to enable interactive data entry in a purchase order request. The Interactive Form Purchase Order Request message 1824 uses a Mapping Entity 1822 to transform the form-based message type to a Purchase Order Confirmation message 1820 that can be received by a Create Purchase Order Confirmation operation 1816. The message 1820 is a confirmation, partial confirmation, or a change about the requested (or cancelled) delivery of goods or provision of services, sent from the seller to the buyer.

The Create Purchase Order Confirmation operation 1816 uses a Create Purchase Order Confirmation inbound process agent 1814 to update the Purchase Order Confirmation business object 832. The operation 1816 creates a purchase order confirmation based on the supplier's response to a purchase order. The Create Purchase Order Confirmation operation 1816 is included in an Ordering In interface 1816. The Purchase Order Confirmation business object 832 represents a confirmation from a seller to deliver a specified quantity of goods, or perform a specified service, at a specified price within a specified time.

The Purchase Order Processing process component 128 sends information to the Sales Order Processing at Supplier process component 156 using a Processing at Tenant In Web Services Reliable Messaging (WSRM) communication channel template 1828. The communication channel template 1828 can define protocols and parameters used for communication with an external party.

The Sales Order Processing at Supplier process component 156 receives information from a Processing at Business Partner In Exchange Infrastructure (XI) communication channel template 1826. The communication channel template 1826 can define protocols and parameters used for communication with an external party.

Interactions Between Process Components "Pricing Engine" and "External Tax Calculation"

Figure 19:
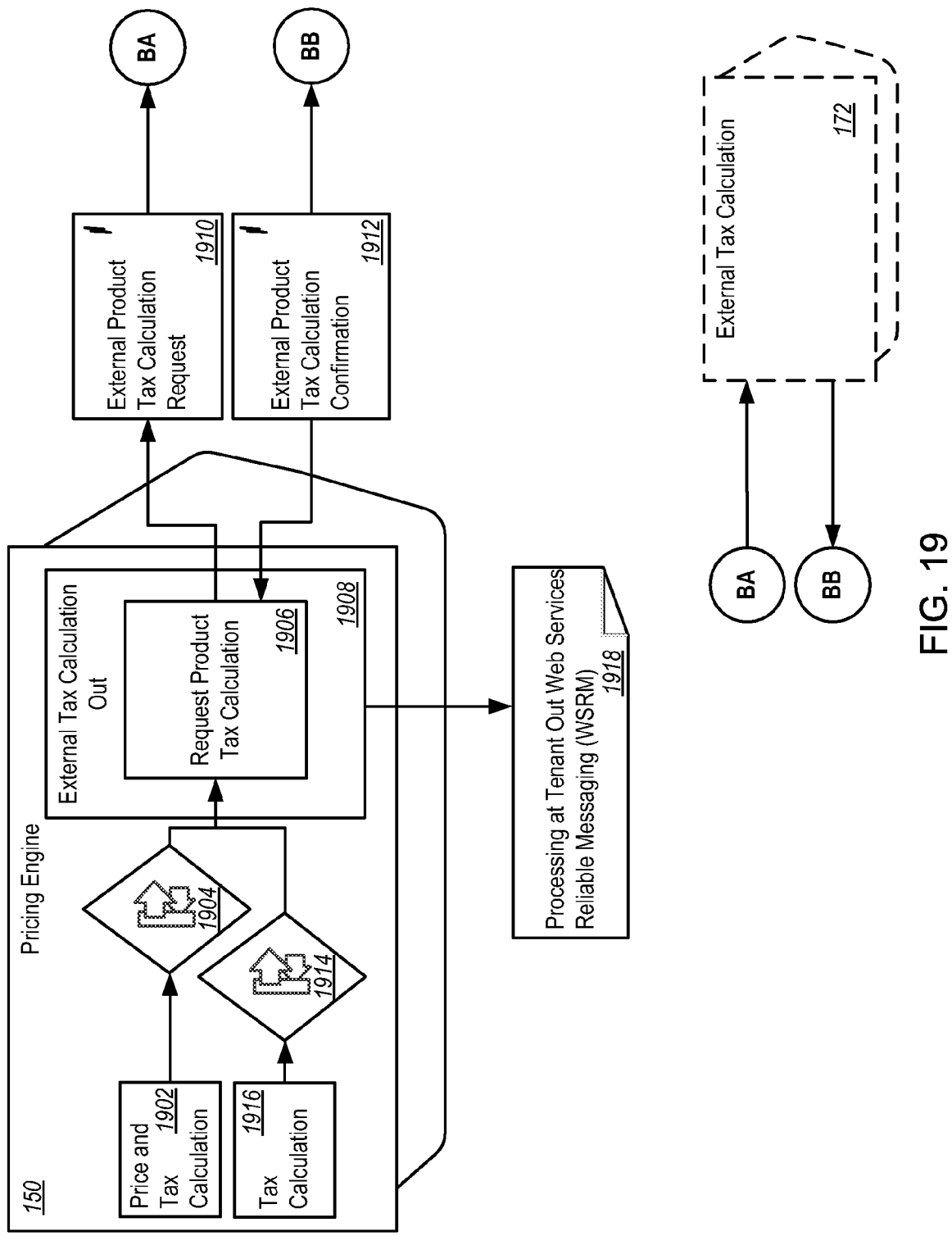
FIG. 19 is a block diagram showing interactions between a Pricing Engine process component and an External Tax Calculation process component.

FIG. 19 is a block diagram showing interactions between a Pricing Engine process component 150 and an External Tax Calculation process component 172 in the architectural design of FIGS. 1A-1E. The interaction starts with the requesting of a tax calculation from the External Tax Calculation process component 172.

As shown in FIG. 19, the Pricing Engine process component 150 includes a Price and Tax Calculation business object 1902. The Price and Tax Calculation business object 1902 represents the summary of the determined price and tax components for a business case.

The Price and Tax Calculation business object 1902 uses a Synchronous Request Product Tax Calculation from Price and Tax Calculation to External Tax Calculation outbound process agent 1904 to invoke a Request Product Tax Calculation operation 1906. The operation 1906 is included in an External Tax Calculation Out interface 1908. The Request Product Tax Calculation operation 1906 requests product tax calculation from an external tax calculation system. The operation 1906 sends an External Product Tax Calculation Request message 1910. The External Tax Calculation process component 172 receives the External Product Tax Calculation Request message 1910.

The External Tax Calculation process component 172 sends an External Product Tax Calculation Confirmation message 1912 to the Request Product Tax Calculation operation 1906. A Tax Calculation business object 1916 uses a Synchronous Request Product Tax Calculation from Tax Calculation to External Tax Calculation outbound process agent 1914 to invoke the Request Product Tax Calculation operation 1906.

The Pricing Engine process component 150 receives information from a Processing at Tenant Out Web Services Reliable Messaging (WSRM) communication channel template 1918. The communication channel template 1918 can define protocols and parameters used for communication with an external party.

Interactions Between Process Components "Time and Labor Management" and "Accounting"

Figure 20:
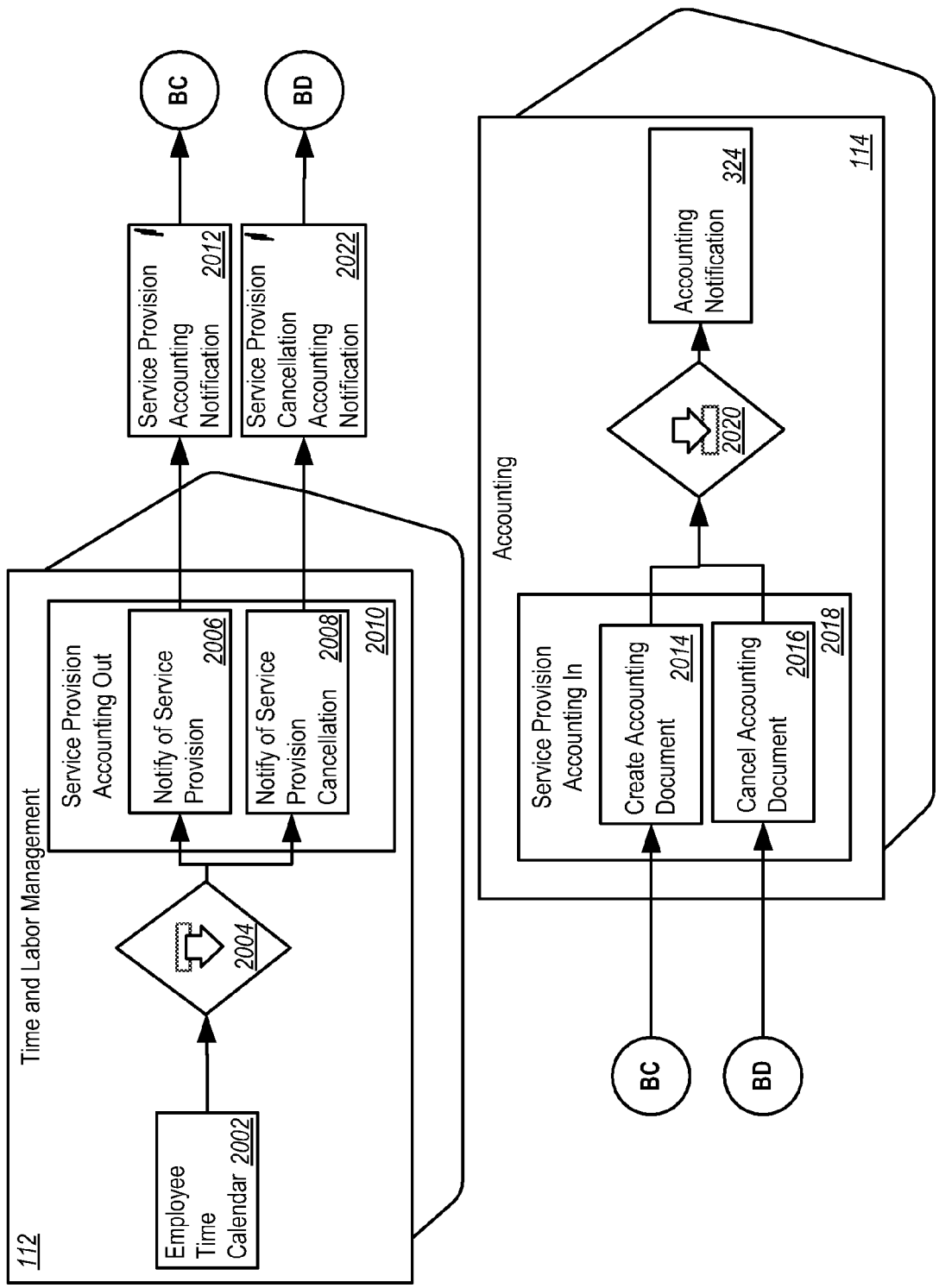
FIG. 20 is a block diagram showing interactions between a Time and Labor Management process component and the Accounting process component.

FIG. 20 is a block diagram showing interactions between a Time and Labor Management process component 112 and the Accounting process component 114 in the architectural design of FIGS. 1A-1E. The interaction starts with the notification from the Accounting process component 114 when accounting-relevant data about a service provided for a project by an employee is created or cancelled. For example, the updated data can be written to the employee time calendar, triggering the request to create or cancel accounting documents.

As shown in FIG. 20, the Time and Labor Management process component 112 includes an Employee Time Calendar business object 2002. The Employee Time Calendar business object 2002 represents a read-only calendar representation of time valuation results that are derived from the recorded times of an employee.

The Employee Time Calendar business object 2002 uses a Notify of Service Provision from Employee Time Calendar to Accounting outbound process agent 2004 to invoke a Notify of Service Provision operation 2006 or a Notify of Service Provision Cancellation operation 2008. The Notify of Service Provision operation 2006 notifies accounting of a service provision. For example, this notification is sent when an active employee time that contains information relevant for accounting is created. The Notify of Service Provision Cancellation operation 2008 notifies accounting of the cancellation of a service provision. For example, this notification is sent when an active employee time that contains information relevant for accounting is cancelled. The operations 2006 and 2008 are included in a Service Provision Accounting Out interface 2010. The Notify of Service Provision operation 2006 sends a Service Provision Accounting Notification message 2012.

A Create Accounting Document operation 2014 receives the message 2012. The Create Accounting Document operation 2014 creates an accounting document based on resource consumption data received from a Production process component, a Service Request Processing process component, a Service Confirmation Processing process component, a Time and Labor Management process component, or a Project Processing process component. For example, the received data is first converted into an accounting notification from which one or more accounting documents are created according to the relevant sets of books. The Create Accounting Document operation 2014 is included in a Service Provision Accounting In interface 2018. The operation 2014 uses a Maintain Accounting Document based on Service Provision inbound process agent 2020 to update the Accounting Notification business object 324. The Accounting Notification business object 324 represents a notification sent to financial accounting by an operational component regarding a business transaction. For example, it represents this operational business transaction in a standardized form for all business transaction documents and contains the data needed to valuate the business transaction.

The Notify of Service Provision Cancellation operation 2008 sends a Service Provision Cancellation Accounting Notification message 2022. A Cancel Accounting Document operation 2016, in the Service Provision Accounting In interface 2018, receives the Service Provision Cancellation Accounting Notification message 2022 from the Time and Labor Management process component 112. The Cancel Accounting Document operation 2016 cancels an existing accounting document based on cancellation data received from a Production process component, a Service Request Processing process component, a Service Confirmation Processing process component, a Time and Labor Management process component, or a Project Processing process component. For example, the received data is converted into an accounting notification from which one or more reversal accounting documents are created according to the relevant sets of books. The operation 2016 uses the Maintain Accounting Document based on Service Provision inbound process agent 2020 to update the Accounting Notification business object 324.

Interactions Between Process Components "Purchase Request Processing" and "Project Processing"

Figure 21:
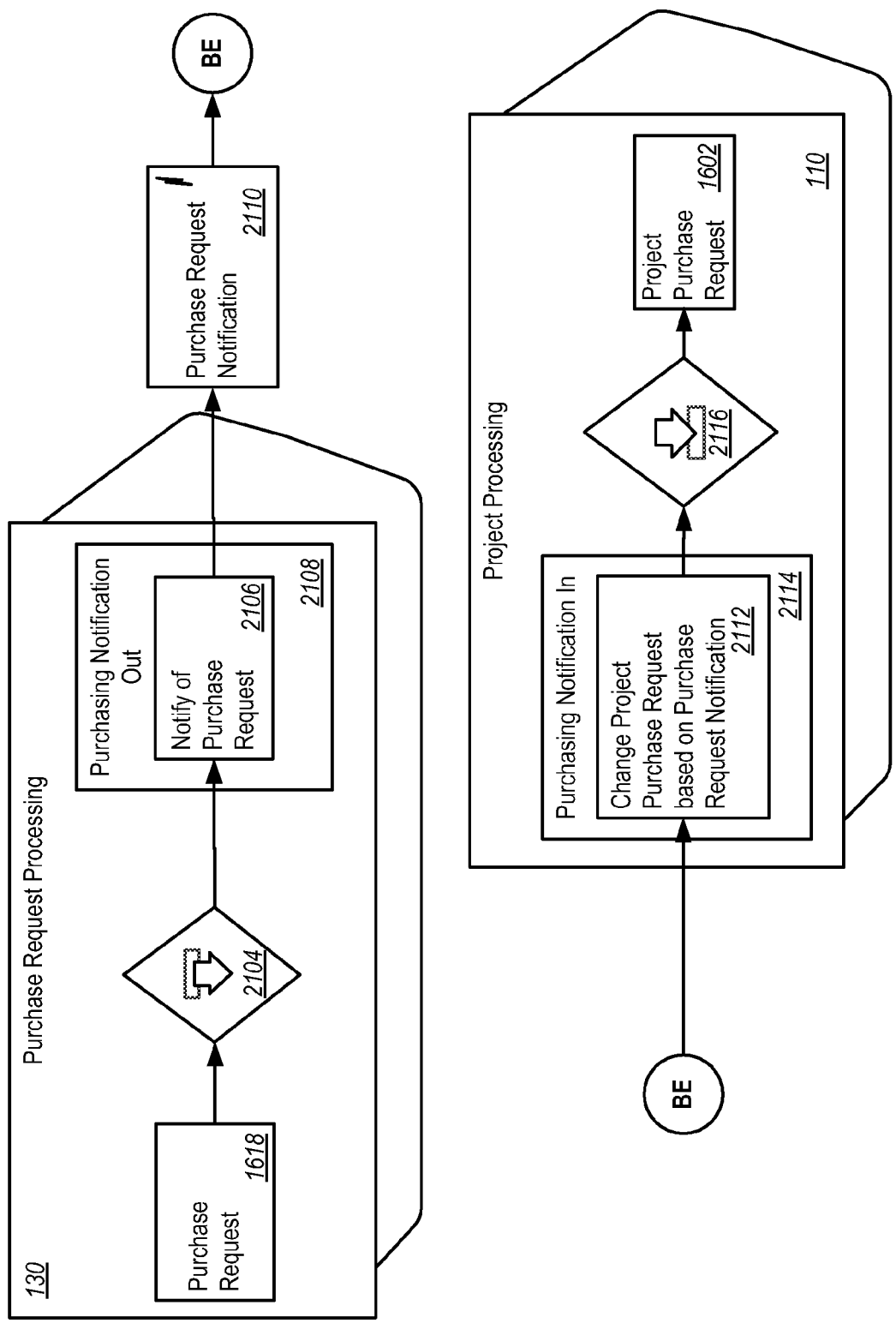
FIG. 21 is a block diagram showing interactions between the Purchase Request Processing process component and the Project Processing process component.

FIG. 21 is a block diagram showing interactions between the Purchase Request Processing process component 130 and the Project Processing process component 110 in the architectural design of FIGS. 1A-1E. The interaction starts with the notification of the Project Processing process component 110 about the creation or change of a purchase request that is assigned to a project.

As shown in FIG. 21, the Purchase Request Processing process component 130 includes the Purchase Request business object 1618. The Purchase Request business object 1618 represents the requesting of the creation of a purchase request, triggered by the Project Processing process component 110.

The Purchase Request business object 1618 uses a Notify of Purchase Request to Project Processing outbound process agent 2104 to invoke a Notify of Purchase Request operation 2106. The operation 2106 is included in a Purchasing Notification Out interface 2108. The Notify of Purchase Request operation 2106 notifies a project about a purchase request with project account assignment. In some implementations, this purchase request may not be initiated by the Project Processing process component 110. The operation 2106 sends a Purchase Request Notification message 2110 to the Project Processing process component 110.

A Change Project Purchase Request based on Purchase Request Notification operation 2112 receives the Purchase Request Notification message 2110. The operation 2112 is included in a Purchasing Notification In interface 2114. The Change Project Purchase Request based on Purchase Request Notification operation 2112 changes the project purchase request based on a notification about the creation of a new purchase request or a change to an existing purchase request. The operation 2112 uses a Change Project Purchase Request based on Purchase Request Notification inbound process agent 2116 to update the Project Purchase Request business object 1602. The Project Purchase Request business object 1602 represents a request or instruction to the purchasing department to purchase specified goods or services in specified quantities at a specified price within a specified time.

Interactions Between Process Components "Time and Labor Management" and "Project Processing"

Figure 22:
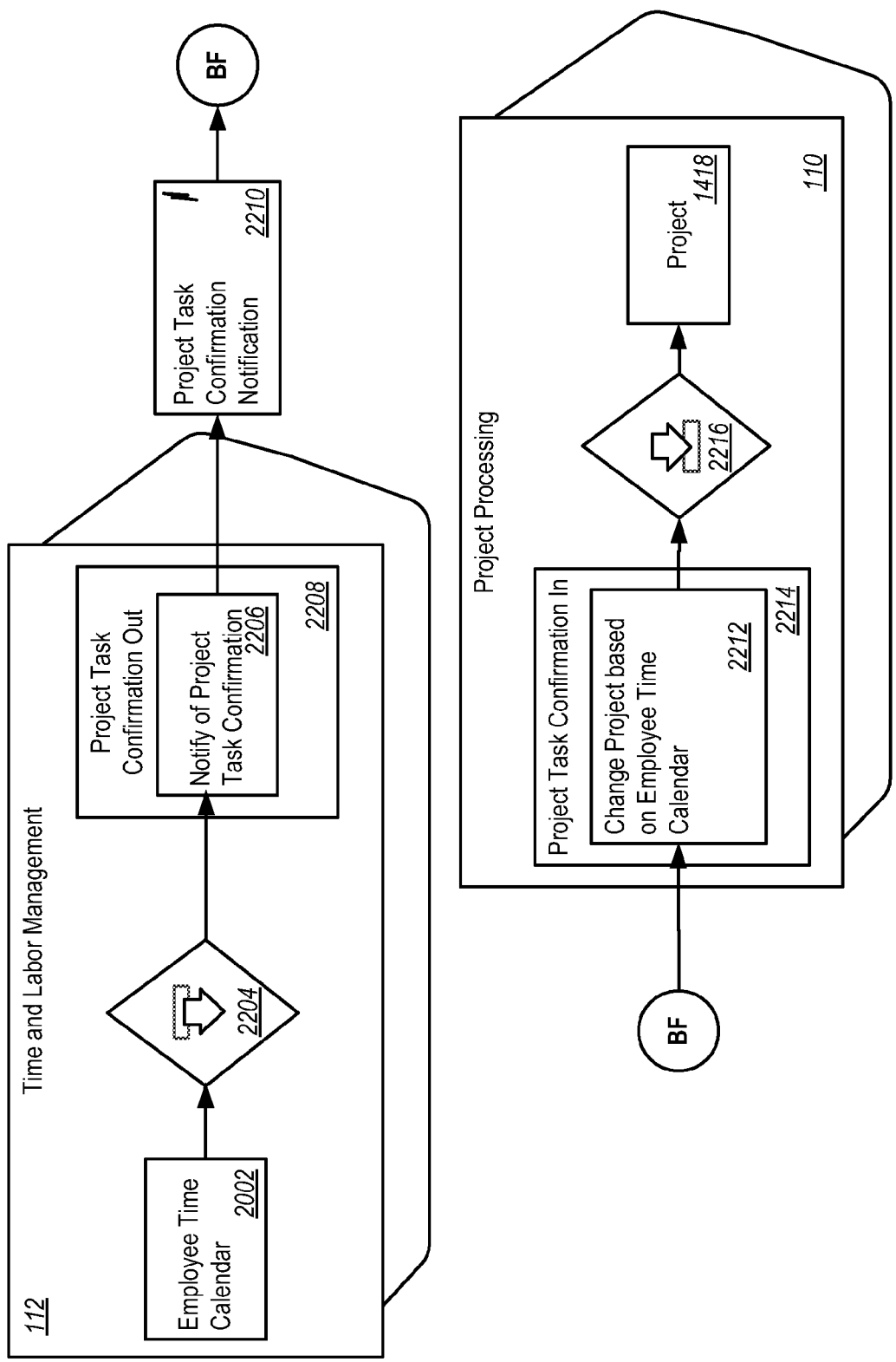
FIG. 22 is a block diagram showing interactions between the Time and Labor Management process component and the Project Processing process component.

FIG. 22 is a block diagram showing interactions between the Time and Labor Management process component 112 and the Project Processing process component 110 in the architectural design of FIGS. 1A-1E. The interaction starts with the notification of the Project Processing process component 110 when data pertaining to a project confirmation is created or cancelled and subsequently written to the employee time calendar.

As shown in FIG. 22, the Time and Labor Management process component 112 includes an Employee Time Calendar business object 2002. The Employee Time Calendar business object 2002 represents a read-only calendar representation of time valuation results that are derived from the recorded times of an employee.

The Employee Time Calendar business object 2002 uses a Notify of Project Task Confirmation from Employee Time Calendar to Project Processing outbound process agent 2204 to invoke a Notify of Project Task Confirmation operation 2206. The operation 2206 is included in a Project Task Confirmation Out interface 2208. The Notify of Project Task Confirmation operation 2206 notifies the Project Processing process component of a project task confirmation or a project task status change. For example, this notification is sent when project-relevant information is created, changed, or cancelled in an active employee time. The operation 2206 generates a Project Task Confirmation Notification message 2210.

A Change Project based on Employee Time Calendar operation 2212 receives the Project Task Confirmation Notification message 2210. The operation 2212 is included in a Project Task Confirmation In interface 2214. The Change Project based on Employee Time Calendar operation 2212 updates a project based on confirmations or cancellations of actual work for project tasks. The operation 2212 uses a Change Project based on Employee Time Calendar inbound process agent 2216 to update the Project business object 1418. The Project business object 1418 represents a business undertaking with a defined goal that is to be attained in a specified time frame. For example, the business undertaking can be achieved using predefined funds and planned resources, while reaching an agreed quality level. The project can be characterized by the fact that it is unique and that it involves an element of risk.

Interactions Between Process Components "Expense and Reimbursement Management" and "Accounting"

Figure 23:
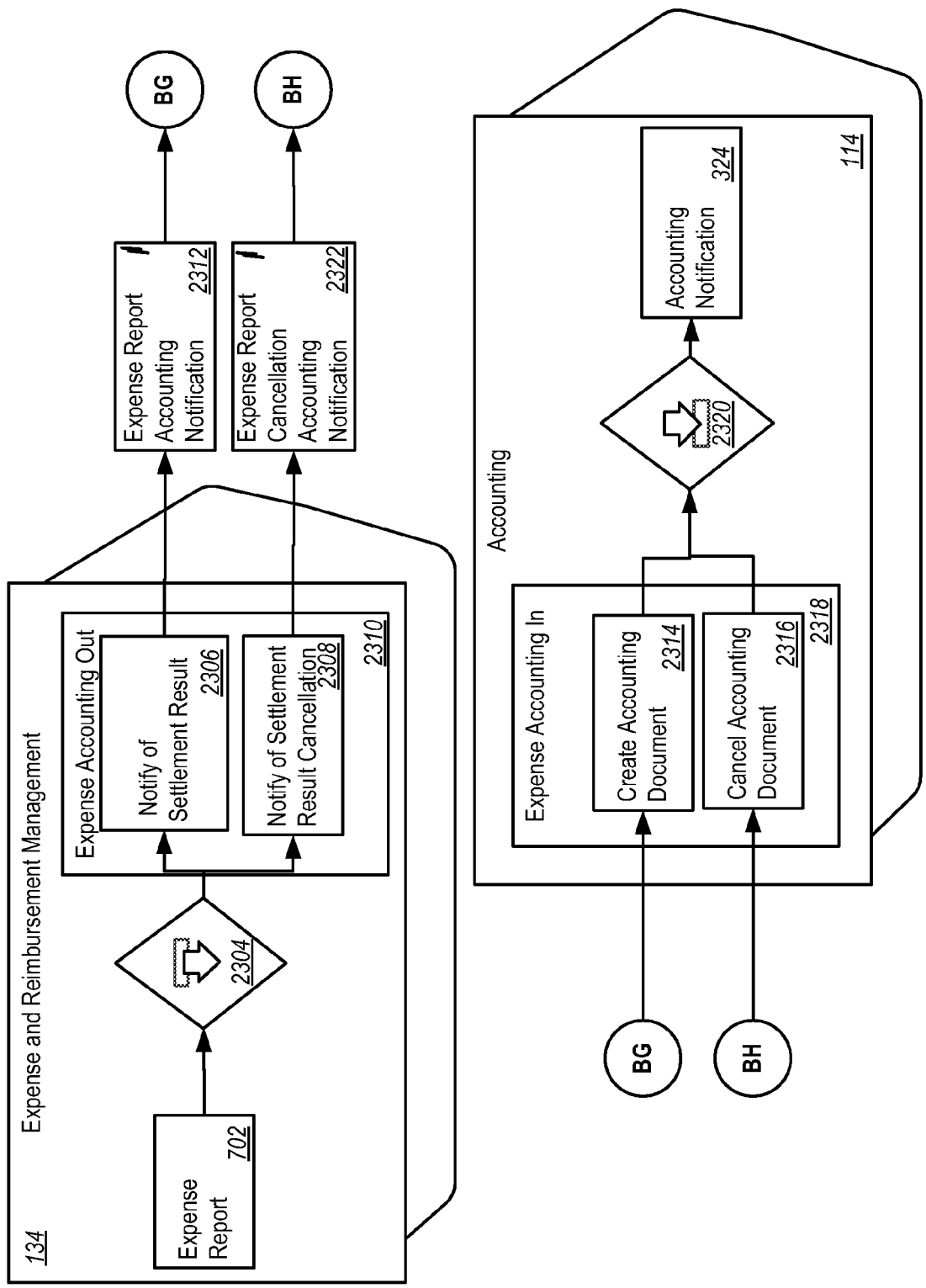
FIG. 23 is a block diagram showing interactions between the Expense and Reimbursement Management process component and the Accounting process component.

FIG. 23 is a block diagram showing interactions between the Expense and Reimbursement Management process component 134 and the Accounting process component 114 in the architectural design of FIGS. 1A-1E. The interaction starts when an expense report is approved or cancelled. The Expense and Reimbursement Management process component 134 requests the creation or cancellation of posting documents from the Accounting process component 114.

As shown in FIG. 23, the Expense and Reimbursement Management process component 134 includes the Expense Report business object 702. The Expense Report business object 702 represents a list of receipts for the expenses incurred for the company within a certain period of time that are to be reimbursed to an expense reporter. For example, in the case of a business trip, it can also contain the reason for the trip and general information such as destinations, dates and times, and mileages.

The Expense Report business object 702 uses a Notify of Settlement Result from Expense Report to Accounting outbound process agent 2304 to invoke a Notify of Settlement Result operation 2306 or a Notify of Settlement Result Cancellation operation 2308. The Notify of Settlement Result operation 2306 notifies accounting about the settlement results to post the costs of an expense report. The Notify of Settlement Result Cancellation operation 2308 notifies accounting that an expense report was cancelled. The operations 2306 and 2308 are included in an Expense Accounting Out interface 2310. The Notify of Settlement Result operation 2306 sends an Expense Report Accounting Notification message 2312 to the Accounting process component 114.

A Create Accounting Document operation 2314 receives the message 2312. The Create Accounting Document operation 2314 creates an accounting document based on expense data received from the Expense and Reimbursement Management process component 134. In some implementations, the received data is first converted into an accounting notification from which one or more accounting documents are created according to the relevant sets of books. The Create Accounting Document operation 2314 is included in an Expense Accounting In interface 2318. The operation 2314 uses a Maintain Accounting Document based on Expense inbound process agent 2320 to update the Accounting Notification business object 324. The Accounting Notification business object 324 represents a notification sent to financial accounting by an operational component regarding a business transaction. For example, it can represent this operational business transaction in a standardized form for all business transaction documents and can contain the data needed to valuate the business transaction.

The Notify of Settlement Result Cancellation operation 2308 sends an Expense Report Cancellation Accounting Notification message 2322 to the Accounting process component 114. A Cancel Accounting Document operation 2316, in the Expense Accounting In interface 2318, receives the Expense Report Cancellation Accounting Notification message 2322 from the Expense and Reimbursement Management process component 134. The Cancel Accounting Document operation 2316 cancels an existing accounting document based on cancellation data received from the Expense and Reimbursement Management process component 134. In some implementations, the received data is converted into an accounting notification from which one or more reversal accounting documents are created according to the relevant sets of books. The operation 2316 uses the Maintain Accounting Document based on Expense inbound process agent 2320 to update the Accounting Notification business object 324.

Interactions Between Process Components "Sales Order Processing" and "Customer Project Invoice Preparation"

Figure 24A:
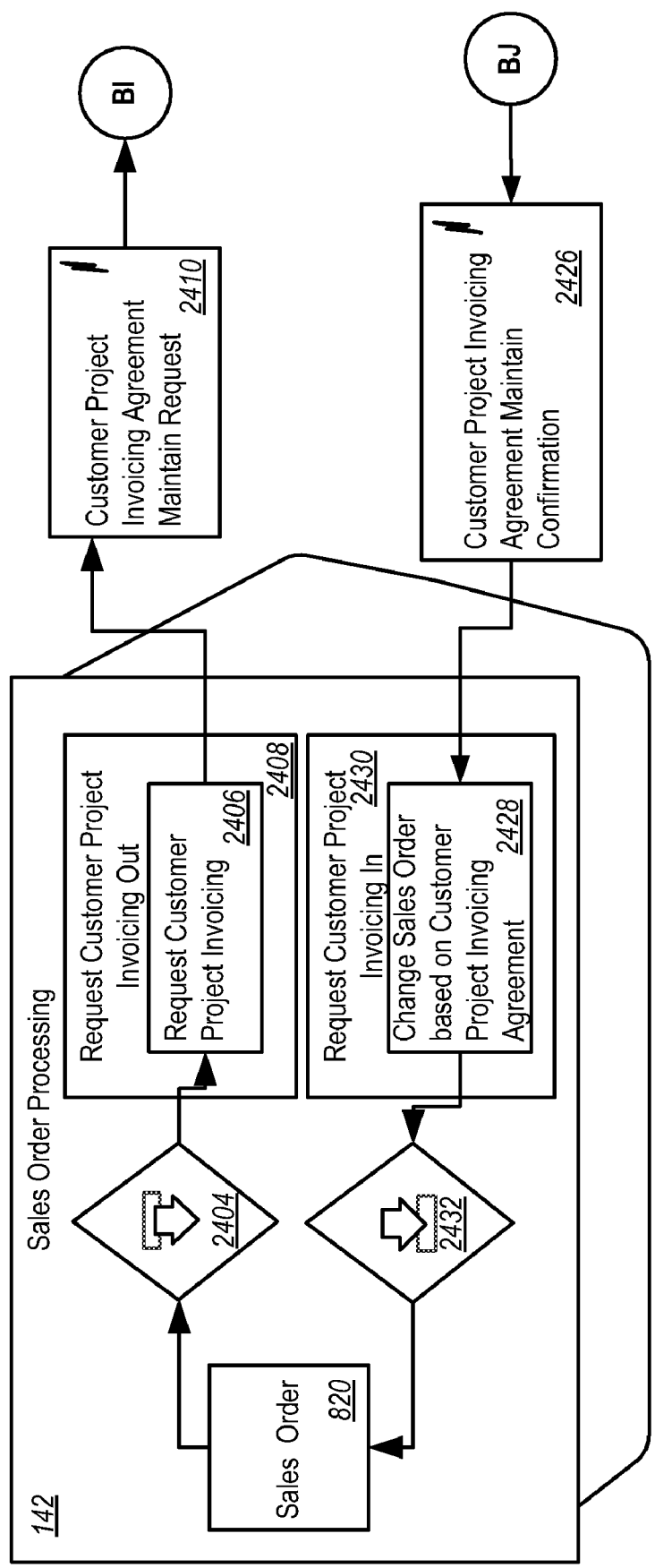
FIGS. 24A and 24B are a block diagram showing interactions between the Sales Order Processing process component and the Customer Project Invoice Preparation process component.
Figure 24B:
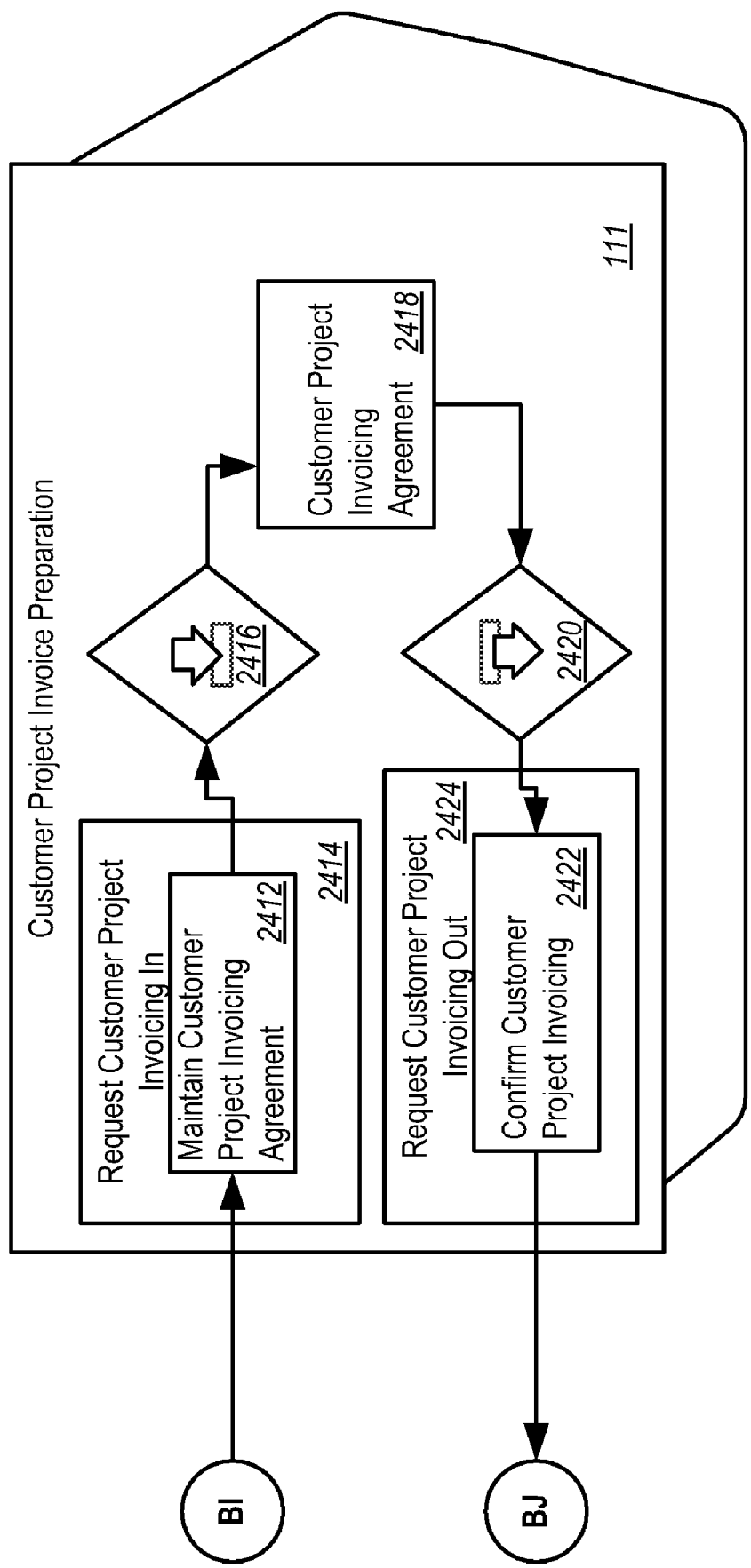

FIGS. 24A and 24B are a block diagram showing interactions between the Sales Order Processing process component 142 and a Customer Project Invoice Preparation process component 111 in the architectural design of FIGS. 1A-1E. The interaction starts with the request for the creation, update or cancellation of invoice agreements from the Customer Project Invoice Preparation process component 111. The Customer Project Invoice Preparation process component 111 confirms the performed action to the requester. In some implementations, the Customer Project Invoice Preparation process component 111 updates the Sales Order Processing process component 142 with information about the status of a subsequent invoicing process.

As shown in FIGS. 24A and 24B, the Sales Order Processing process component 142 includes the Sales Order business object 820. The Sales Order business object 820 represents an agreement between a seller and a customer concerning the sale and delivery of goods, as well as any services that are associated with these processes, on a specific date, for a specific quantity, and for a specific price.

The Sales Order business object 820 uses a Request Invoicing from Sales Order to Customer Project Invoice Preparation outbound process agent 2404 to invoke a Request Customer Project Invoicing operation 2406. The Request Customer Project Invoicing operation 2406 requests invoicing for a customer project. The Request Customer Project Invoicing operation 2406 is included in a Request Customer Project Invoicing Out interface 2408. The operation 2406 sends a Customer Project Invoicing Agreement Maintain Request message 2410.

A Maintain Customer Project Invoicing Agreement operation 2412 receives the Customer Project Invoicing Agreement Maintain Request message 2410. The operation 2412 creates, updates, or cancels a customer project invoicing agreement. The Maintain Customer Project Invoicing Agreement operation 2412 is included in a Request Customer Project Invoicing In interface 2414.

A Maintain Customer Project Invoicing Agreement inbound process agent 2416 updates a Customer Project Invoicing Agreement business object 2418. The Customer Project Invoicing Agreement business object 2418 represents an agreement between a seller and a customer that defines how the expenses related to a customer project are to be invoiced for the agreed output.

The Customer Project Invoicing Agreement business object 2418 uses a Confirm Customer Project Invoice Issued from Customer Project Invoice Agreement to Sales Order Processing outbound process agent 2420 to invoke a Confirm Customer Project Invoicing operation 2422. The Confirm Customer Project Invoicing operation 2422 confirms to a sales order that a customer invoice was created. The operation 2422 is included in a Request Customer Project Invoicing Out interface 2424. The Confirm Customer Project Invoicing operation 2422 generates a Customer Project Invoicing Agreement Maintain Confirmation message 2426.

The message 2426 is received in a Charge Sales Order based on Customer Project Invoicing Agreement operation 2428. The Charge Sales Order based on Customer Project Invoicing Agreement operation 2428 updates a sales order from a customer project invoicing agreement. The operation 2428 is included in a Request Customer Project Invoicing In interface 2430. The Charge Sales Order based on Customer Project Invoicing Agreement operation 2428 uses a Change Sales Order based on Customer Project Invoicing Agreement inbound process agent 2432 to update the Sales Order business object 820.

Interactions Between Process Components "Purchase Order Processing" and "Supplier Invoice Processing"

Figure 25:
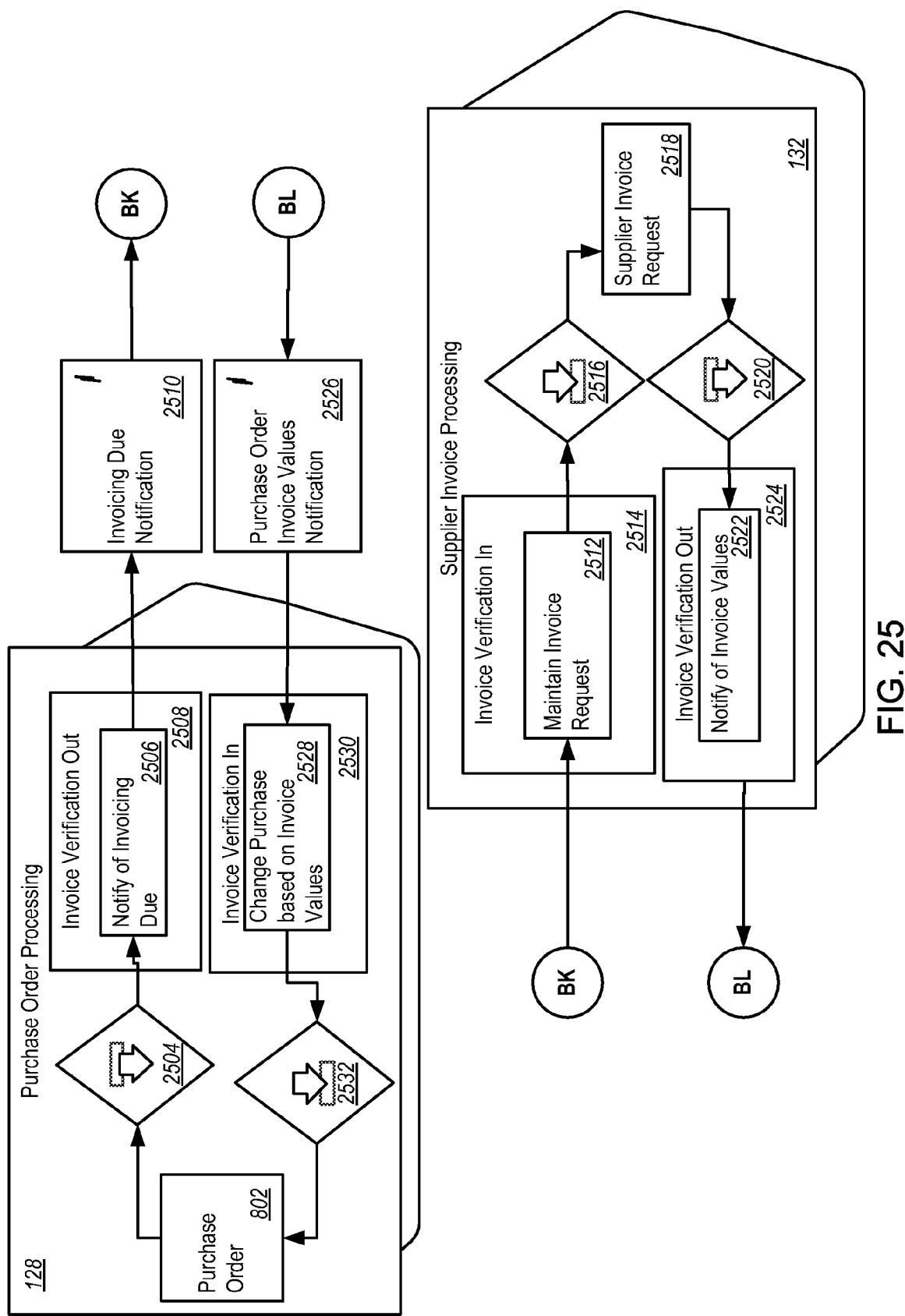
FIG. 25 is a block diagram showing interactions between the Purchase Order Processing process component and the Supplier Invoice Processing process component.

FIG. 25 is a block diagram showing interactions between the Purchase Order Processing process component 128 and the Supplier Invoice Processing process component 132 in the architectural design of FIGS. 1A-1E. The interaction starts with the sending of invoicing-relevant data from a purchase order to the Supplier Invoice Processing process component 132. When the supplier invoice that is based on the purchase order is saved, the Purchase Order Processing process component 128 is notified and the invoiced value and invoiced quantity in the supplier invoice are reported back.

As shown in FIG. 25, the Purchase Order Processing process component 128 includes the Purchase Order business object 802. The Purchase Order business object 802 represents a request from a buyer to a seller to deliver a specified quantity of material, or perform a specified service, at a specified price within a specified time.

The Purchase Order business object 802 uses a Notify of Invoicing Due from Purchase Order to Supplier Invoice Processing outbound process agent 2504 to invoke a Notify of Invoicing Due operation 2506. The Notify of Invoicing Due operation 2506 notifies the Supplier Invoice Processing process component 132 about a new, changed, or cancelled purchase order. The Notify of Invoicing Due operation 2506 is included in an Invoice Verification Out interface 2508. The operation 2506 generates an Invoicing Due Notification message 2510.

A Maintain Invoice Request operation 2512 receives the Invoicing Due Notification message 2510. The operation 2512 creates, updates, deletes, or requests the cancellation of a supplier invoice request based on the invoicing-relevant data that is transferred from a purchasing system. The Maintain Invoice Request operation 2512 is included in an Invoice Verification In interface 2514.

A Maintain Supplier Invoice Request inbound process agent 2516 updates a Supplier Invoice Request business object 2518. The Supplier Invoice Request business object 2518 represents a request to invoice verification advising that a supplier invoice for specified quantities and prices is expected and is to be created through evaluated receipt settlement.

The Supplier Invoice Request business object 2518 uses a Notify of Invoice Values from Supplier Invoice Processing to Purchase Order Processing outbound process agent 2520 to invoke a Notify of Invoice Values operation 2522. The Notify of Invoice Values operation 2522 sends a notification about the actual values and quantities of a supplier invoice that has been saved and contains a reference to a purchase order. The operation 2522 is included in an Invoice Verification Out interface 2524. The Notify of Invoice Values operation 2522 generates a Purchase Order Invoice Values Notification message 2526.

The message 2526 is received in a Change Purchase Order based on Invoice Values operation 2528. The Change Purchase Order based on Invoice Values operation 2528 updates a purchase order based on invoice data. The operation 2528 is included in an Invoice Verification In interface 2530. The Change Purchase Order based on Invoice Values operation 2528 uses a Change Purchase Order based on Invoice Values inbound process agent 2532 to update the Purchase Order business object 802.

Interactions Between Process Components "Goods and Service Acknowledgement" and "Supplier Invoice Processing"

Figure 26:
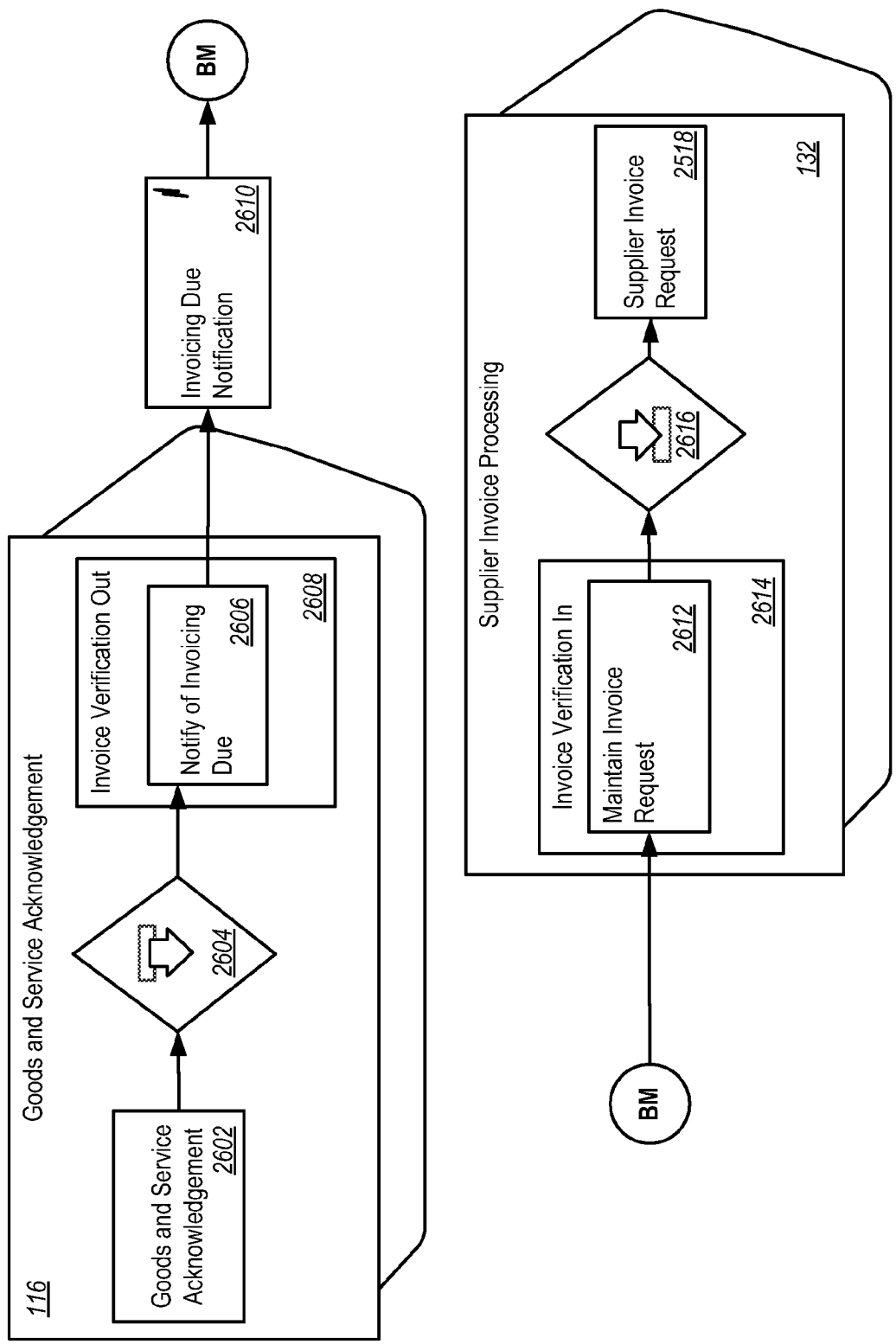
FIG. 26 is a block diagram showing interactions between a Goods and Service Acknowledgement process component and the Supplier Invoice Processing process component.

FIG. 26 is a block diagram showing interactions between a Goods and Service Acknowledgement process component 116 and the Supplier Invoice Processing process component 132 in the architectural design of FIGS. 1A-1E. The interaction starts with the sending of invoicing-relevant data from a purchase order to the Supplier Invoice Processing process component 132.

As shown in FIG. 26, the Goods and Service Acknowledgement process component 116 includes a Goods and Service Acknowledgement business object 2602. The Goods and Service Acknowledgement business object 2602 represents a document that reports the receipt of goods and services or the return of goods.

The Goods and Service Acknowledgement business object 2602 uses a Notify of Invoicing Due from Goods and Service Acknowledgement to Supplier Invoice Processing outbound process agent 2604 to invoke a Notify of Invoicing Due operation 2606. The operation 2606 is included in an Invoice Verification Out interface 2608. The Notify of Invoicing Due operation 2606 sends invoicing-relevant data about delivered materials or rendered services to invoicing. The operation 2606 generates an Invoicing Due Notification message 2610.

A Maintain Invoice Request operation 2612 receives the Invoicing Due Notification message 2610. The operation 2612 is included in an Invoice Verification In interface 2614. The Maintain Invoice Request operation 2612 creates, updates, deletes, or requests the cancellation of a supplier invoice request based on the invoicing-relevant data that is transferred from a purchasing system. The operation 2612 uses a Maintain Supplier Invoice Request inbound process agent 2616 to update the Supplier Invoice Request business object 2518. The Supplier Invoice Request business object 2518 represents a request to invoice verification advising that a supplier invoice for specified quantities and prices is expected and is to be created through evaluated receipt settlement.

Interactions Between Process Components "Project Processing" and "Time and Labor Management"

Figure 27:
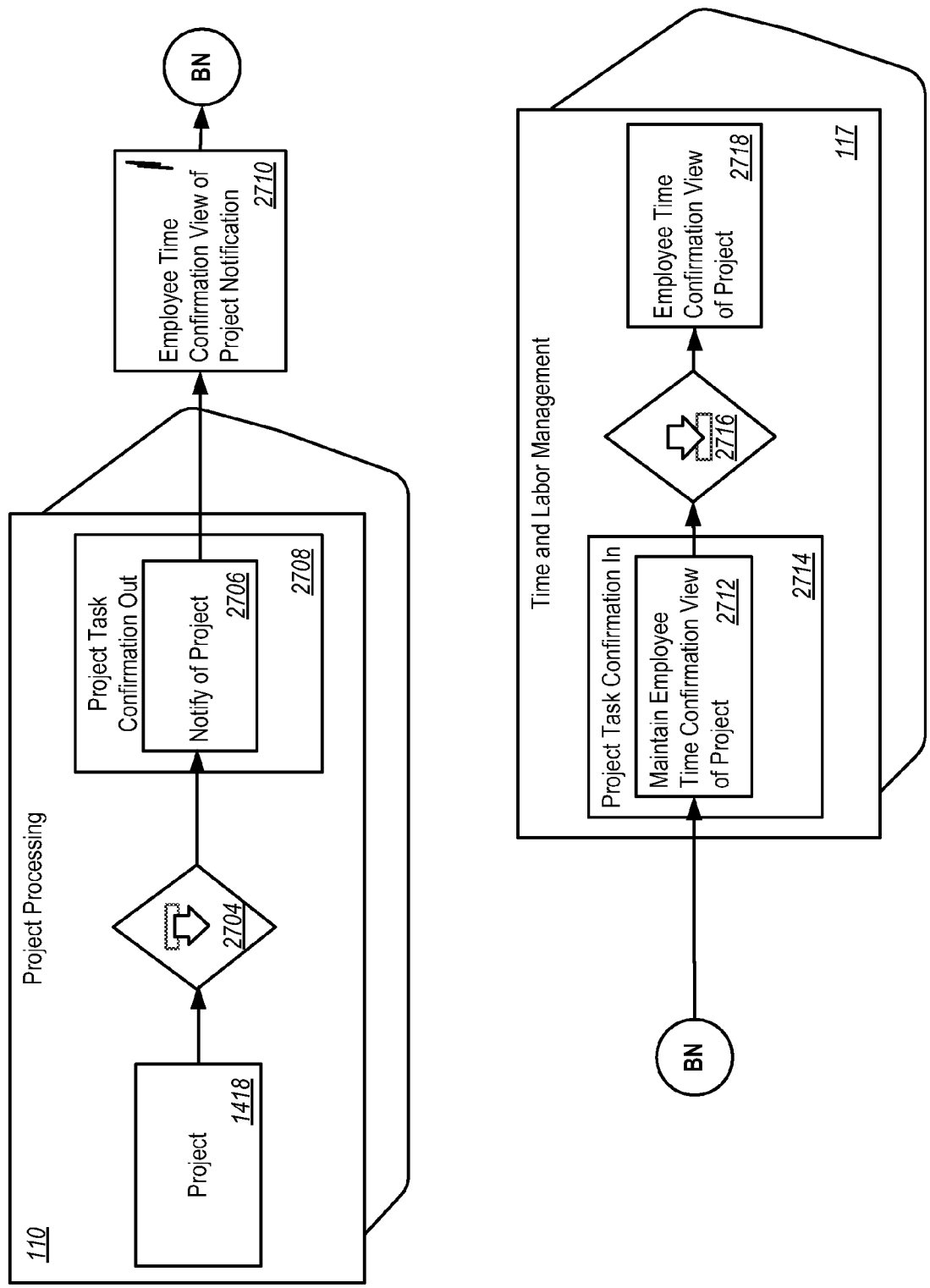
FIG. 27 is a block diagram showing interactions between the Project Processing process component and the Time and Labor Management process component.

FIG. 27 is a block diagram showing interactions between the Project Processing process component 110 and the Time and Labor Management process component 117 in the architectural design of FIGS. 1A-1E. The interaction starts with the notification to the Time and Labor Management process component 117 that a project has been released, including the project tasks and work packages for employees.

As shown in FIG. 27, the Project Processing process component 110 includes the Project business object 1418. The Project business object 1418 represents a business undertaking with a defined goal that is to be attained in a specified time frame. For example, the business undertaking can be achieved using predefined funds and planned resources, while reaching an agreed quality level. The project can be characterized by the fact that it is unique and that it involves an element of risk.

The Project business object 1418 uses a Notify of Project to Time and Labor Management outbound process agent 2704 to invoke a Notify of Project operation 2706. The operation 2706 is included in a Project Task Confirmation Out interface 2708. The Notify of Project operation 2706 provides information to the Time and Labor Management process component 117 about tasks and assigned employees in a project. The operation 2706 generates an Employee Time Confirmation View of Project Notification message 2710.

A Maintain Employee Time Confirmation View of Project operation 2712 receives the Employee Time Confirmation View of Project Notification message 2710. The operation 2712 is included in a Project Task Confirmation In interface 2714. The Maintain Employee Time Confirmation View of Project operation 2712 updates an Employee Time Confirmation View of Project business object 2718 based on changes to the Project business object 1418 in the Project Processing process component 110. The operation 2712 uses a Maintain Employee Time Confirmation View of Project inbound process agent 2716 to update the Employee Time Confirmation View of Project business object 2718. The Employee Time Confirmation View of Project business object 2718 represents a view of a project restricted to those project tasks for which employee times are confirmed.

Interactions Between Process Components "Customer Invoice Processing" and "Accounting"

Figure 28:
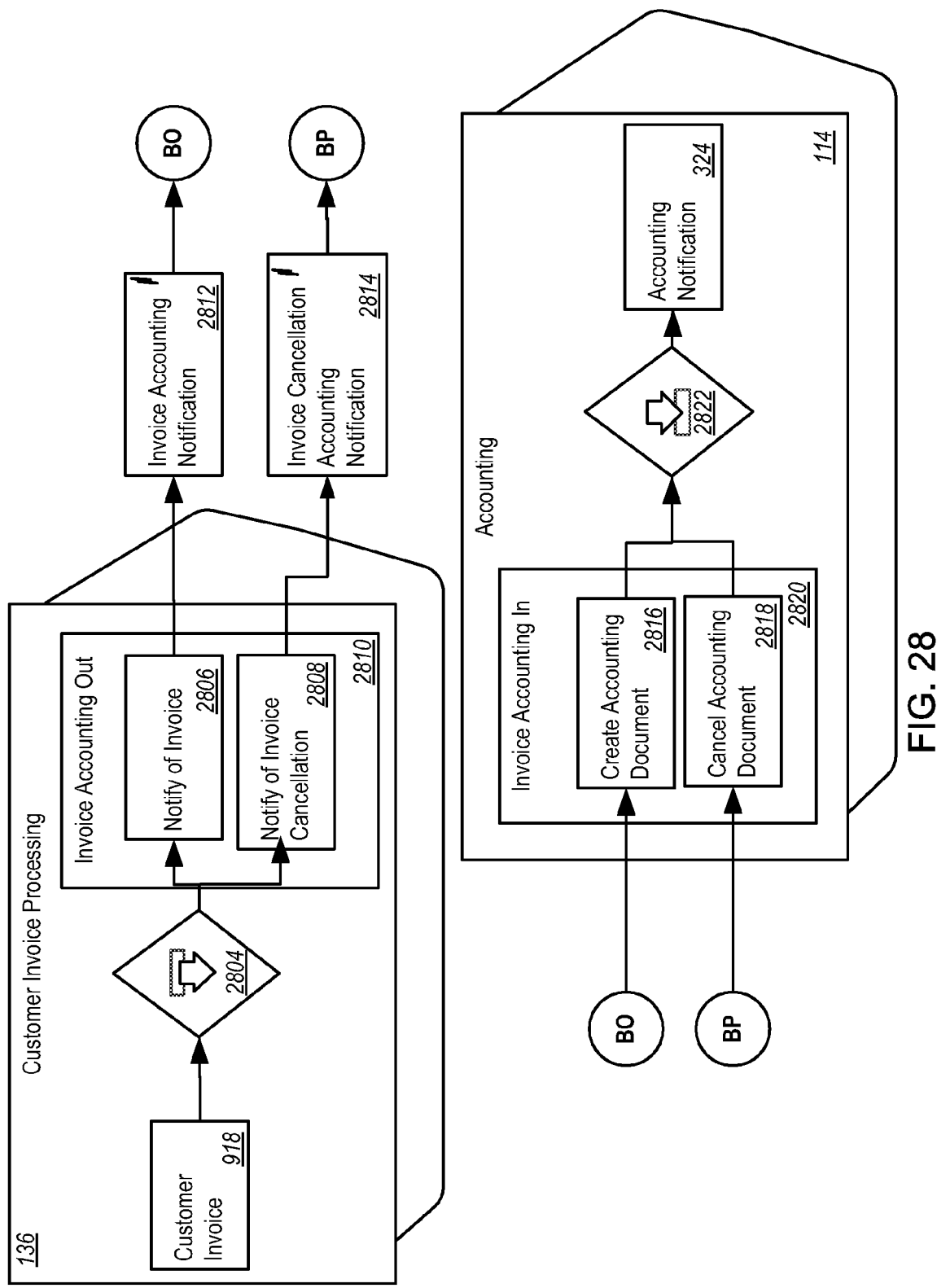
FIG. 28 is a block diagram showing interactions between the Customer Invoice Processing process component and the Accounting process component.

FIG. 28 is a block diagram showing interactions between the Customer Invoice Processing process component 136 and the Accounting process component 114 in the architectural design of FIGS. 1A-1E. The interaction starts with the requesting of the creation or cancellation of accounting documents from the Accounting process component 114.

As shown in FIG. 28, the Customer Invoice Processing process component 136 includes the Customer Invoice business object 918. The Customer Invoice business object 918 represents a binding statement of amounts receivable resulting, for example, from deliveries to a customer, services performed for a customer, adjustments to these receivables, or credit memos to a customer.

The Customer Invoice business object 918 uses a Notify of Customer Invoice to Accounting outbound process agent 2804 to invoke a Notify of Invoice operation 2806 or a Notify of Invoice Cancellation operation 2808. The Notify of Invoice operation 2806 informs accounting about the creation of invoices or credit memos. The Notify of Invoice Cancellation operation 2808 informs accounting about the cancellation of invoices or credit memos. The operations 2806 and 2808 are included in an Invoice Accounting Out interface 2810. The Notify of Invoice operation 2806 generates an Invoice Accounting Notification message 2812.

A Create Accounting Document operation 2816 receives the message 2812. The Create Accounting Document operation 2816 creates an accounting document based on invoice data received from the Customer Invoice Processing process component 136 or a Supplier Invoice Processing process component. In some implementations, the received data is first converted into an accounting notification from which one or more accounting documents are created according to the relevant sets of books. The Create Accounting Document operation 2816 is included in an Invoice Accounting In interface 2820. The operation 2816 uses a Maintain Accounting Document based on Invoice inbound process agent 2822 to update the Accounting Notification business object 324. The Accounting Notification business object 324 represents a notification sent to financial accounting by an operational component regarding a business transaction. It can represent this operational business transaction in a standardized form for all business transaction documents and can contain the data needed to valuate the business transaction.

The Notify of Invoice Cancellation operation 2808 generates an Invoice Cancellation Accounting Notification message 2814. A Cancel Accounting Document operation 2818, in the Invoice Accounting In interface 2820, receives the Invoice Cancellation Accounting Notification message 2814 from the Customer Invoice Processing process component 136. The Cancel Accounting Document operation 2818 cancels an existing accounting document based on cancellation data received from the Customer Invoice Processing process component 136 or a Supplier Invoice Processing process component. In some implementations, the received data is converted into an accounting notification from which one or more reversal accounting documents are created according to the relevant sets of books. The operation 2818 uses the Maintain Accounting Document based on Invoice inbound process agent 2822 to update the Accounting Notification business object 324.

Interactions Between Process Components "Purchase Order Processing" and "Accounting"

Figure 29:
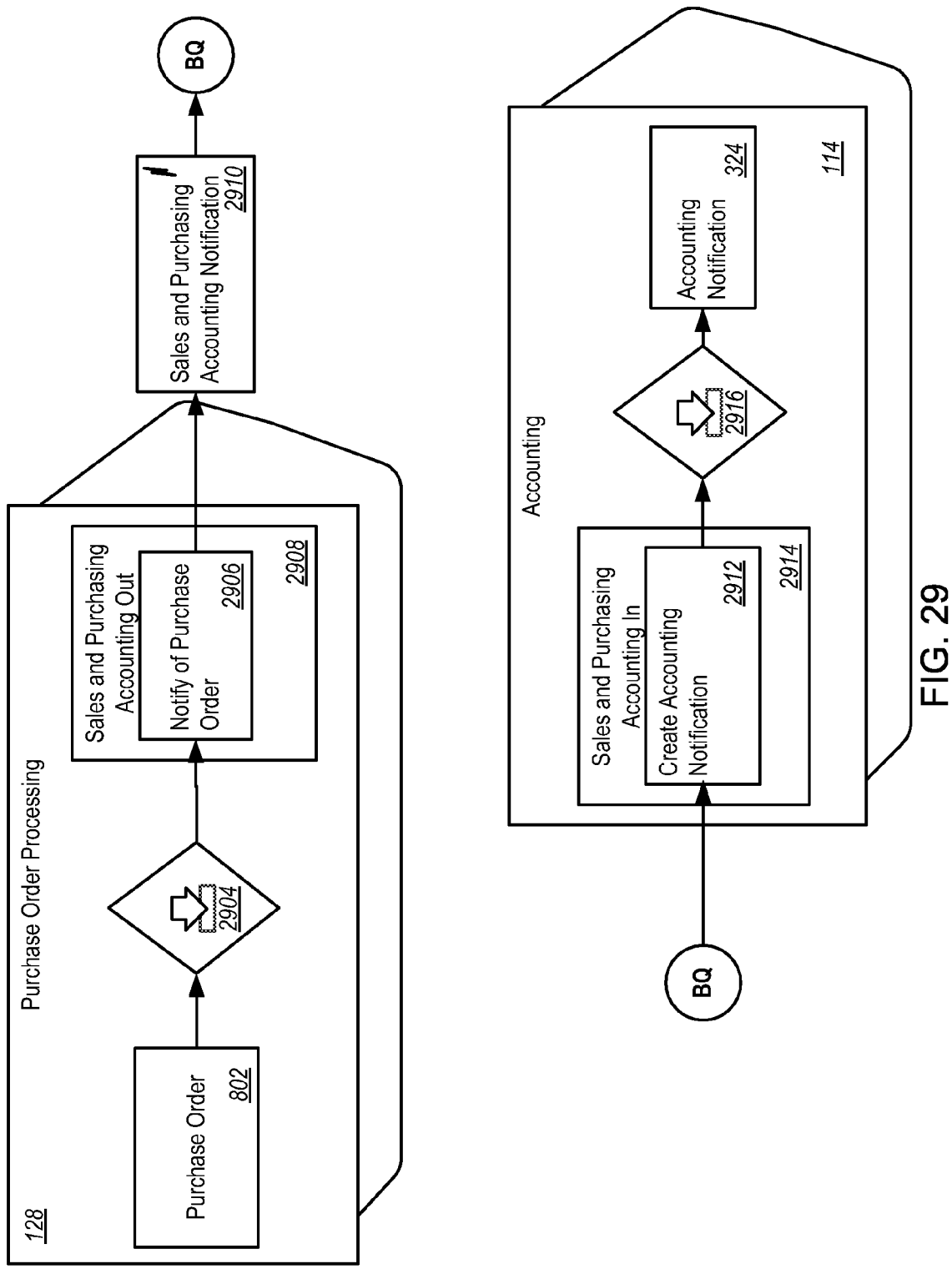
FIG. 29 is a block diagram showing interactions between the Purchase Order Processing process component and the Accounting process component.

FIG. 29 is a block diagram showing interactions between the Purchase Order Processing process component 128 and the Accounting process component 114 in the architectural design of FIGS. 1A-1E. The interaction starts when a purchase order is created or updated. The Purchase Order Processing process component 128 requests the creation or update of a subledger account (based on purchasing) from the Accounting process component 114.

As shown in FIG. 29, the Purchase Order Processing process component 128 includes the Purchase Order business object 802. The Purchase Order business object 802 represents a request from a buyer to a seller to deliver a specified quantity of material, or perform a specified service, at a specified price within a specified time.

The Purchase Order business object 802 uses a Notify of Purchase Order to Accounting outbound process agent 2904 to invoke a Notify of Purchase Order operation 2906. The operation 2906 is included in a Sales And Purchasing Accounting Out interface 2908. The Notify of Purchase Order operation 2906 notifies accounting that a purchase order has been created, changed, or cancelled. The operation 2906 generates a Sales And Purchasing Accounting Notification message 2910.

A Create Accounting Notification operation 2912 receives the Sales And Purchasing Accounting Notification message 2910. The operation 2912 is included in a Sales And Purchasing Accounting In interface 2914. The Create Accounting Notification operation 2912 creates an accounting notification based on order data received from customer complaint processing, purchase order processing, sales order processing, service confirmation processing, service order processing, service request processing, or goods and service acknowledgement. The operation 2912 uses a Maintain Subledger Account based on Sales And Purchasing inbound process agent 2916 to update the Accounting Notification business object 324. The Accounting Notification business object 324 represents a notification sent to financial accounting by an operational component regarding a business transaction. It can represent this operational business transaction in a standardized form for all business transaction documents and can contain the data needed to valuate the business transaction.

Figure 30:
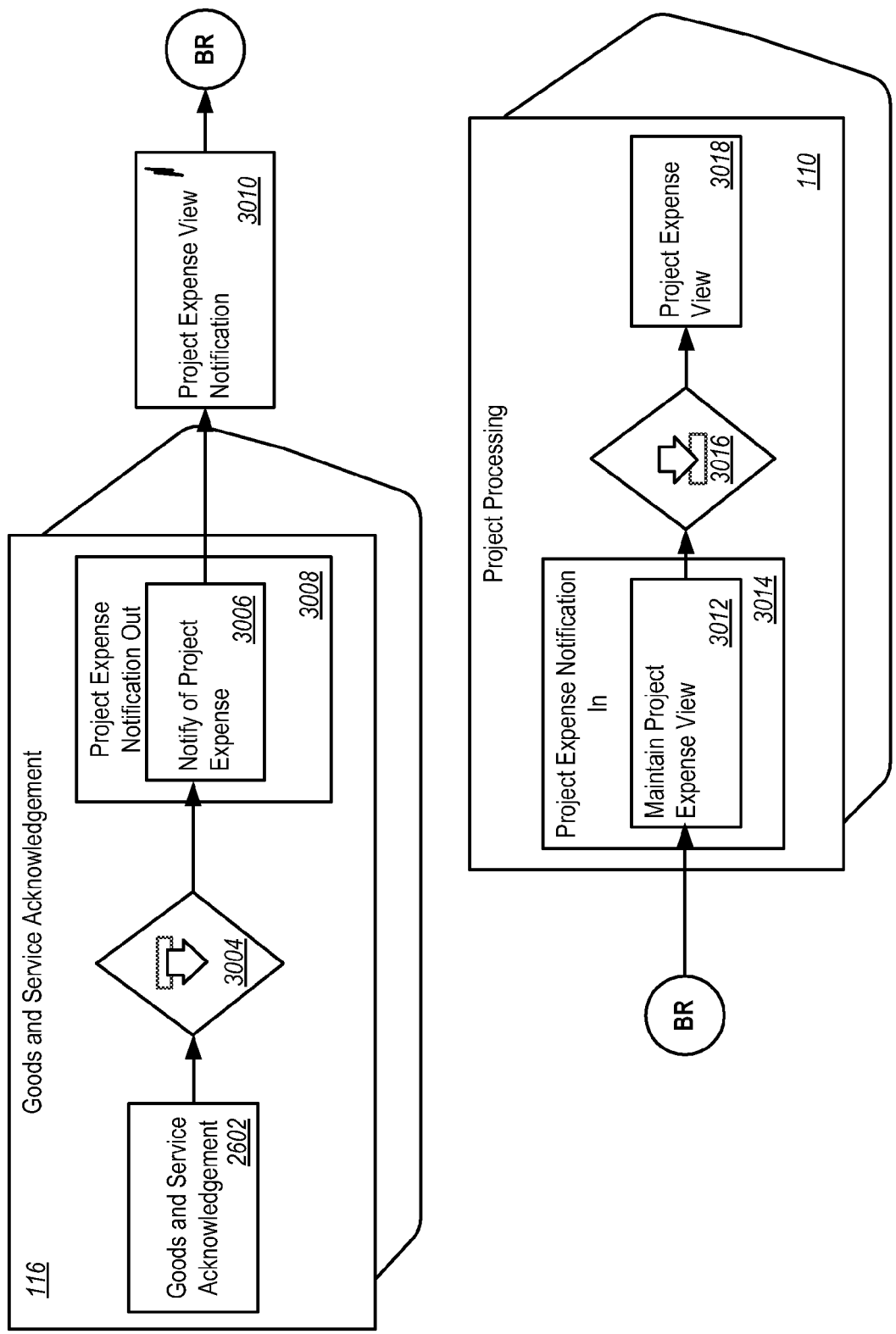
FIG. 30 is a block diagram showing interactions between the Goods and Service Acknowledgement process component and the Project Processing process component.

FIG. 30 is a block diagram showing interactions between the Goods and Service Acknowledgement process component 116 and the Project Processing process component 110 in the architectural design of FIGS. 1A-1E. The interaction starts with the notification of the Project Processing process component 110 about the creation or change of a goods and service acknowledgement that has recorded an expense on a project.

As shown in FIG. 30, the Goods and Service Acknowledgement process component 116 includes the Goods and Service Acknowledgement business object 2602. The Goods and Service Acknowledgement business object 2602 represents a document that reports the receipt of goods and services or the return of goods.

The Goods and Service Acknowledgement business object 2602 uses a Notify of Project Expense from Goods and Service Acknowledgement to Project Processing outbound process agent 3004 to invoke a Notify of Project Expense operation 3006. The operation 3006 is included in a Project Expense Notification Out interface 3008. The Notify of Project Expense operation 3006 notifies the Project Processing process component 110 about a goods and service acknowledgement related to a project. The operation 3006 generates a Project Expense View Notification message 3010.

A Maintain Project Expense View operation 3012 receives the Project Expense View Notification message 3010. The operation 3012 is included in a Project Expense Notification In interface 3014. The Maintain Project Expense View operation 3012 creates or cancels a project expense. The operation 3012 uses a Maintain Project Expense View inbound process agent 3016 to update a Project Expense View business object 3018. The Project Expense View business object 3018 represents a project management view of a project-related expense resulting from a business transaction.

Interactions Between Process Components "Project Processing" and "Costing"

Figure 31:
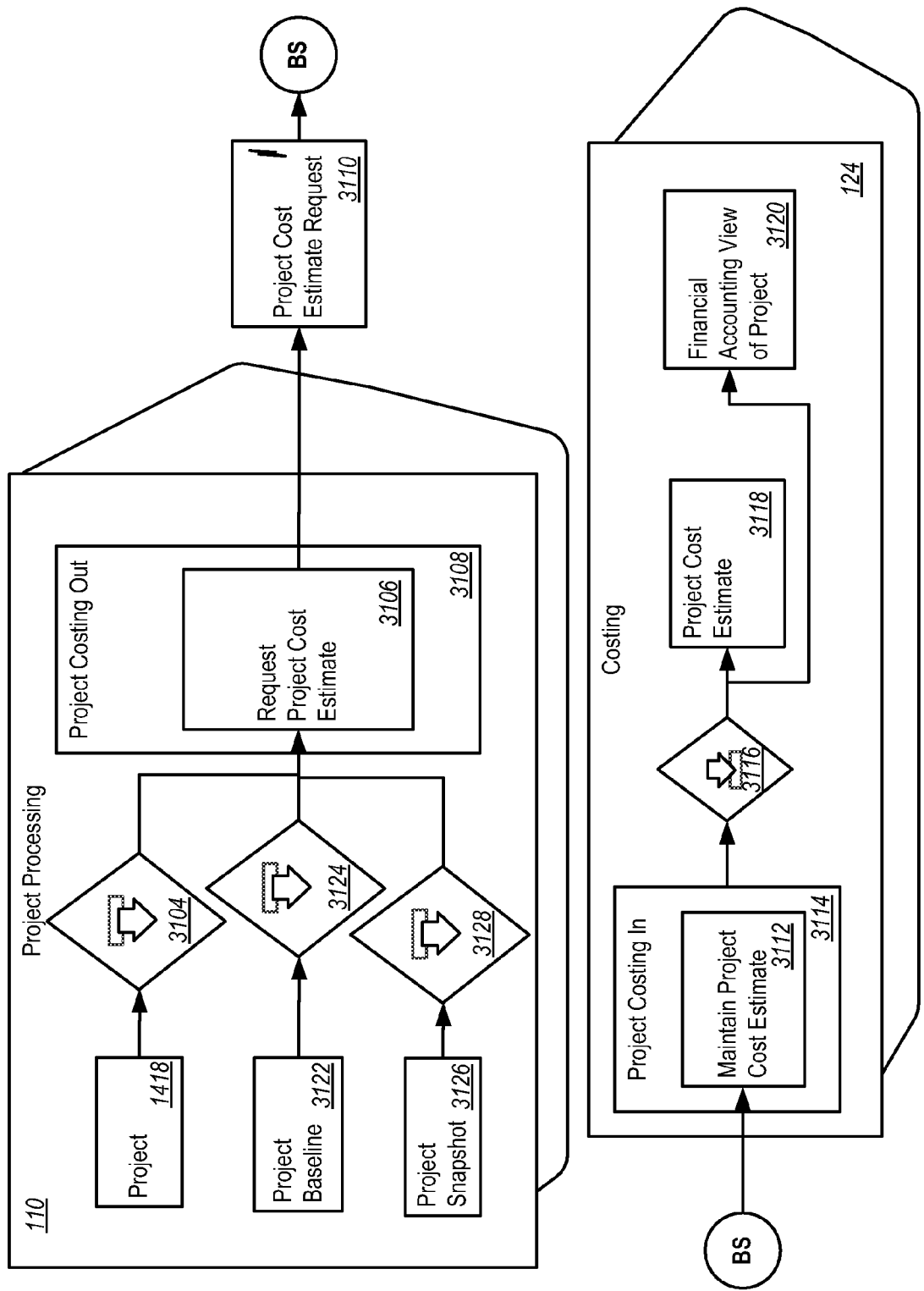
FIG. 31 is a block diagram showing interactions between the Project Processing process component and a Costing process component.

FIG. 31 is a block diagram showing interactions between the Project Processing process component 110 and a Costing process component 124 in the architectural design of FIGS. 1A-1E. The interaction starts as soon as a project is created and the project lead requests a costing estimation. In some implementations, the cost estimations are also available for project snapshots. The cost estimate values can be stored in the Costing process component 124 and read on demand from the Project Processing process component 110.

As shown in FIG. 31, the Project Processing process component 110 includes the Project business object 1418, a Project Baseline business object 3122 and a Project Snapshot business object 3126. The Project business object 1418 represents a business undertaking with a defined goal that is to be attained in a specified time frame. For example, the business undertaking can be achieved using predefined funds and planned resources, while reaching an agreed quality level. The project can be characterized by the fact that it is unique and that it involves an element of risk. The Project Baseline business object 3122 represents the internally approved master plan between the project sponsors and the project lead. For example, the master plan can cover the planned scope, costs, schedule, and distribution of work within a project. The Project Snapshot business object 3126 represents a snapshot of a project that documents the state of a project.

The Project business object 1418 uses a Request Project Cost Estimate from Project to Costing outbound process agent 3104 to invoke a Request Project Cost Estimate operation 3106. The Project Baseline business object 3122 uses a Request Project Cost Estimate from Project Baseline to Costing outbound process agent 3124 to invoke the Request Project Cost Estimate operation 3106. The Project Snapshot business object 3126 uses a Request Project Cost Estimate from Project Snapshot to Costing outbound process agent 3128 to invoke the Request Project Cost Estimate operation 3106. The Request Project Cost Estimate operation 3106 is included in a Project Costing Out interface 3108. The Request Project Cost Estimate operation 3106 notifies the Costing process component 124 about the creation or change of costing-relevant project elements. The operation 3106 generates a Project Cost Estimate Request message 3110.

A Maintain Project Cost Estimate operation 3112 receives the Project Cost Estimate Request message 3110. The operation 3112 is included in a Project Costing In interface 3114. The Maintain Project Cost Estimate operation 3112 generates or updates a Financial Accounting View of Project business object 3120 due to the generation of or change to a project and generates or changes a Project Cost Estimate business object 3118 if costing should be performed immediately. The operation 3112 uses a Maintain Project Cost Estimate and Financial Accounting View of Project inbound process agent 3116 to update the Project Cost Estimate business object 3118 and the Financial Accounting View of Project business object 3120. The Project Cost Estimate business object 3118 represents a statement of the costs that are calculated for carrying out a project. In some implementations, the statement can contain both an overall result of the cost estimate and details of individual cost items. The cost items can be derived from material input, resource input, external/internal services, and/ or costs relating to a trip. The Financial Accounting View of Project business object 3120 represents an accounting view of a project and its structure.

Interactions Between Process Components "Inventory Processing" and "Project Processing"

Figure 32:
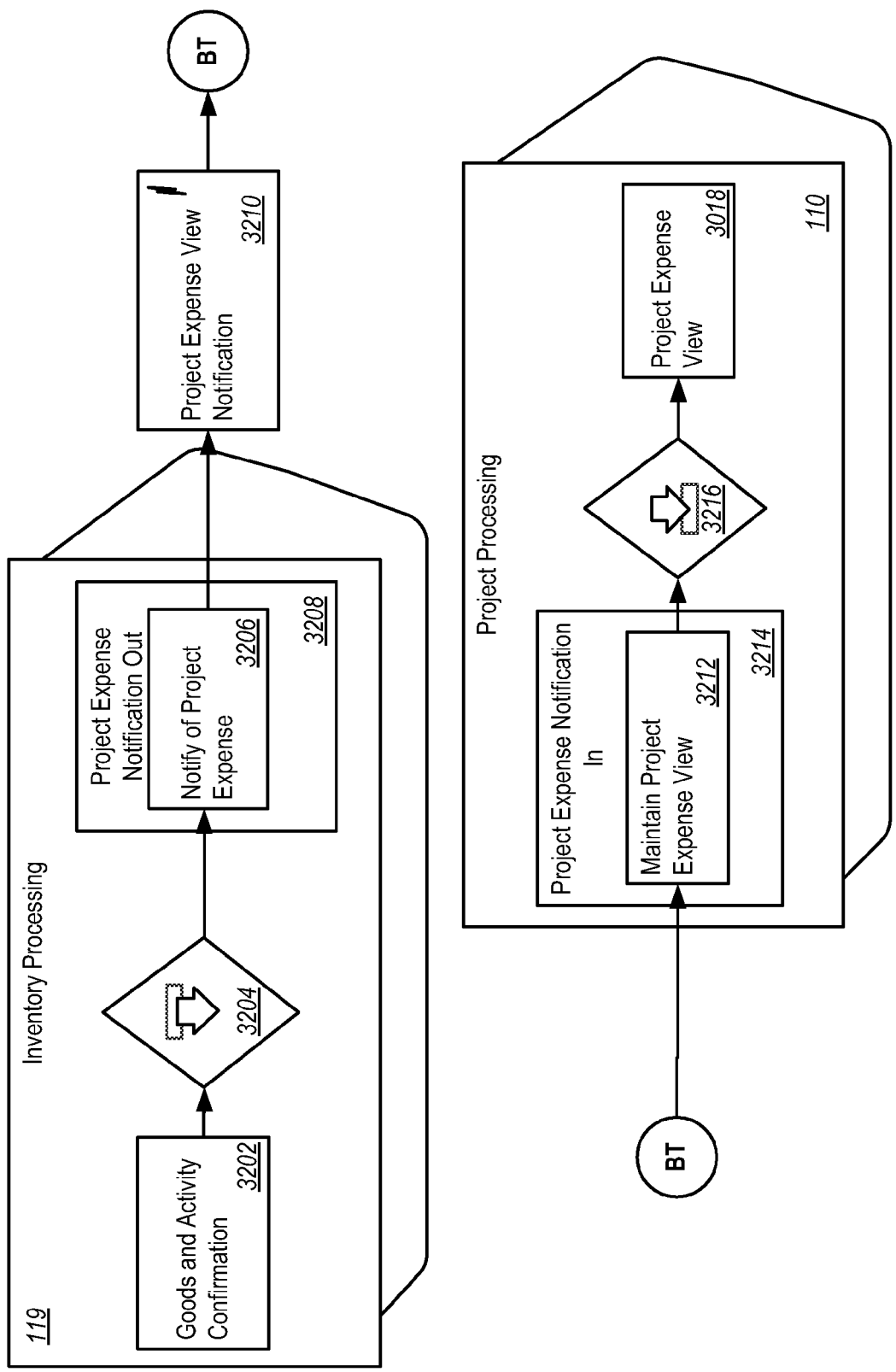
FIG. 32 is a block diagram showing interactions between an Inventory Processing process component and the Project Processing process component.

FIG. 32 is a block diagram showing interactions between an Inventory Processing process component 119 and the Project Processing process component 110 in the architectural design of FIGS. 1A-1E. The interaction starts with a notification to the Project Processing process component 110 about the creation or change of a goods and activity confirmation that has recorded an expense on a project.

As shown in FIG. 32, the Inventory Processing process component 119 includes a Goods and Activity Confirmation business object 3202. The Goods and Activity Confirmation business object 3202 represents a record of confirmed inventory changes that occurred at a specific time.

The Goods and Activity Confirmation business object 3202 uses a Notify of Project Expense from Confirmation to Project Processing outbound process agent 3204 to invoke a Notify of Project Expense operation 3206. The operation 3206 is included in a Project Expense Notification Out interface 3208. The Notify of Project Expense operation 3206 notifies of a project expense. The operation 3206 generates a Project Expense View Notification message 3210.

A Maintain Project Expense View operation 3212 receives the Project Expense View Notification message 3210. The operation 3212 is included in a Project Expense Notification In interface 3214. The Maintain Project Expense View operation 3212 creates or cancels a project expense. The operation 3212 uses a Maintain Project Expense View inbound process agent 3216 to update the Project Expense View business object 3018. The Project Expense View business object 3018 represents a project management view of a project-related expense resulting from a business transaction.

Interactions Between Process Components "Inventory Processing" and "Accounting"

Figure 33:
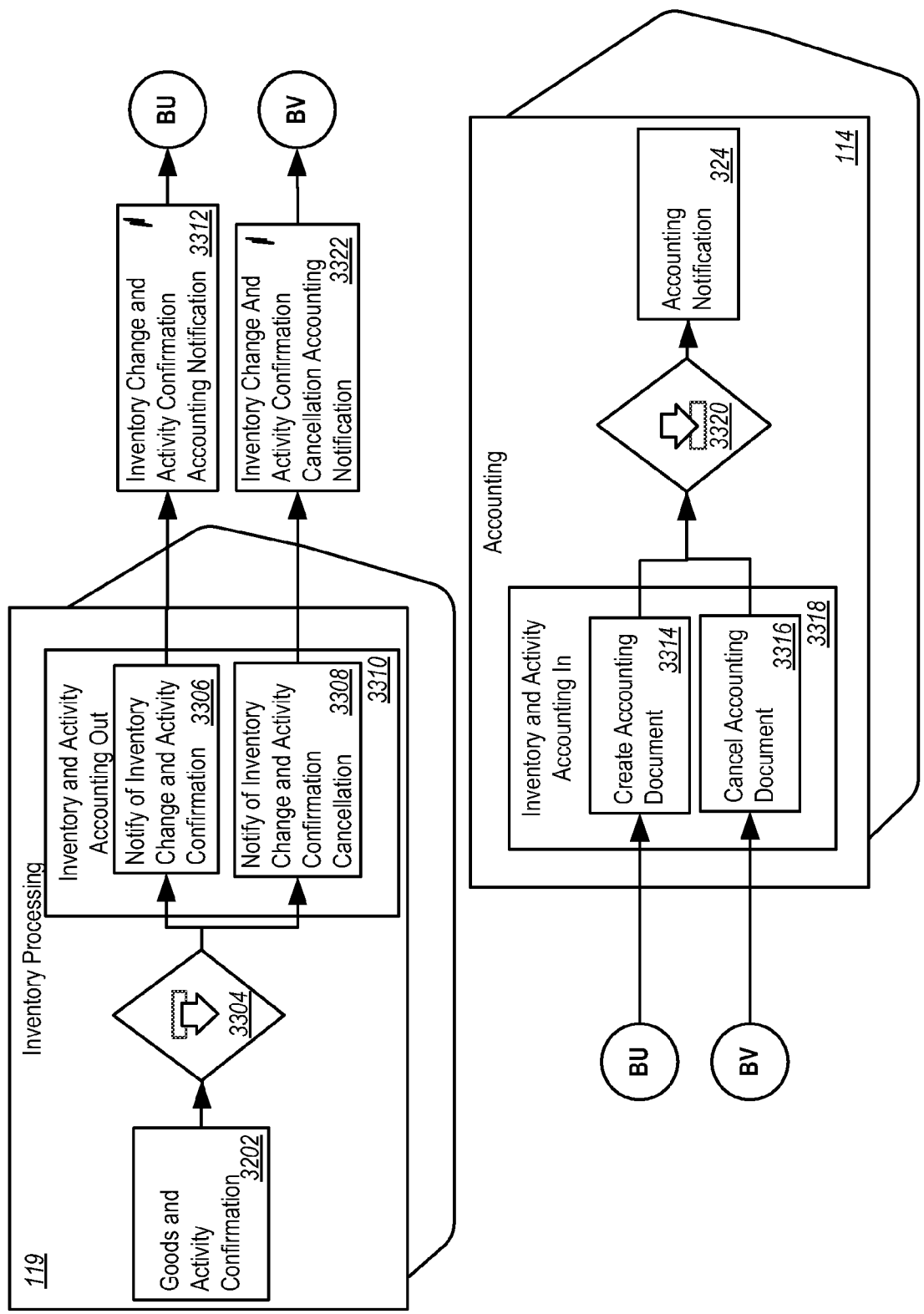
FIG. 33 is a block diagram showing interactions between the Inventory Processing process component and the Accounting process component.

FIG. 33 is a block diagram showing interactions between the Inventory Processing process component 119 and the Accounting process component 114 in the architectural design of FIGS. 1A-1E. The interaction starts when a goods and activity confirmation is created or cancelled. In some implementations, the confirmation and inventory requests the creation or cancellation of accounting documents from the Accounting process agent 114.

As shown in FIG. 33, the Inventory Processing process component 119 includes the Goods and Activity Confirmation business object 3202. The Goods and Activity Confirmation business object 3202 represents a record of confirmed inventory changes that occurred at a specific time.

The Goods and Activity Confirmation business object 3202 uses a Notify of Inventory Change from Goods and Activity Confirmation to Accounting outbound process agent 3304 to invoke a Notify of Inventory Change and Activity Confirmation operation 3306 or a Notify of Inventory Change and Activity Confirmation Cancellation operation 3308. The Notify of Inventory Change and Activity Confirmation operation 3306 notifies the Accounting process component 114 about inventory changes (for physical goods) and activity confirmations and to trigger a valuation of the relevant inventory changes and activities. The Notify of Inventory Change and Activity Confirmation Cancellation operation 3308 notifies the Accounting process component 114 about a cancellation of inventory changes and activity confirmations sent earlier. The operations 3306 and 3308 are included in an Inventory And Activity Accounting Out interface 3310. The Notify of Inventory Change and Activity Confirmation operation 3306 generates an Inventory Change And Activity Confirmation Accounting Notification message 3312.

A Create Accounting Document operation 3314 receives the message 3312. The Create Accounting Document operation 3314 creates an accounting document based on inventory data received from the Inventory Processing process component 119, a Site Logistics Processing process component, or a Production process component. In some implementations, the received data can first be converted into an accounting notification from which one or more accounting documents are created according to the relevant sets of books. The Create Accounting Document operation 3314 is included in an Inventory And Activity Accounting In interface 3318. The operation 3314 uses a Maintain Accounting Document based on Inventory and Activity inbound process agent 3320 to update the Accounting Notification business object 324. The Accounting Notification business object 324 represents a notification sent to financial accounting by an operational component regarding a business transaction. It can represent this operational business transaction in a standardized form for all business transaction documents and can contain the data needed to valuate the business transaction.

The Notify of Inventory Change and Activity Confirmation Cancellation operation 3308 generates an Inventory Change And Activity Confirmation Cancellation Accounting Notification message 3322. A Cancel Accounting Document operation 3316, in the Inventory And Activity Accounting In interface 3318, receives the Inventory Change And Activity Confirmation Cancellation Accounting Notification message 3322 from the Inventory Processing process component 119. The Cancel Accounting Document operation 3316 cancels an existing accounting document based on cancellation data received from the Inventory Processing process component 119, a Site Logistics Processing process component, or a Production process component. In some implementations, the received data can be converted into an accounting notification from which one or more reversal accounting documents are created according to the relevant sets of books. The operation 3316 uses the Maintain Accounting Document based on Inventory and Activity inbound process agent 3320 to update the Accounting Notification business object 324.

Interactions Between Process Components "Payment Processing" and "Payment Processing at Business Partner"

FIG. 34 is a block diagram showing interactions between the Payment Processing process component 122 and the Payment Processing at Business Partner process component 166 in the architectural design of FIGS. 1A-1E. The interaction starts with the transferring of a printed bill of exchange receivable that is sent to the business partner.

As shown in FIG. 34, the Payment Processing process component 122 includes a Bill of Exchange Receivable business object 3402. The Bill of Exchange Receivable business object 3402 represents a bill of exchange issued either by the company or by a business partner for the benefit of the company.

The Bill of Exchange Receivable business object 3402 uses an Issue Bill of Exchange Receivable to Business Partner outbound process agent 3404 to invoke an Issue Bill of Exchange operation 3406. The operation 3406 is included in a Bill of Exchange Receivable Issuing Output Out interface 3408. The Issue Bill of Exchange operation 3406 requests the issuing of a bill of exchange. The operation 3406 generates a Form Bill of Exchange Receivable Issue Request message 3410.

Interactions Between Process Components "Payment Processing" and "Due Item Processing"

Figure 35A:
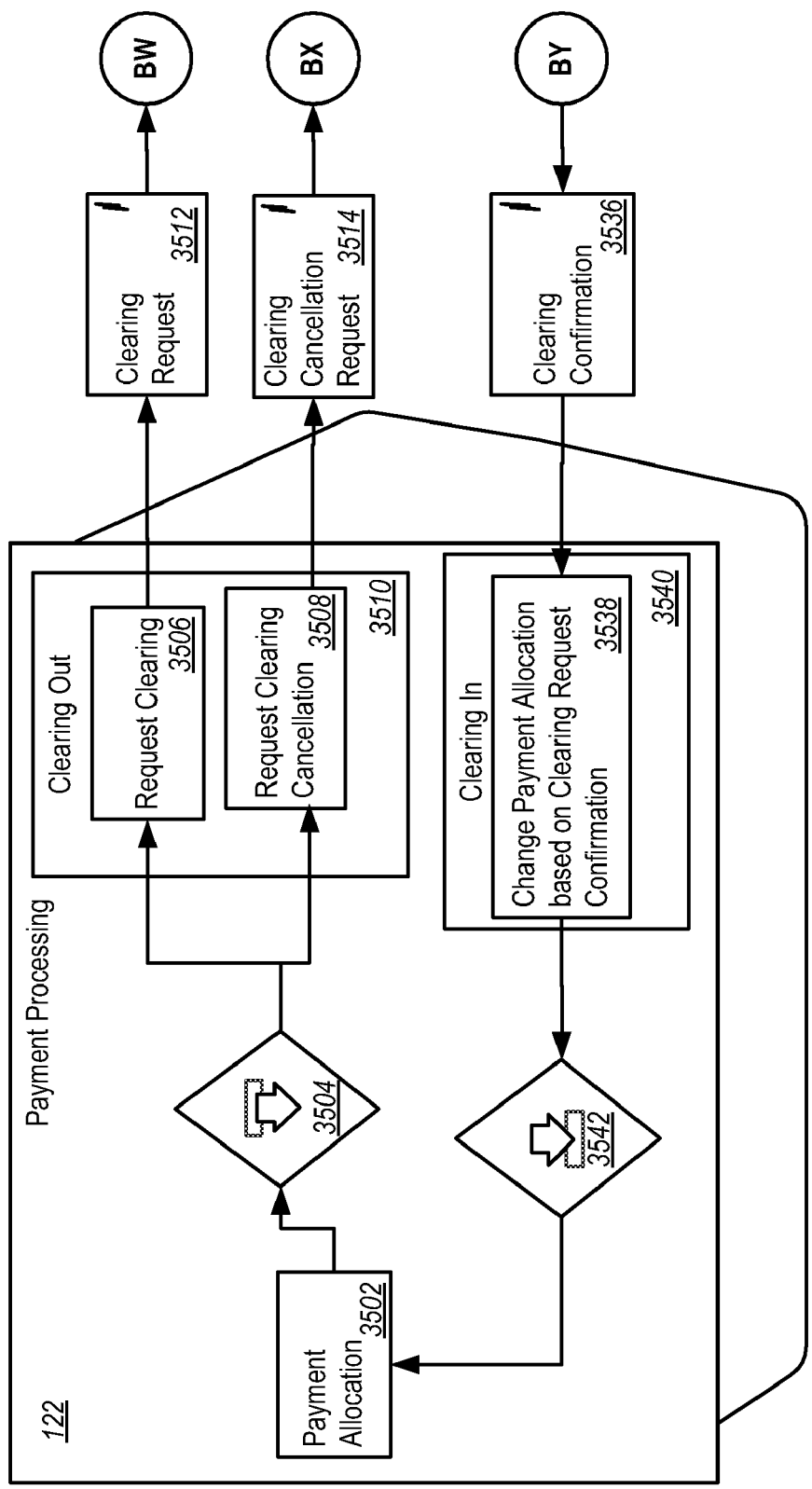
FIGS. 35A and 35B are a block diagram showing interactions between the Payment Processing process component and the Due Item Processing process component.
Figure 35B:
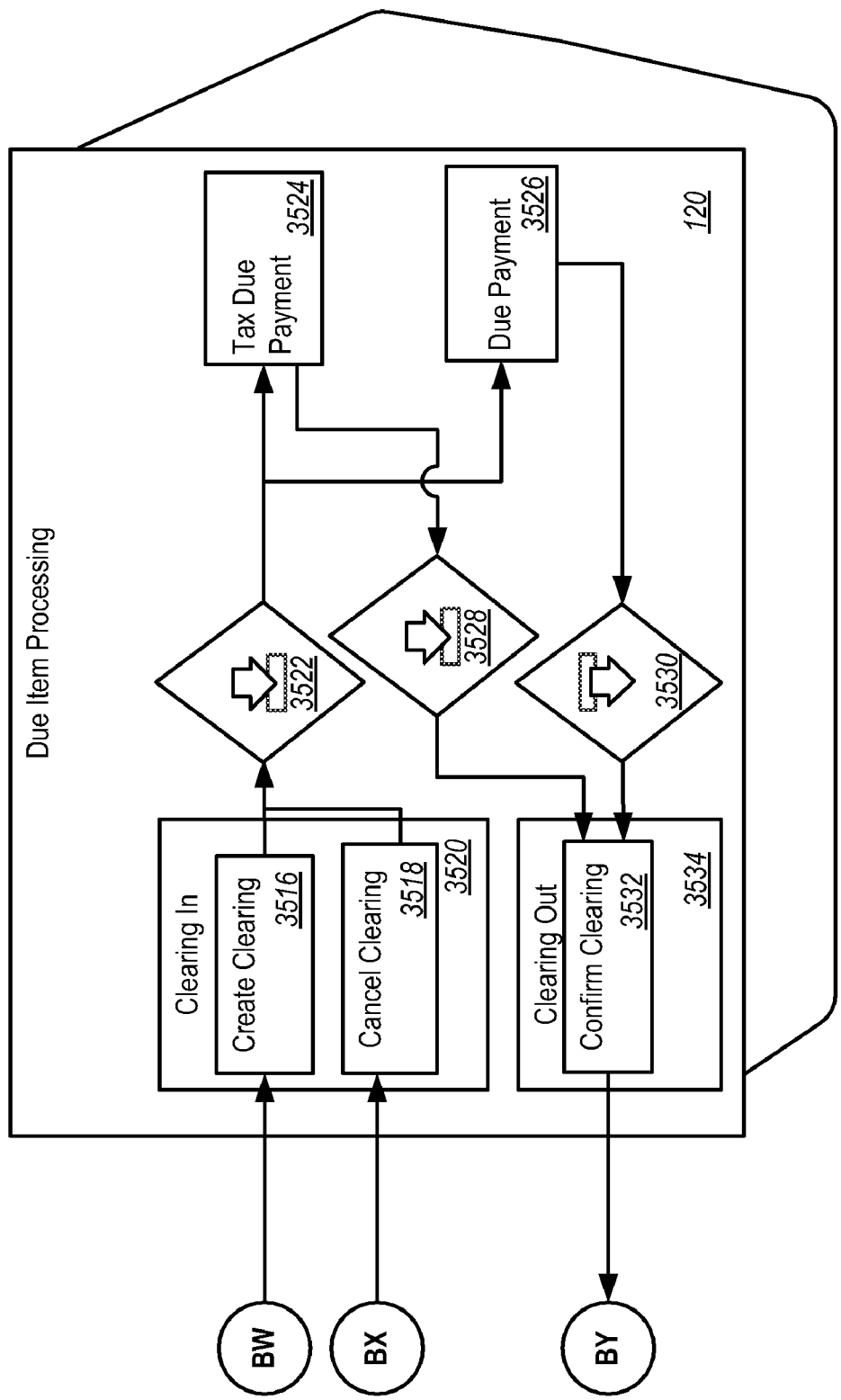

FIGS. 35A and 35B are a block diagram showing interactions between the Payment Processing process component 122 and the Due Item Processing process component 120 in the architectural design of FIGS. 1A-1E. The interaction starts with a request for the clearing or the cancellation of the clearing of a payment as well as the information about the clearing result.

As shown in FIG. 35, the Payment Processing process component 122 includes a Payment Allocation business object 3502. The Payment Allocation business object 3502 represents an assignment of a payment item to the payment reasons from which the payment item originated.

The Payment Allocation business object 3502 uses a Request Clearing Maintenance from Payment Allocation to Due Item Processing outbound process agent 3504 to invoke a Request Clearing operation 3506 or a Request Clearing Cancellation operation 3508. The Request Clearing operation 3506 requests the clearing of payments within the Due Item Processing process component 120. The Request Clearing Cancellation operation 3508 cancels a previously sent clearing request from the Due Item Processing process component 120 by reference. The operations 3506 and 3508 are included in a Clearing Out interface 3510. The Request Clearing operation 3506 generates a Clearing Request message 3512.

A Create Clearing operation 3516 receives the message 3512. The Create Clearing operation 3516 creates a clearing for business partner-initiated payments. The Create Clearing operation 3516 is included in a Clearing In interface 3520. The operation 3516 uses a Maintain Clearing inbound process agent 3522 to update a Tax Due Payment business object 3524. The Tax Due Payment business object 3524 represents a payment request or payment confirmation with regard to tax payables and receivables.

The Request Clearing Cancellation operation 3508 generates a Clearing Cancellation Request message 3514. A Cancel Clearing operation 3518, in the Clearing In interface 3520, receives the Clearing Cancellation Request message 3514 from the Payment Processing process component 122. The Cancel Clearing operation 3518 cancels a previously sent clearing request by reference. The operation 3518 uses the Maintain Clearing inbound process agent 3522 to update the Tax Due Payment business object 3524.

The Create Clearing operation 3516 uses the Maintain Clearing inbound process agent 3522 to update a Due Payment business object 3526. The Due Payment business object 3526 represents a payment request or a payment confirmation for trade receivables and payables.

The Tax Due Payment business object 3524 uses a Confirm Clearing from Tax Due Payment to Payment Processing outbound process agent 3528 to invoke a Confirm Clearing operation 3532. The Confirm Clearing operation 3532 sends a confirmation to the Payment Processing process component 122 for a clearing request. The operation 3532 is included in a Clearing Out interface 3534. The Due Payment business object 3524 uses a Confirm Clearing from Due Payment to Payment Processing outbound process agent 3530 to invoke the Confirm Clearing operation 3532. The Confirm Clearing operation 3532 generates a Clearing Confirmation message 3536.

The Clearing Confirmation message 3536 is received in a Change Payment Allocation Based On Clearing Request Confirmation operation 3538. The Change Payment Allocation Based On Clearing Request Confirmation operation 3538 confirms the execution or rejection of a sent clearing request. The operation 3538 is included in a Clearing In interface 3540. The Change Payment Allocation Based On Clearing Request Confirmation operation 3538 uses a Change Payment Allocation Based On Clearing Request Confirmation inbound process agent 3542 to update the Payment Allocation business object 3502.

Interactions Between Process Components "Time and Labor Management" and "Goods and Service Acknowledgement"

Figure 36:
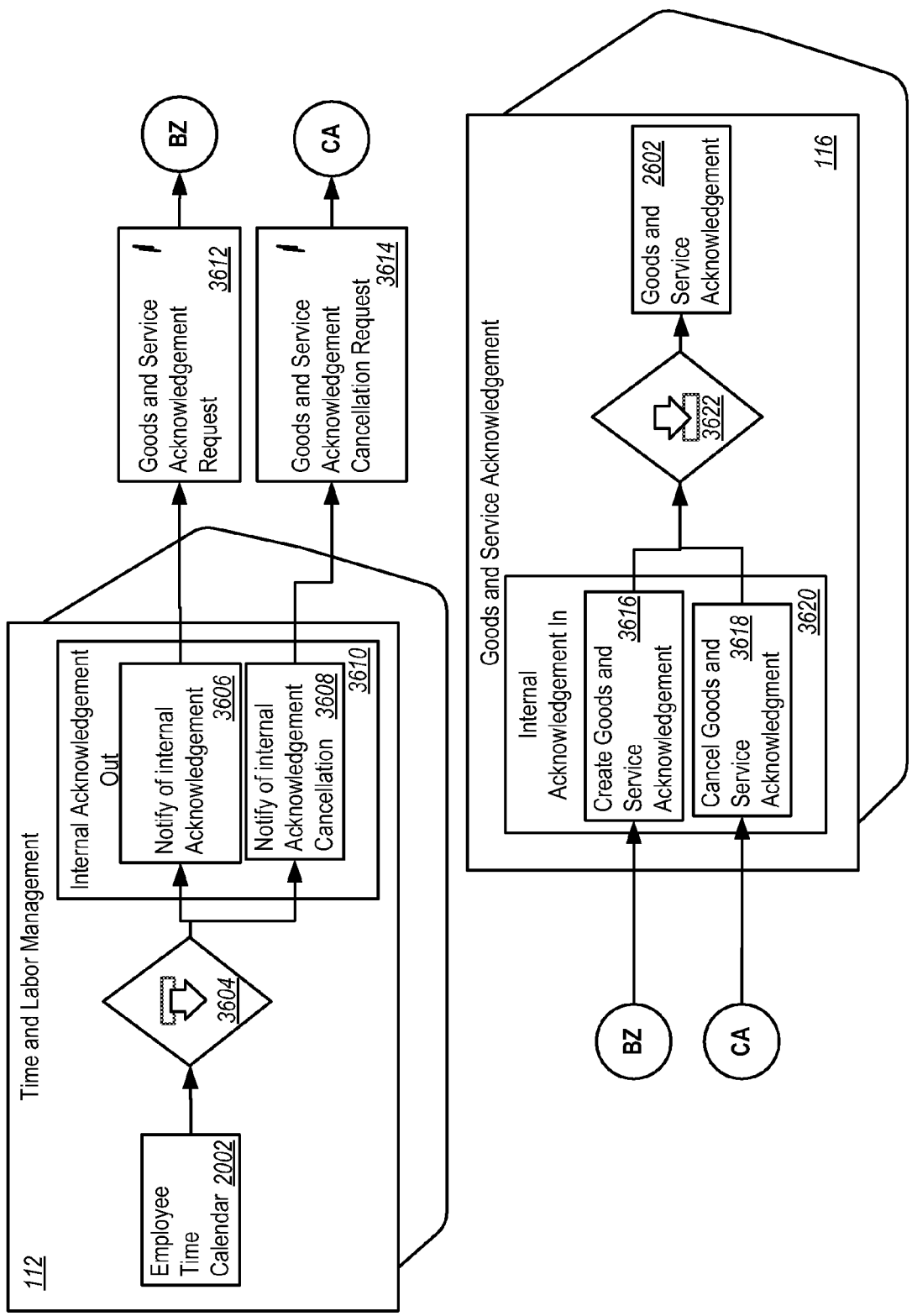
FIG. 36 is a block diagram showing interactions between the Time and Labor Management process component and the Goods and Service Acknowledgement process component.

FIG. 36 is a block diagram showing interactions between the Time and Labor Management process component 112 and the Goods and Service Acknowledgement process component 116 in the architectural design of FIGS. 1A-1E. The interaction starts with a notification to the Goods and Service Acknowledgement process component 116 when data pertaining to a service provided by an external employee is created or cancelled and subsequently written to the employee time calendar.

As shown in FIG. 36, the Time and Labor Management process component 112 includes the Employee Time Calendar business object 2002. The Employee Time Calendar business object 2002 represents a read-only calendar representation of time valuation results that are derived from the recorded times of an employee.

The Employee Time Calendar business object 2002 uses a Notify of internal Acknowledgement from Employee Time Confirmation to Goods and Service Acknowledgement outbound process agent 3604 to invoke a Notify of internal Acknowledgement operation 3606 or a Notify of internal Acknowledgement Cancellation operation 3608. The Notify of internal Acknowledgement operation 3606 notifies the Goods and Service Acknowledgement process component 116 of a service provided by an external employee. In some implementations, this notification can be sent when an active employee time that contains information relevant for the Goods and Service Acknowledgement process component 116 is created, changed, or cancelled. The Notify of internal Acknowledgement Cancellation operation 3608 notifies the Goods and Service Acknowledgement process component 116 of the cancellation of an externally provided service. For example, this cancellation can be sent when an active employee time that contains information relevant for the Goods and Service Acknowledgement process component is cancelled. The operations 3606 and 3608 are included in an Internal Acknowledgement Out interface 3610. The Notify of internal Acknowledgement operation 3606 generates a Goods and Service Acknowledgement Request message 3612.

A Create Goods and Service Acknowledgement operation 3616 receives the message 3612. The Create Goods and Service Acknowledgement operation 3616 creates a goods and service acknowledgement. The Create Goods and Service Acknowledgement operation 3616 is included in an Internal Acknowledgement In interface 3620. The operation 3616 uses a Maintain Goods and Service Acknowledgement based on Internal Acknowledgement inbound process agent 3622 to update the Goods and Service Acknowledgement business object 2602. The Goods and Service Acknowledgement business object 2602 represents a document that reports the receipt of goods and services or the return of goods.

The Notify of internal Acknowledgement Cancellation operation 3608 generates a Goods and Service Acknowledgement Cancellation Request message 3614. A Cancel Goods and Service Acknowledgement operation 3618, in the Internal Acknowledgement In interface 3620, receives the Goods and Service Acknowledgement Cancellation Request message 3614 from the Time and Labor Management process component 112. The Cancel Goods and Service Acknowledgement operation 3618 cancels a goods and service acknowledgement. The operation 3618 uses the Maintain Goods and Service Acknowledgement based on Internal Acknowledgement inbound process agent 3622 to update the Goods and Service Acknowledgement business object 2602.

Interactions Between Process Components "Customer Invoice Processing" and "Supplier Invoice Processing"

Figure 37:
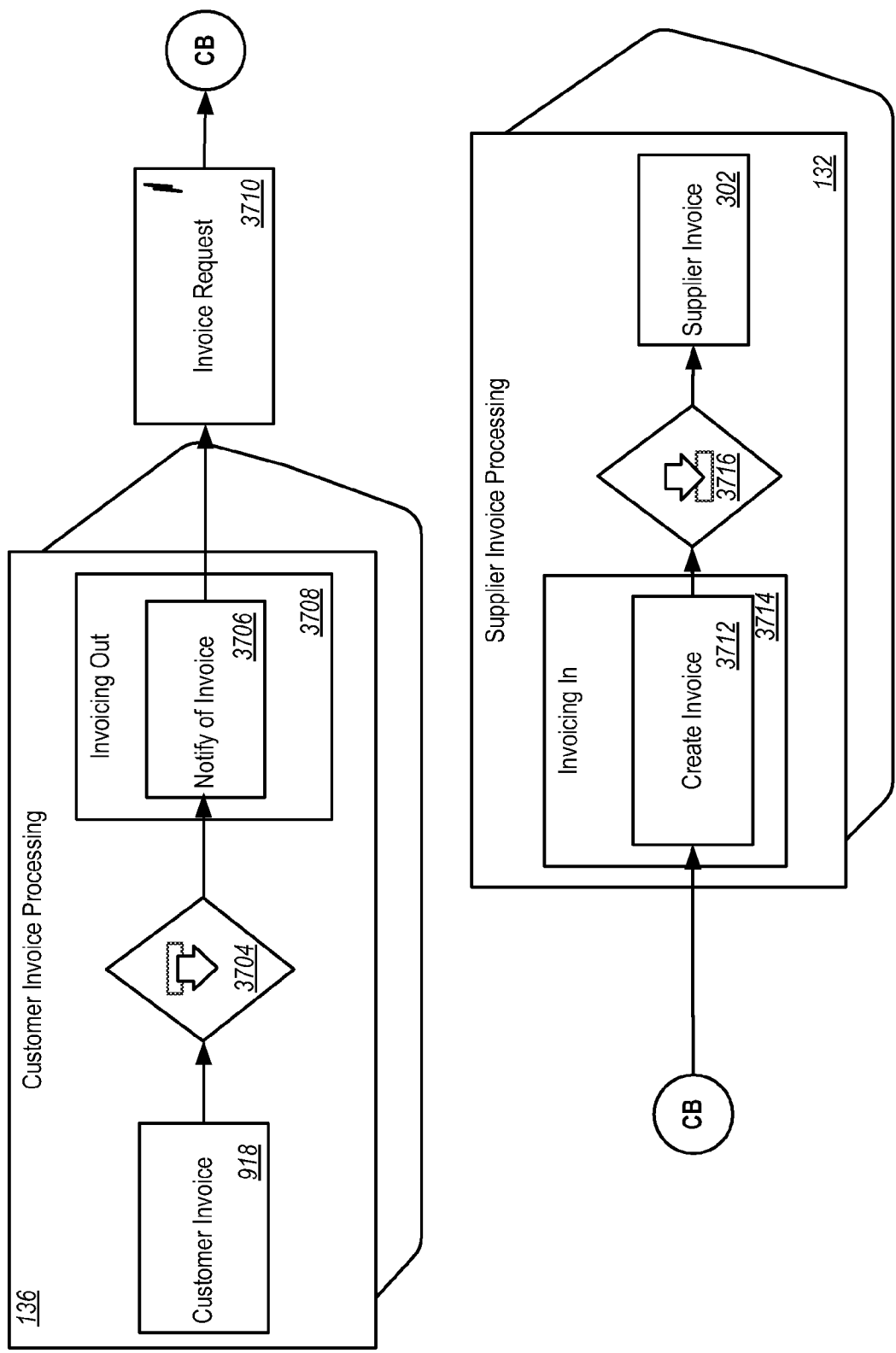
FIG. 37 is a block diagram showing interactions between the Customer Invoice Processing process component and the Supplier Invoice Processing process component.

FIG. 37 is a block diagram showing interactions between the Customer Invoice Processing process component 136 and the Supplier Invoice Processing process component 132 in the architectural design of FIGS. 1A-1E. The interaction starts with a notification to the Supplier Invoice Processing process component 132 about the creation of a customer invoice.

As shown in FIG. 37, the Customer Invoice Processing process component 136 includes the Customer Invoice business object 918. The Customer Invoice business object 918 represents a binding statement of amounts receivable resulting, for example, from deliveries to a customer, services performed for a customer, adjustments to these receivables, or credit memos to a customer.

The Customer Invoice business object 918 uses a Notify Customer of Customer Invoice outbound process agent 3704 to invoke a Notify of Invoice operation 3706. The operation 3706 is included in an Invoicing Out interface 3708. The Notify of Invoice operation 3706 informs the recipient of the customer invoice about invoicing. The operation 3706 generates an Invoice Request message 3710.

A Create Invoice operation 3712 receives the Invoice Request message 3710. The operation 3712 is included in an Invoicing In interface 3714. The Create Invoice operation 3712 creates a supplier invoice that corresponds to a customer invoice that contains claims or liabilities for delivered goods or rendered services. The operation 3712 uses a Create Supplier Invoice based on Invoice Request inbound process agent 3716 to update the Supplier Invoice business object 302. The Supplier Invoice business object 302 represents a company's obligation to pay the supplier for delivered goods and services. For example, if the company returns goods or complains about services, the supplier can issue a credit memo for an amount equal to or lower than the original invoice, and can refund the money to the company. For example, for invoiced goods that require a duty, a customs duty invoice can be submitted by the customs authority, stating a company's obligation to pay tax on the import or export of goods.

Interactions Between Process Components "Supplier Invoice Processing" and "Project Processing"

Figure 38:
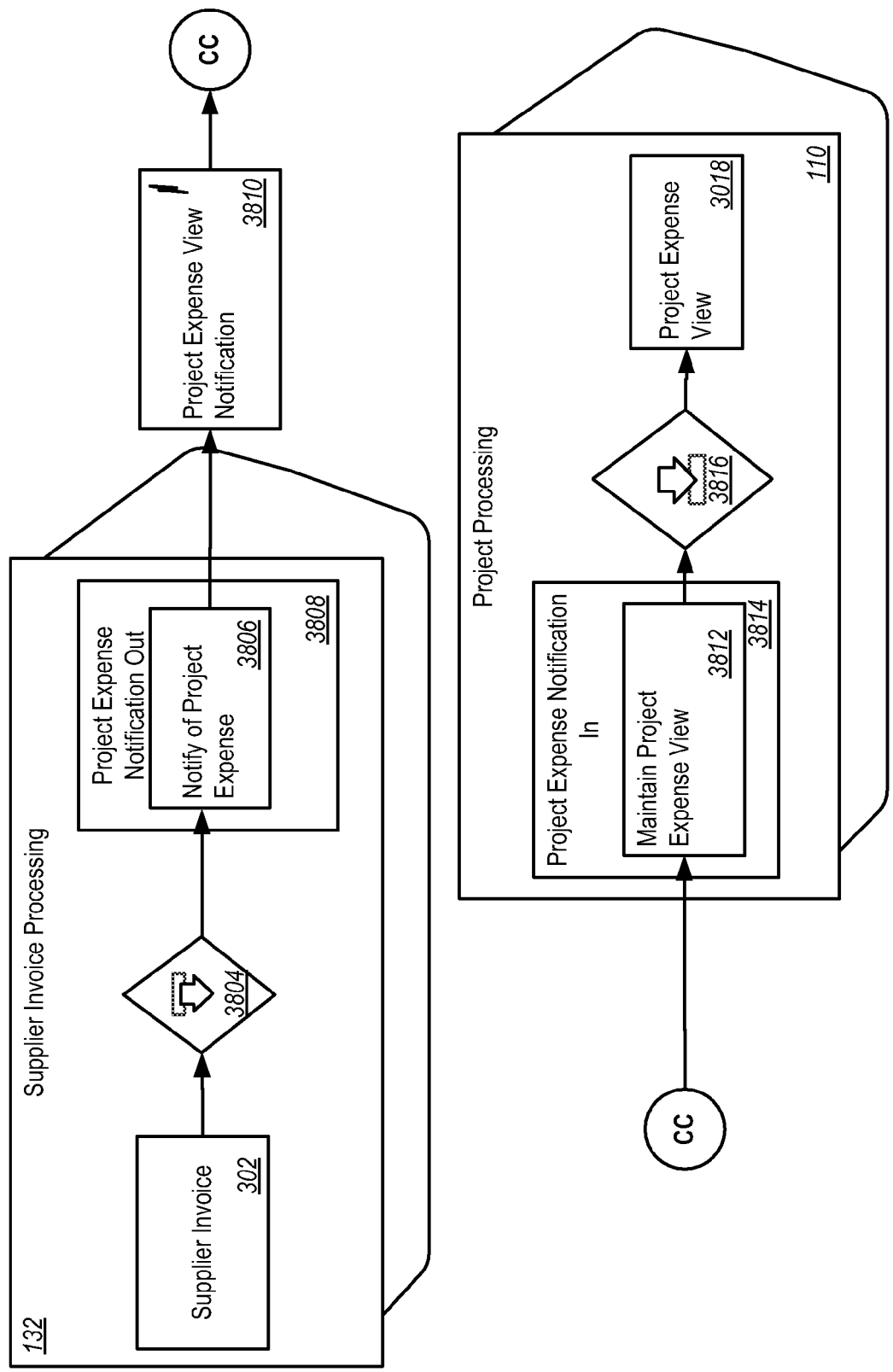
FIG. 38 is a block diagram showing interactions between the Supplier Invoice Processing process component and the Project Processing process component.

FIG. 38 is a block diagram showing interactions between the Supplier Invoice Processing process component 132 and the Project Processing process component 110 in the architectural design of FIGS. 1A-1E. The interaction starts with a notification to the Project Processing process component 110 about the creation or change of a supplier invoice that has recorded an expense on a project.

As shown in FIG. 38, the Supplier Invoice Processing process component 132 includes the Supplier Invoice business object 302. The Supplier Invoice business object 302 represents a company's obligation to pay the supplier for delivered goods and services. For example, if the company returns goods or complains about services, the supplier can issue a credit memo for an amount equal to or lower than the original invoice, and can refund the money to the company. For example, for invoiced goods that require a duty, a customs duty invoice can be submitted by the customs authority, stating a company's obligation to pay tax on the import or export of goods.

The Supplier Invoice business object 302 uses a Notify of Project Expense from Supplier Invoice to Project Processing outbound process agent 3804 to invoke a Notify of Project Expense operation 3806. The operation 3806 is included in a Project Expense Notification Out interface 3808. The Notify of Project Expense operation 3806 notifies project processing about a supplier invoice related to a project. The operation 3806 generates a Project Expense View Notification message 3810.

A Maintain Project Expense View operation 3812 receives the Project Expense View Notification message 3810. The operation 3812 is included in a Project Expense Notification In interface 3814. The Maintain Project Expense View operation 3812 creates or cancels a project expense. The operation 3812 uses a Maintain Project Expense View inbound process agent 3816 to update the Project Expense Review business object 3018. The Project Expense Review business object 3018 represents a project management view of a project-related expense resulting from a business transaction.

Interactions Between Process Components "Supplier Invoice Processing" and "Customer Invoice Processing at Supplier"

Figure 39:
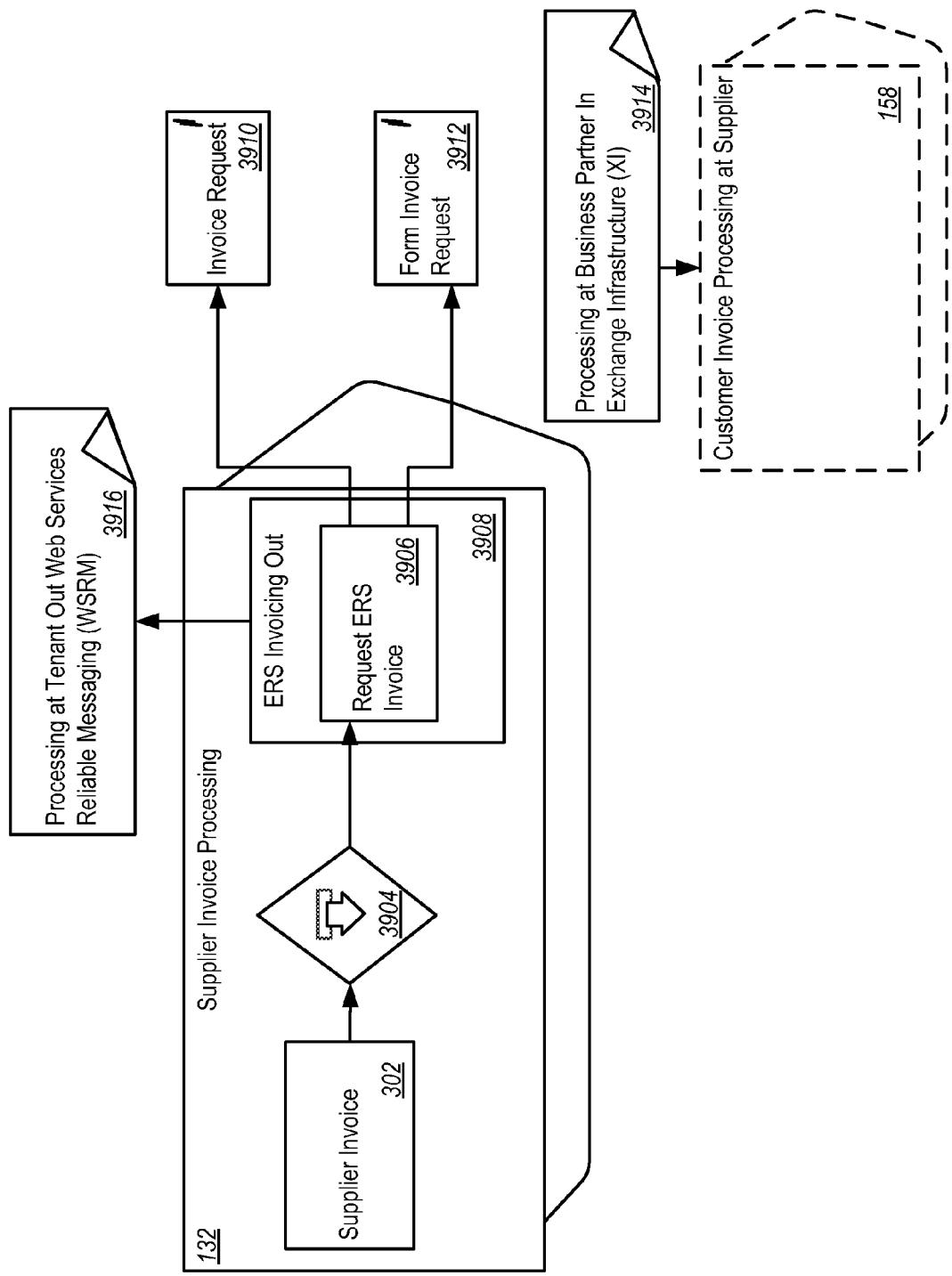
FIG. 39 is a block diagram showing interactions between the Supplier Invoice Processing process component and a Customer Invoice Processing at Supplier process component.

FIG. 39 is a block diagram showing interactions between the Supplier Invoice Processing process component 132 and a Customer Invoice Processing at Supplier process component 158 in the architectural design of FIGS. 1A-1E. The interaction starts with the requesting of the creation of a customer invoice based on the data from an invoice that is automatically created by evaluated receipt settlement in the Supplier Invoice Processing process component 132.

As shown in FIG. 39, the Supplier Invoice Processing process component 132 includes the Supplier Invoice business object 302. The Supplier Invoice business object 302 represents a company's obligation to pay the supplier for delivered goods and services. For example, if the company returns goods or complains about services, the supplier can issue a credit memo for an amount equal to or lower than the original invoice, and can refund the money to the company. For example, for invoiced goods that require a duty, a customs duty invoice can be submitted by the customs authority, stating a company's obligation to pay tax on the import or export of goods.

The Supplier Invoice business object 302 uses a Request Evaluated Receipt Settlement Invoice to Supplier outbound process agent 3904 to invoke a Request Evaluated Receipt Settlement Invoicing Out operation 3906. The operation 3906 is included in an Evaluated Receipt Settlement Invoicing Out interface 3908. The Request Evaluated Receipt Settlement Invoicing Out operation 3906 requests the creation of a customer invoice based on the data from an invoice created by evaluated receipt settlement. The operation 3906 generates an Invoice Request message 3910 and a Form Invoice Request message 3912. The Invoice Request message 3910 is a message type to enable form-based output for an invoice request. The Form Invoice Request message 3912 is a request to create a customer invoice based on the data from an invoice created by evaluated receipt settlement.

The Supplier Invoice Processing process component 132 receives information from a Processing at Tenant Out Web Services Reliable Messaging (WSRM) communication channel template 3916. The communication channel template 3916 can define protocols and parameters used for communication with an external party.

The Customer Invoice Processing at Supplier process component 3914 receives information from a Processing at Business Partner In Exchange Infrastructure (XI) communication channel template 3914. The communication channel template 3914 can define protocols and parameters used for communication with an external party.

Interactions Between Process Components "Due Item Processing" and "Due Item Processing at Business Partner"

Figure 40:
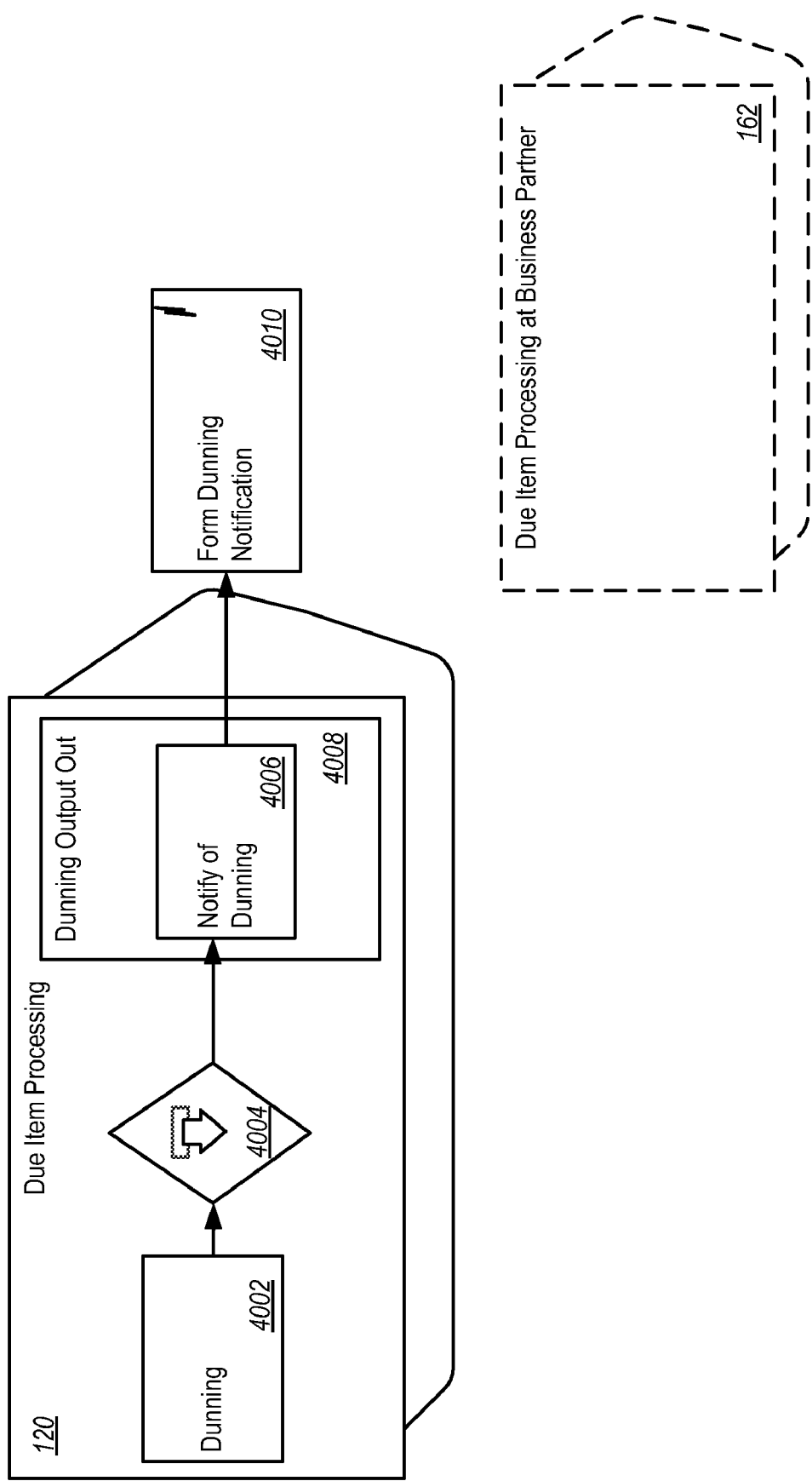
FIG. 40 is a block diagram showing interactions between the Due Item Processing process component and a Due Item Processing at Business Partner process component.

FIG. 40 is a block diagram showing interactions between the Due Item Processing process component 120 and a Due Item Processing at Business Partner process component 162 in the architectural design of FIGS. 1A-1E. The interaction starts with a notification from a business partner about outstanding receivables and expected payments when a dunning is released in the Due Item Processing process component 120.

As shown in FIG. 40, the Due Item Processing process component 120 includes a Dunning business object 4002. The Dunning business object 4002 represents a reminder or demand from a company (creditor) to a business partner (debtor) to make a payment by a certain point in time.

The Dunning business object 4002 uses a Notify of Dunning to Business Partner outbound process agent 4004 to invoke a Notify of Dunning operation 4006. The operation 4006 is included in a Dunning Output Out interface 4008. The Notify of Dunning operation 4006 notifies the business partner about outstanding payments. The operation 4006 generates a Form Dunning Notification message 4008.

Interactions Between Process Components "Goods and Service Acknowledgement" and "Accounting"

Figure 41:
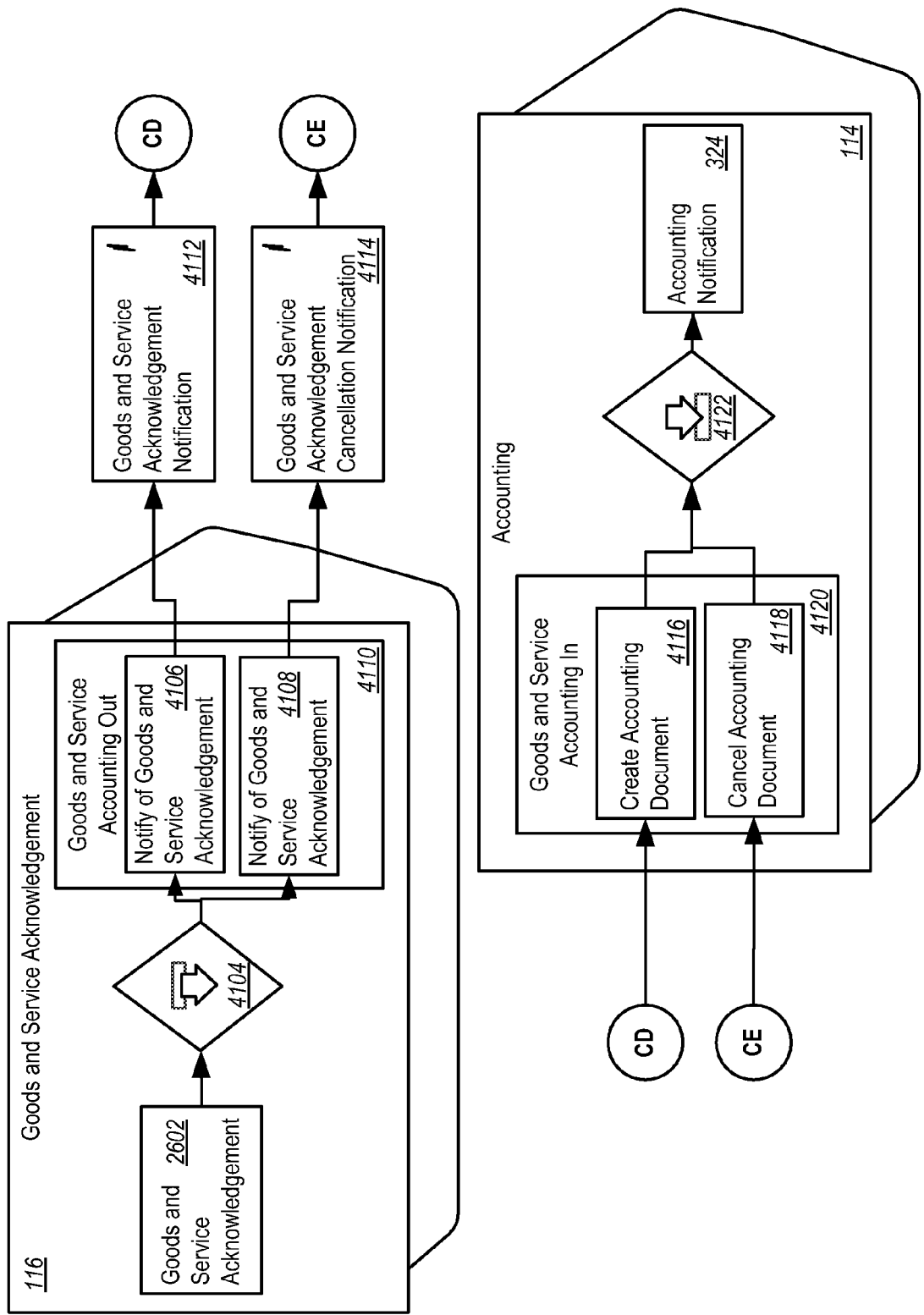
FIG. 41 is a block diagram showing interactions between the Goods and Service Acknowledgement process component and the Accounting process component.

FIG. 41 is a block diagram showing interactions between the Goods and Service Acknowledgement process component 116 and the Accounting process component 114 in the architectural design of FIGS. 1A-1E. The interaction starts when a goods and service acknowledgment is created or cancelled. In some implementations, the Goods and Service Acknowledgement Processing process component 116 requests the creation or cancellation of accounting documents from the Accounting process component 114.

As shown in FIG. 41, the Goods and Service Acknowledgement process component 116 includes the Goods and Service Acknowledgement business object 2602. The Goods and Service Acknowledgement business object 2602 represents a document that reports the receipt of goods and services or the return of goods.

The Goods and Service Acknowledgement business object 2602 uses a Notify of Goods and Service Acknowledgment to Accounting outbound process agent 4104 to invoke a Notify of Goods and Service Acknowledgement operation 4106 or a Notify of Goods and Service Acknowledgement Cancellation operation 4108. The Notify of Goods and Service Acknowledgement operation 4106 notifies the Accounting process component 114 about the creation of a goods and service acknowledgement that is relevant for accounting. The Notify of Goods and Service Acknowledgement Cancellation operation 4108 notifies the Accounting process component 114 about the cancellation of a goods and service acknowledgement that is relevant for accounting. The operations 4106 and 4108 are included in a Goods and Service Accounting Out interface 4110. The Notify of Goods and Service Acknowledgement operation 4106 generates a Goods And Service Acknowledgement Accounting Notification message 4112.

A Create Accounting Document operation 4116 receives the message 4112. The Create Accounting Document operation 4116 creates an accounting document based on goods movement or resource consumption data received from the Goods and Service Acknowledgement process component 116. For example, the received data can first be converted into an accounting notification from which one or more accounting documents are created according to the relevant sets of books. The Create Accounting Document operation 4116 is included in a Goods and Service Accounting In interface 4120. The operation 4116 uses a Maintain Accounting Document based on Goods and Service Acknowledgement inbound process agent 4122 to update the Accounting Notification business object 324. The Accounting Notification business object 324 represents a notification sent to financial accounting by an operational component regarding a business transaction. It can represent this operational business transaction in a standardized form for all business transaction documents and can contain the data needed to valuate the business transaction.

The Notify of Goods and Service Acknowledgement Cancellation operation 4108 generates a Goods and Service Acknowledgement Cancellation Accounting Notification message 4114. A Cancel Accounting Document operation 4118, in the Goods and Service Accounting In interface 4120, receives the Goods And Service Acknowledgement Cancellation Accounting Notification message 4114 from the Goods and Service Acknowledgement process component 116. The Cancel Accounting Document operation 4118 cancels an existing accounting document based on cancellation data received from the Goods and Service Acknowledgement process component 116. For example, the received data can be converted into an accounting notification from which one or more reversal accounting documents are created according to the relevant sets of books. The operation 4118 uses the Maintain Accounting Document based on Goods and Service Acknowledgement inbound process agent 4122 to update the Accounting Notification business object 324.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising instructions encoded on a non-transitory, computer-readable medium, the instructions being structured as process components interacting with each other through service interfaces, the instructions operable when executed by at least one processor to:

define a plurality of process components, each of the process components comprising a modular and application-independent package of reusable, granular software implementing a respective and distinct business process, the business process comprising functionality exposed by the process component via a corresponding service interface, the plurality of process components including:

an opportunity processing process component for developing, processing, and monitoring of opportunities to initiate sales and service deals;

a customer quote processing process component for processing of quotes to customers offering delivery of goods according to specific terms;

a sales order processing process component for processing of customers' requests to seller for delivery of goods, on a specific date, for a specific quantity, and for a specific price;

a customer relationship auxiliaries processing process component for processing of supplementary functions that support customer relationship management;

a project processing process component for structuring, planning, and executing simple short-term measures and complex projects;

a customer project invoice preparation processing component for creating invoice requisitions for a customer project based on the expenses incurred, the project progress, and the invoicing agreements;

a customer invoice processing process component for invoicing of customers for the delivery of goods or the provision of services;

a purchase request processing process component for creating, changing, and processing purchase requests to locate appropriate external sources of supply;

a purchase order processing process component for creating and maintaining purchase orders and purchase order confirmations;

a goods and service acknowledgement process component for confirming received goods or rendered services by an employee;

a purchasing contract processing process component that is responsible for creating and maintaining purchasing contracts;

a supplier invoice processing process component for managing and volume processing supplier invoices;

a due item processing process component for collecting, managing, and monitoring trade receivables or payables and corresponding sales tax or withholding tax;

a balance of foreign payment management process component for collection, processing, and reporting of receivables and payables according to foreign trade regulations that are required by the financial authority of a country;

an accounting process component for recording relevant business transactions for valuation and profitability analysis;

a costing process component for estimating costs for materials, projects, service products, sales order items, and production lots; and a payment processing process component for processing and managing payments, associated communication with financial institutions, and providing the primary input for liquidity management; and define a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based pair-wise interaction between the respective process components of the respective operations, the pair-wise interactions between pairs of the process components including interactions between:

the sales order processing process component and the customer project invoice preparation processing component, where the pair-wise interaction between the sales order processing process component and the customer project invoice preparation process component includes the transmission of:

a customer project invoicing agreement maintain request message from the sales order processing process component to the customer project invoice preparation process component, the customer project invoicing agreement maintain request message comprising a request for invoicing of a customer project; and a customer project invoicing agreement maintain confirmation message from the customer project invoice preparation process component to the sales order processing process component, the customer project invoicing agreement maintain confirmation message comprising a confirmation to sales order processing that a customer invoice was created in response to a corresponding customer project invoicing agreement maintain request message;

the project processing process component and the costing process component, where the pair-wise interaction between the project processing process component and the costing process component includes the transmission of:

a project cost estimate request message from the project processing process component to the costing process component, the project cost estimate request message comprising a notification to the costing project regarding creation or modification of at least one costing-relevant project element;

the project processing process component and the purchase request processing process component, where the pair-wise interaction between the project processing process component and the purchase request processing process component includes the transmission of:

a purchase request message from the project processing process component and the purchase request processing process component, the purchase request message comprising a request for the purchase request processing process component to externally procure services for a project;

a purchase request confirmation message from the purchase request processing process component to the project processing process component, the purchase request confirmation message comprising a confirmation of creation, modification, or cancellation of a purchase request to the corresponding requester;

the project processing process component and the supplier invoice processing process component, where the pair-wise interaction between the project processing process component and the supplier invoice processing process component includes the transmission of:

a project expense view notification message from the project processing process component to the supplier invoice processing process component, the project expense view notification message comprising a notification to project processing regarding a supplier invoice related to a particular project;

the customer project invoice preparation process component and the customer invoice processing process component, where the pair-wise interaction between the customer project invoice preparation process component and the customer invoice processing process component includes the transmission of:

a customer invoice request message from the customer project invoice preparation process component to the customer invoice processing process component, the customer invoice request message comprising a request for creation of a customer invoice request or update to a previously created customer invoice request; and a customer invoice issued confirmation message from the customer invoice processing process component to the customer project invoice preparation process component, the customer invoice issued confirmation message comprising a confirmation of invoicing in response to the customer invoice request message;

the customer invoice processing process component and the accounting process component, where the pair-wise interaction between the customer invoice processing process component and the accounting process component includes the transmission of:

an invoice accounting notification message from the customer invoice processing process component to the accounting process component, the invoice accounting notification message comprising a notification informing accounting regarding creation of invoices or credit memos; and an invoice cancellation accounting notification from the customer invoice processing process component to the accounting process component, the invoice cancellation accounting notification message comprising a notification informing accounting of cancellation of a previously created invoice or credit memo;

the due item processing process component and the customer invoice processing process component, where the pair-wise interaction between the due item processing process component and the customer invoice processing process component includes the transmission of:

a due clearing notification message from the due item processing process component to the customer invoice processing process component, the due clearing notification message comprising a notification to customer invoice processing regarding clearing of trade receivables;

the customer invoice processing process component and the balance of foreign payment management process component, where the pair-wise interaction between the customer invoice processing process component and the balance of foreign payment management process component includes the transmission of:

a foreign receivable payable notification message from the customer invoice processing process component to the balance of foreign payment management process component, the foreign receivable payable notification message comprising a notification to customer invoice processing regarding an invoice to track a receivable from or a payable to a non-resident business partner; and a foreign receivable payable cancellation notification message from the customer invoice processing process component to the balance of foreign payment management process component, the foreign receivable payable cancellation notification message comprising a notification to customer invoice processing regarding cancellation of an invoice to cancel information about a previously-tracked receivable from or a payable to a non-resident business partner;

the customer invoice processing process component and the supplier invoice processing process component, where the pair-wise interaction between the customer invoice processing process component and the supplier invoice processing process component includes the transmission of:

an invoice request message from the customer invoice processing process component to the supplier invoice processing process component, the invoice request message comprising a request to create a supplier invoice corresponding to a customer invoice containing claims or liabilities for delivered goods or services rendered;

the payment processing process component and the due item processing process component, where the pair-wise interaction between the payment processing process component and the due item processing process component includes the transmission of:

a clearing request message from the payment processing process component to the due item processing process component, the clearing request message comprising a request to clear at least one payment within due item processing;

a clearing cancellation request message from the payment processing process component to the due item processing process component, the clearing cancellation request message comprising a request to cancel a previously sent clearing request from due item processing by reference;

a clearing confirmation message from the due item processing process component to the payment processing process component, the clearing confirmation message comprising a confirmation to payment processing associated with a previously-sent clearing request message or clearing cancellation request message;

the supplier invoice processing process component and the due item processing process component, where the pair-wise interaction between the supplier invoice processing process component and the due item processing process component includes the transmission of:

a due clearing notification message from the due item processing process component to the supplier invoice processing process component, the due clearing notification message comprising a notification to supplier invoice processing regarding clearing of trade receivables;

the supplier invoice processing process component and the balance of foreign payment management process component, where the pair-wise interaction between the supplier invoice processing process component and the balance of foreign payment management process component includes the transmission of:

a foreign receivable payable notification message from the supplier invoice processing process component to the balance of foreign payment management process component, the foreign receivable payable notification message comprising a notification to supplier invoice processing regarding an invoice to track a receivable from or a payable to a non-resident business partner; and a foreign receivable payable cancellation notification message from the supplier invoice processing process component to the balance of foreign payment management process component, the foreign receivable payable cancellation notification message comprising a notification to supplier invoice processing regarding cancellation of an invoice to cancel information about a previously-tracked receivable from or a payable to a non-resident business partner;

the supplier invoice processing process component and the accounting process component, where the pair-wise interaction between the supplier invoice processing process component and the accounting process component includes the transmission of:
  an invoice accounting notification message from the supplier invoice processing process component to the accounting process component, the invoice accounting notification message comprising a notification informing accounting regarding creation of invoices or credit memos; and
  an invoice cancellation accounting notification from the supplier invoice processing process component to the accounting process component, the invoice cancellation accounting notification message comprising a notification informing accounting of cancellation of a previously created invoice or credit memo;

the purchase order processing process component and the accounting process component, where the pair-wise interaction between the purchase order processing process component and the accounting process component includes the transmission of:
  a sales and purchasing accounting notification message from the purchase order processing process component to the accounting process component, the sales and purchasing accounting notification message comprising a notification to accounting of creation, modification, or cancellation of a particular purchase order;

the purchase order processing process component and the sales order processing process component, where the pair-wise interaction between the purchase order processing process component and the sales order processing process component includes the transmission of:
  a purchase order request message from the purchase order processing process component to the sales order processing process component, the purchase order request message comprising a request to sales order processing to process a new purchase order;
  a purchase order change request message from the purchase order processing process component to the sales order processing process component, the purchase order change request message comprising a request to sales order processing to modify a previously-sent purchase order request;
  a purchase order cancellation request message from the purchase order processing process component to the sales order processing process component, the purchase order cancellation request message comprising a request to sales order processing to cancel a previously-sent purchase order; and
  a purchase order confirmation message from the purchase order processing process component to the sales order processing process component, the purchase order confirmation message comprising a confirmation of modifications to a customer of changes to a particular purchase order;

the purchase order processing process component and the supplier invoice processing process component, where the pair-wise interaction between the purchase order processing process component and the supplier invoice processing process component includes the transmission of:
  an invoicing due notification message from the purchase order processing process component to the supplier invoice processing process component, the invoicing due notification message comprising a notification to supplier invoice processing regarding a new, changed, or cancelled purchase order; and
  a purchase order invoice values notification message from the supplier invoice processing process component to the purchase order processing process component, the purchase order invoice values notification message comprising a notification regarding actual values and qualities of a particular supplier invoice that is saved and contains a reference to a particular purchase order;

the goods and service acknowledgement process component and the accounting process component, where the pair-wise interaction between the goods and service acknowledgement process component and the accounting process component includes the transmission of:
  a goods and service acknowledgement notification message from the goods and service acknowledgement process component to the accounting process component, the goods and service acknowledgement notification message comprising a notification to accounting regarding creation of a goods and service acknowledgement relevant to accounting; and
  a goods and service acknowledgement cancellation notification message from the goods and service acknowledgement process component to the accounting process component, the goods and service acknowledgement cancellation notification message comprising a notification to accounting regarding cancellation of a previously-sent goods and service acknowledgment;

the goods and service acknowledgement process component and the supplier invoice processing process component, where the pair-wise interaction between the goods and service acknowledgement process component and the supplier invoice processing process component includes the transmission of:
  an invoicing due notification message from the goods and service acknowledgement process component to the supplier invoice processing process component, the invoicing due notification message comprising a notification of invoicing-relevant data regarding delivered materials and services rendered to supplier invoice processing; and the supplier invoice processing process component and the purchasing contract processing process component, where the pair-wise interaction between the supplier invoice processing process component and the purchasing contract processing process component includes the transmission of:
  a purchasing contract release notification message from the supplier invoice processing process component to the purchasing contract processing process component, the purchasing contract release notification message comprising a notification regarding posting of a supplier invoice that contains a reference to a particular purchasing contract.

2. The product of claim 1, wherein:
the plurality of process components further includes:
- a time and labor management process component for managing employees' planned working times, and the recording and valuating of work performed and absence times;
- an expense and reimbursement management process component for managing and monitoring of expenses incurred by employees, and the reimbursement of expenses to employees; and
- an inventory processing process component for managing inventory and recording of inventory changes, and providing services to maintain current stock, content and structure of logistic units and allocations; and the pair-wise interactions between pairs of the process components further include interactions between:
- a purchase order processing at customer process component and the sales order processing process component;
- the time and labor management process component and the accounting process component;
- the project processing process component and the time and labor management process component;
- the time and labor management process component and the goods and services acknowledgement process component;
- the expense and reimbursement management process component and the project processing process component;
- the expense and reimbursement management process component and the accounting process component;
- the inventory processing process component and the project processing process component;
- the inventory processing process component and the accounting process component;
- the due item processing process component and a due item processing at business partner process component;
- the payment processing process component and a payment processing at business partner process component;
- the payment processing process component and a bank statement creation at bank process component;
- the purchase order processing process component and a sales order processing at supplier process component;
- the payment processing process component and a payment order processing at house bank process component; and
- the supplier invoice processing process component and a customer invoice processing at supplier process component.

3. The product of claim 1, wherein:
each of the plurality of process components is assigned to exactly one deployment unit among multiple deployment units, and each deployment unit is deployable on a separate computer hardware platform independent of every other deployment unit; and
all interaction between a process component in one deployment unit and any other process component in any other deployment unit takes place through the respective service interfaces of the two process components.

4. The product of claim 3, wherein the deployment units comprise:
- a customer relationship management deployment unit that includes the opportunity processing, the customer quote processing, the sales order processing, and the customer relationship auxiliaries processing process components;
- a project management deployment unit that includes the project processing and the customer project invoice preparation process components;
- a customer invoice deployment unit that includes the customer invoice processing process component;
- a purchasing deployment unit that includes the purchase request processing, the purchase order processing, the goods and service acknowledgement, and the purchasing contract processing process components;
- a supplier invoicing deployment unit that includes the supplier invoice processing process component;
- a financials deployment unit that includes the due item processing, the accounting, the balance of foreign payment management, the costing, and the payment processing process components;
- a human capital management deployment unit that includes the time and labor management process component;
- an expense and reimbursement management deployment unit that includes the expense and reimbursement management process component; and
- a production and site logistics execution deployment unit that includes the inventory processing process component.

5. The product of claim 1, wherein:
each of the process components includes one or more business objects; and
none of the business objects of any one of the process components interacts directly with any of the business objects included in any of the other process components.

6. The product of claim 5, wherein the business objects comprise a business process object.

7. The product of claim 5, wherein none of the business objects included in any one of the process components is included in any of the other process components.

8. The product of claim 1, further comprising a plurality of process agents, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

9. The product of claim 8, wherein each inbound process agent comprises a first inbound process agent operable to start an execution of a business process step requested in a first inbound message by creating or updating at least one business object instance.

10. The product of claim 8, wherein the outbound process agents comprise a first asynchronous outbound process agent that is called after a business object that is associated with the first outbound process agent changes.

11. The product of claim 1, wherein the operations comprise synchronous and asynchronous operations.

12. A system, comprising:
a computer system comprising at least one hardware platform for executing computer instructions, the computer instructions structured as a plurality of process components interacting with each other through service interfaces, each hardware platform including at least one processor for executing the computer instructions;
at least one memory storing a plurality of process components executable by the respective processor of the particular hardware platform, each of the process components comprising a modular and application-independent package of reusable granular software implementing a respective and distinct business process, the business process comprising functionality exposed by the process component via at least one service interface, the plurality of process components including: a purchase request processing process component that creates, changes, and processes purchase requests to locate appropriate external sources of supply:

an opportunity processing process component for developing, processing, and monitoring of opportunities to initiate sales and service deals;

a customer quote processing process component for processing of quotes to customers offering delivery of goods according to specific terms;

a sales order processing process component for processing of customers' requests to seller for delivery of goods, on a specific date, for a specific quantity, and for a specific price;

a customer relationship auxiliaries processing process component for processing of supplementary functions that support customer relationship management;

a project processing process component for structuring, planning, and executing simple short-term measures and complex projects;

a customer project invoice preparation processing component for creating invoice requisitions for a customer project based on the expenses incurred, the project progress, and the invoicing agreements;

a customer invoice processing process component for invoicing of customers for the delivery of goods or the provision of services;

a purchase request processing process component for creating, changing, and processing purchase requests to locate appropriate external sources of supply;

a purchase order processing process component for creating and maintaining purchase orders and purchase order confirmations;

a goods and service acknowledgement process component for confirming received goods or rendered services by an employee;

a purchasing contract processing process component that is responsible for creating and maintaining purchasing contracts;

a supplier invoice processing process component for managing and volume processing supplier invoices;

a due item processing process component for collecting, managing, and monitoring trade receivables or payables and corresponding sales tax or withholding tax;

a balance of foreign payment management process component for collection, processing, and reporting of receivables and payables according to foreign trade regulations that are required by the financial authority of a country;

an accounting process component for recording relevant business transactions for valuation and profitability analysis;

a costing process component for estimating costs for materials, projects, service products, sales order items, and production lots; and a payment processing process component for processing and managing payments, associated communication with financial institutions, and providing the primary input for liquidity management; and the memory further storing a plurality of service interfaces, each service interface associated with exactly one process component and comprising at least one operation, each operation being implemented for exactly one process component, the operations comprising inbound and outbound operations, the outbound operation for a first process component being operable to send a message to a second process component of the plurality of process components, the second process component having an inbound operation for receiving the message, the sending and receiving of messages between an inbound and an outbound operation defining a message-based pair-wise interaction between the respective process components of the respective operations, the pair-wise interactions between pairs of the process components including interactions between:

the sales order processing process component and the customer project invoice preparation process component, where the pair-wise interaction between the sales order processing process component and the customer project invoice preparation process component includes the transmission of:

a customer project invoicing agreement maintain request message from the sales order processing process component to the customer project invoice preparation process component, the customer project invoicing agreement maintain request message comprising a request for invoicing of a customer project; and a customer project invoicing agreement maintain confirmation message from the customer project invoice preparation process component to the sales order processing process component, the customer project invoicing agreement maintain confirmation message comprising a confirmation to sales order processing that a customer invoice was created in response to a corresponding customer project invoicing agreement maintain request message;

the project processing process component and the costing process component where the pair-wise interaction between the project processing process component and the costing process component includes the transmission of:

a project cost estimate request message from the project processing process component to the costing process component, the project cost estimate request message comprising a notification to the costing project regarding creation or modification of at least one costing-relevant project element;

the project processing process component and the purchase request processing process component, where the pair-wise interaction between the project processing process component and the purchase request processing process component includes the transmission of:

a purchase request message from the project processing process component and the purchase request processing process component, the purchase request message comprising a request for the purchase request processing process component to externally procure services for a project;

a purchase request confirmation message from the purchase request processing process component to the project processing process component, the purchase request confirmation message comprising a confirmation of creation, modification, or cancellation of a purchase request to the corresponding requester;

the project processing process component and the supplier invoice processing process component, where the pair-wise interaction between the project processing process component and the supplier invoice processing process component includes the transmission of:
  a project expense view notification message from the project processing process component to the supplier invoice processing process component, the project expense view notification message comprising a notification to project processing regarding a supplier invoice related to a particular project;
the customer project invoice preparation process component and the customer invoice processing process component, where the pair-wise interaction between the customer project invoice preparation process component and the customer invoice processing process component includes the transmission of:
  a customer invoice request message from the customer project invoice preparation process component to the customer invoice processing process component, the customer invoice request message comprising a request for creation of a customer invoice request or update to a previously created customer invoice request; and
  a customer invoice issued confirmation message from the customer invoice processing process component to the customer project invoice preparation process component, the customer invoice issued confirmation message comprising a confirmation of invoicing in response to the customer invoice request message;
the customer invoice processing process component and the accounting process component, where the pair-wise interaction between the customer invoice processing process component and the accounting process component includes the transmission of:
  an invoice accounting notification message from the customer invoice processing process component to the accounting process component, the invoice accounting notification message comprising a notification informing accounting regarding creation of invoices or credit memos; and
  an invoice cancellation accounting notification from the customer invoice processing process component to the accounting process component, the invoice cancellation accounting notification message comprising a notification informing accounting of cancellation of a previously created invoice or credit memo;
the due item processing process component and the customer invoice processing process component, where the pair-wise interaction between the due item processing process component and the customer invoice processing process component includes the transmission of:
  a due clearing notification message from the due item processing process component to the customer invoice processing process component, the due clearing notification message comprising a notification to customer invoice processing regarding clearing of trade receivables;
the customer invoice processing process component and the balance of foreign payment management process component, where the pair-wise interaction between the customer invoice processing process component and the balance of foreign payment management process component includes the transmission of:
  a foreign receivable payable notification message from the customer invoice processing process component to the balance of foreign payment management process component, the foreign receivable payable notification message comprising a notification to customer invoice processing regarding an invoice to track a receivable from or a payable to a non-resident business partner; and
  a foreign receivable payable cancellation notification message from the customer invoice processing process component to the balance of foreign payment management process component, the foreign receivable payable cancellation notification message comprising a notification to customer invoice processing regarding cancellation of an invoice to cancel information about a previously-tracked receivable from or a payable to a non-resident business partner;
the customer invoice processing process component and the supplier invoice processing process component, where the pair-wise interaction between the customer invoice processing process component and the supplier invoice processing process component includes the transmission of:
  an invoice request message from the customer invoice processing process component to the supplier invoice processing process component, the invoice request message comprising a request to create a supplier invoice corresponding to a customer invoice containing claims or liabilities for delivered goods or services rendered;
the payment processing process component and the due item processing process component, where the pair-wise interaction between the payment processing process component and the due item processing process component includes the transmission of:
  a clearing request message from the payment processing process component to the due item processing process component, the clearing request message comprising a request to clear at least one payment within due item processing;
  a clearing cancellation request message from the payment processing process component to the due item processing process component, the clearing cancellation request message comprising a request to cancel a previously sent clearing request from due item processing by reference;
  a clearing confirmation message from the due item processing process component to the payment processing process component, the clearing confirmation message comprising a confirmation to payment processing associated with a previously-sent clearing request message or clearing cancellation request message ;
the supplier invoice processing process component and the due item processing process component, where the pair-wise interaction between the supplier invoice processing process component and the due item processing process component includes the transmission of:
  a due clearing notification message from the due item processing process component to the supplier invoice processing process component, the due clearing notification message comprising a notification to supplier invoice processing regarding clearing of trade receivables;
the supplier invoice processing process component and the balance of foreign payment management process component, where the pair-wise interaction between the supplier invoice processing process component and the balance of foreign payment management process component includes the transmission of:
- a foreign receivable payable notification message from the supplier invoice processing process component to the balance of foreign payment management process component, the foreign receivable payable notification message comprising a notification to supplier invoice processing regarding an invoice to track a receivable from or a payable to a non-resident business partner; and
- a foreign receivable payable cancellation notification message from the supplier invoice processing process component to the balance of foreign payment management process component, the foreign receivable payable cancellation notification message comprising a notification to supplier invoice processing regarding cancellation of an invoice to cancel information about a previously-tracked receivable from or a payable to a non-resident business partner;

the supplier invoice processing process component and the accounting process component, where the pair-wise interaction between the supplier invoice processing process component and the accounting process component includes the transmission of:
- an invoice accounting notification message from the supplier invoice processing process component to the accounting process component, the invoice accounting notification message comprising a notification informing accounting regarding creation of invoices or credit memos; and
- an invoice cancellation accounting notification from the supplier invoice processing process component to the accounting process component, the invoice cancellation accounting notification message comprising a notification informing accounting of cancellation of a previously created invoice or credit memo;

the purchase order processing process component and the accounting process component, where the pair-wise interaction between the purchase order processing process component and the accounting process component includes the transmission of:
- a sales and purchasing accounting notification message from the purchase order processing process component to the accounting process component, the sales and purchasing accounting notification message comprising a notification to accounting of creation, modification, or cancellation of a particular purchase order;

the purchase order processing process component and the sales order processing process component, where the pair-wise interaction between the purchase order processing process component and the sales order processing process component includes the transmission of:
- a purchase order request message from the purchase order processing process component to the sales order processing process component, the purchase order request message comprising a request to sales order processing to process a new purchase order:
- a purchase order change request message from the purchase order processing process component to the sales order processing process component, the purchase order change request message comprising a request to sales order processing to modify a previously-sent purchase order request;
- a purchase order cancellation request message from the purchase order processing process component to the sales order processing process component, the purchase order cancellation request message comprising a request to sales order processing to cancel a previously-sent purchase order; and
- a purchase order confirmation message from the purchase order processing process component to the sales order processing process component, the purchase order confirmation message comprising a confirmation of modifications to a customer of changes to a particular purchase order;

the purchase order processing process component and the supplier invoice processing process component, where the pair-wise interaction between the purchase order processing process component and the supplier invoice processing process component includes the transmission of:
- an invoicing due notification message from the purchase order processing process component to the supplier invoice processing process component, the invoicing due notification message comprising a notification to supplier invoice processing regarding a new, changed, or cancelled purchase order; and
- a purchase order invoice values notification message from the supplier invoice processing process component to the purchase order processing process component, the purchase order invoice values notification message comprising a notification regarding actual values and qualities of a particular supplier invoice that is saved and contains a reference to a particular purchase order;

the goods and service acknowledgement process component and the accounting process component, where the pair-wise interaction between the goods and service acknowledgement process component and the accounting process component includes the transmission of:
- a goods and service acknowledgement notification message from the goods and service acknowledgement process component to the accounting process component, the goods and service acknowledgement notification message comprising a notification to accounting regarding creation of a goods and service acknowledgement relevant to accounting; and
- a goods and service acknowledgement cancellation notification message from the goods and service acknowledgement process component to the accounting process component, the goods and service acknowledgement cancellation notification message comprising a notification to accounting regarding cancellation of a previously-sent goods and service acknowledgment;

the goods and service acknowledgement process component and the supplier invoice processing process component, where the pair-wise interaction between the goods and service acknowledgement process component and the supplier invoice processing process component includes the transmission of:
- an invoicing due notification message from the goods and service acknowledgement process component to the supplier invoice processing process component, the invoicing due notification message comprising a notification of invoicing-relevant data regarding delivered materials and services rendered to supplier invoice processing; and the supplier invoice processing process component and the purchasing contract processing process component, where the pair-wise interaction between the supplier invoice processing process component and the purchasing contract processing process component includes the transmission of:

a purchasing contract release notification message from the supplier invoice processing process component to the purchasing contract processing process component, the purchasing contract release notification message comprising a notification regarding posting of a supplier invoice that contains a reference to a particular purchasing contract.

13. The system of claim 12, wherein:
the plurality of process components further includes:
   a time and labor management process component for managing employees' planned working times, and the recording and valuating of work performed and absence times;
   an expense and reimbursement management process component for managing and monitoring of expenses incurred by employees, and the reimbursement of expenses to employees; and
   an inventory processing process component for managing inventory and recording of inventory changes, and providing services to maintain current stock, content and structure of logistic units and allocations; and
the pair-wise interactions between pairs of the process components further include interactions between:
   a purchase order processing at customer process component and the sales order processing process component;
   the time and labor management process component and the accounting process component;
   the project processing process component and the time and labor management process component;
   the time and labor management process component and the goods and services acknowledgement process component;
   the expense and reimbursement management process component and the project processing process component;
   the expense and reimbursement management process component and the accounting process component;
   the inventory processing process component and the project processing process component;
   the inventory processing process component and the accounting process component;
   the due item processing process component and a due item processing at business partner process component;
   the payment processing process component and a payment processing at business partner process component;
   the payment processing process component and a bank statement creation at bank process component;
   the purchase order processing process component and a sales order processing at supplier process component;
   the payment processing process component and a payment order processing at house bank process component; and the supplier invoice processing process component and a customer invoice processing at supplier process component.

14. The system of claim 12, wherein:
each of the process components includes one or more business objects; and
none of the business objects of any one of the process components interacts directly with any of the business objects included in any of the other process components.

15. The system of claim 12, wherein none of the business objects included in any one of the process components is included in any of the other process components.

16. The system of claim 12, further comprising a plurality of process agents, each process agent being either an inbound process agent or an outbound process agent, each inbound process agent being operable to receive a message from a corresponding inbound operation, each outbound process agent being operable to cause a corresponding outbound operation to send a message, each process agent being associated with exactly one process component.

17. The system of claim 12, the system comprising multiple hardware platforms, wherein:
   the opportunity processing, the customer quote processing, the sales order processing, and the customer relationship auxiliaries processing process components are deployed on a first hardware platform;
   the project processing and the customer project invoice preparation process components are deployed on a second hardware platform;
   the customer invoice processing process component is deployed on a third hardware platform;
   the purchase request processing, the purchase order processing, the goods and services acknowledgement, and the purchasing contract processing process components are deployed on a fourth hardware platform;
   the supplier invoice processing process component is deployed on a fifth hardware platform;
   the due item processing, the accounting, the balance of foreign payment management, the costing, and the payment processing process components are deployed on a sixth hardware platform;
   the time and labor management process component is deployed on a seventh hardware platform;
   the expense and reimbursement management process component is deployed on an eighth hardware platform; and
   the inventory processing process component is deployed on a ninth hardware platform.

18. The system of claim 17, wherein each of the first through the ninth hardware platforms are distinct and separate from each other.

19. A computer-implemented method for developing a computer software application, the method comprising the following steps performed by at least one processor:
   obtaining, in a programmable computer system having at least one processor, a storage medium, and an interface, digital data representing an architectural design for a set of processes implementing an end-to-end application process, the design specifying a process component for each process in the set of processes, each of the process components comprising a modular and application-independent package of reusable granular software implementing a respective and distinct business process, the business process comprising functionality exposed by the process component, and the design further specifying a set of process component interactions based on messages transmitted between two or more of the process components, wherein:

the specified process components include:
- an opportunity processing process component for developing, processing, and monitoring of opportunities to initiate sales and service deals;
- a customer quote processing process component for processing of quotes to customers offering delivery of goods according to specific terms;
- a sales order processing process component for processing of customers' requests to seller for delivery of goods, on a specific date, for a specific quantity, and for a specific price;
- a customer relationship auxiliaries processing process component for processing of supplementary functions that support customer relationship management;
- a project processing process component for structuring, planning, and executing simple short-term measures and complex projects;
- a customer project invoice preparation processing component for creating invoice requisitions for a customer project based on the expenses incurred, the project progress, and the invoicing agreements;
- a customer invoice processing process component for invoicing of customers for the delivery of goods or the provision of services;
- a purchase request processing process component for creating, changing, and processing purchase requests to locate appropriate external sources of supply;
- a purchase order processing process component for creating and maintaining purchase orders and purchase order confirmations;
- a goods and service acknowledgement process component for confirming received goods or rendered services by an employee;
- a purchasing contract processing process component that is responsible for creating and maintaining purchasing contracts;
- a supplier invoice processing process component for managing and volume processing supplier invoices;
- a due item processing process component for collecting, managing, and monitoring trade receivables or payables and corresponding sales tax or withholding tax;
- a balance of foreign payment management process component for collection, processing, and reporting of receivables and payables according to foreign trade regulations that are required by the financial authority of a country;
- an accounting process component for recording relevant business transactions for valuation and profitability analysis;
- a costing process component for estimating costs for materials, projects, service products, sales order items, and production lots; and
- a payment processing process component for processing and managing payments, associated communication with financial institutions, and providing the primary input for liquidity management; and the process component interactions include interactions between:
- the sales order processing process component and the customer project invoice preparation process component, where the pair-wise interaction between the sales order processing process component and the customer project invoice preparation process component includes the transmission of:
  - a customer project invoicing agreement maintain request message from the sales order processing process component to the customer project invoice preparation process component, the customer project invoicing agreement maintain request message comprising a request for invoicing of a customer project; and
  - a customer project invoicing agreement maintain confirmation message from the customer project invoice preparation process component to the sales order processing process component, the customer project invoicing agreement maintain confirmation message comprising a confirmation to sales order processing that a customer invoice was created in response to a corresponding customer project invoicing agreement maintain request message;
- the project processing process component and the costing process component, where the pair-wise interaction between the project processing process component and the costing process component includes the transmission of:
  - a project cost estimate request message from the project processing process component to the costing process component, the project cost estimate request message comprising a notification to the costing project regarding creation or modification of at least one costing-relevant project element;
- the project processing process component and the purchase request processing process component, where the pair-wise interaction between the project processing process component and the purchase request processing process component includes the transmission of:
  - a purchase request message from the project processing process component and the purchase request processing process component, the purchase request message comprising a request for the purchase request processing process component to externally procure services for a project;
  - a purchase request confirmation message from the purchase request processing process component to the project processing process component, the purchase request confirmation message comprising a confirmation of creation, modification, or cancellation of a purchase request to the corresponding requester;
- the project processing process component and the supplier invoice processing process component, where the pair-wise interaction between the project processing process component and the supplier invoice processing process component includes the transmission of:
  - a project expense view notification message from the project processing process component to the supplier invoice processing process component, the project expense view notification message comprising a notification to project processing regarding a supplier invoice related to a particular project;
- the customer project invoice preparation process component and the customer invoice processing process component, where the pair-wise interaction between the customer project invoice preparation process component and the customer invoice processing process component includes the transmission of:
  a customer invoice request message from the customer project invoice preparation process component to the customer invoice processing process component, the customer invoice request message comprising a request for creation of a customer invoice request or update to a previously created customer invoice request; and
  a customer invoice issued confirmation message from the customer invoice processing process component to the customer project invoice preparation process component, the customer invoice issued confirmation message comprising a confirmation of invoicing in response to the customer invoice request message;
the customer invoice processing process component and the accounting process component, where the pair-wise interaction between the customer invoice processing process component and the accounting process component includes the transmission of:
  an invoice accounting notification message from the customer invoice processing process component to the accounting process component, the invoice accounting notification message comprising a notification informing accounting regarding creation of invoices or credit memos; and
  an invoice cancellation accounting notification from the customer invoice processing process component to the accounting process component, the invoice cancellation accounting notification message comprising a notification informing accounting of cancellation of a previously created invoice or credit memo;
the due item processing process component and the customer invoice processing process component, where the pair-wise interaction between the due item processing process component and the customer invoice processing process component includes the transmission of:
  a due clearing notification message from the due item processing process component to the customer invoice processing process component, the due clearing notification message comprising a notification to customer invoice processing regarding clearing of trade receivables;
the customer invoice processing process component and the balance of foreign payment management process component, where the pair-wise interaction between the customer invoice processing process component and the balance of foreign payment management process component includes the transmission of:
  a foreign receivable payable notification message from the customer invoice processing process component to the balance of foreign payment management process component, the foreign receivable payable notification message comprising a notification to customer invoice processing regarding an invoice to track a receivable from or a payable to a non-resident business partner; and
  a foreign receivable payable cancellation notification message from the customer invoice processing process component to the balance of foreign payment management process component, the foreign receivable payable cancellation notification message comprising a notification to customer invoice processing regarding cancellation of an invoice to cancel information about a previously-tracked receivable from or a payable to a non-resident business partner;
the customer invoice processing process component and the supplier invoice processing process component, where the pair-wise interaction between the customer invoice processing process component and the supplier invoice processing process component includes the transmission of:
  an invoice request message from the customer invoice processing process component to the supplier invoice processing process component, the invoice request message comprising a request to create a supplier invoice corresponding to a customer invoice containing claims or liabilities for delivered goods or services rendered;
the payment processing process component and the due item processing process component, where the pair-wise interaction between the payment processing process component and the due item processing process component includes the transmission of:
  a clearing request message from the payment processing process component to the due item processing process component, the clearing request message comprising a request to clear at least one payment within due item processing;
  a clearing cancellation request message from the payment processing process component to the due item processing process component, the clearing cancellation request message comprising a request to cancel a previously sent clearing request from due item processing by reference;
  a clearing confirmation message from the due item processing process component to the payment processing process component, the clearing confirmation message comprising a confirmation to payment processing associated with a previously-sent clearing request message or clearing cancellation request message ;
the supplier invoice processing process component and the due item processing process component, where the pair-wise interaction between the supplier invoice processing process component and the due item processing process component includes the transmission of:
  a due clearing notification message from the due item processing process component to the supplier invoice processing process component, the due clearing notification message comprising a notification to supplier invoice processing regarding clearing of trade receivables;
the supplier invoice processing process component and the balance of foreign payment management process component, where the pair-wise interaction between the supplier invoice processing process component and the balance of foreign payment management process component includes the transmission of:
  a foreign receivable payable notification message from the supplier invoice processing process component to the balance of foreign payment management process component, the foreign receivable payable notification message comprising a notification to supplier invoice processing regarding an invoice to track a receivable from or a payable to a non-resident business partner; and a foreign receivable payable cancellation notification message from the supplier invoice processing process component to the balance of foreign payment management process component, the foreign receivable payable cancellation notification message comprising a notification to supplier invoice processing regarding cancellation of an invoice to cancel information about a previously-tracked receivable from or a payable to a non-resident business partner;

the supplier invoice processing process component and the accounting process component, where the pair-wise interaction between the supplier invoice processing process component and the accounting process component includes the transmission of:

an invoice accounting notification message from the supplier invoice processing process component to the accounting process component, the invoice accounting notification message comprising a notification informing accounting regarding creation of invoices or credit memos; and an invoice cancellation accounting notification from the supplier invoice processing process component to the accounting process component, the invoice cancellation accounting notification message comprising a notification informing accounting of cancellation of a previously created invoice or credit memo;

the purchase order processing process component and the accounting process component, where the pair-wise interaction between the purchase order processing process component and the accounting process component includes the transmission of:

a sales and purchasing accounting notification message from the purchase order processing process component to the accounting process component, the sales and purchasing accounting notification message comprising a notification to accounting of creation, modification, or cancellation of a particular purchase order;

the purchase order processing process component and the sales order processing process component, where the pair-wise interaction between the purchase order processing process component and the sales order processing process component includes the transmission of:

a purchase order request message from the purchase order processing process component to the sales order processing process component, the purchase order request message comprising a request to sales order processing to process a new purchase order;

a purchase order change request message from the purchase order processing process component to the sales order processing process component, the purchase order change request message comprising a request to sales order processing to modify a previously-sent purchase order request;

a purchase order cancellation request message from the purchase order processing process component to the sales order processing process component, the purchase order cancellation request message comprising a request to sales order processing to cancel a previously-sent purchase order; and a purchase order confirmation message from the purchase order processing process component to the sales order processing process component, the purchase order confirmation message comprising a confirmation of modifications to a customer of changes to a particular purchase order;

the purchase order processing process component and the supplier invoice processing process component, where the pair-wise interaction between the purchase order processing process component and the supplier invoice processing process component includes the transmission of:

an invoicing due notification message from the purchase order processing process component to the supplier invoice processing process component, the invoicing due notification message comprising a notification to supplier invoice processing regarding a new, changed, or cancelled purchase order; and a purchase order invoice values notification message from the supplier invoice processing process component to the purchase order processing process component, the purchase order invoice values notification message comprising a notification regarding actual values and qualities of a particular supplier invoice that is saved and contains a reference to a particular purchase order;

the goods and service acknowledgement process component and the accounting process component, where the pair-wise interaction between the goods and service acknowledgement process component and the accounting process component includes the transmission of:

a goods and service acknowledgement notification message from the goods and service acknowledgement process component to the accounting process component, the goods and service acknowledgement notification message comprising a notification to accounting regarding creation of a goods and service acknowledgement relevant to accounting; and a goods and service acknowledgement cancellation notification message from the goods and service acknowledgement process component to the accounting process component, the goods and service acknowledgement cancellation notification message comprising a notification to accounting regarding cancellation of a previously-sent goods and service acknowledgment;

the goods and service acknowledgement process component and the supplier invoice processing process component, where the pair-wise interaction between the goods and service acknowledgement process component and the supplier invoice processing process component includes the transmission of:

an invoicing due notification message from the goods and service acknowledgement process component to the supplier invoice processing process component, the invoicing due notification message comprising a notification of invoicing-relevant data regarding delivered materials and services rendered to supplier invoice processing; and the supplier invoice processing process component and the purchasing contract processing process component, where the pair-wise interaction between the supplier invoice processing process component and the purchasing contract processing process component includes the transmission of:

a purchasing contract release notification message from the supplier invoice processing process component to the purchasing contract processing process component, the purchasing contract release notification message comprising a notification regarding posting of a supplier invoice that contains a reference to a particular purchasing contract; and generating, using the at least one processor on the computer system, a computer software application to perform the set of processes based on the obtained design including the specified process components and the specified process component interactions.

20. The method of claim 19, wherein:

the specified process components further include:

a time and labor management process component for managing employees' planned working times, and the recording and valuating of work performed and absence times;

an expense and reimbursement management process component for managing and monitoring of expenses incurred by employees, and the reimbursement of expenses to employees; and an inventory processing process component for managing inventory and recording of inventory changes, and providing services to maintain current stock, content and structure of logistic units and allocations; and the pair-wise interactions between pairs of the process components further include interactions between:

a purchase order processing at customer process component and the sales order processing process component;

the time and labor management process component and the accounting process component;

the project processing process component and the time and labor management process component;

the time and labor management process component and the goods and services acknowledgement process component;

the expense and reimbursement management process component and the project processing process component;

the expense and reimbursement management process component and the accounting process component;

the inventory processing process component and the project processing process component;

the inventory processing process component and the accounting process component;

the due item processing process component and a due item processing at business partner process component;

the payment processing process component and a payment processing at business partner process component;

the payment processing process component and a bank statement creation at bank process component;

the purchase order processing process component and a sales order processing at supplier process component;

the payment processing process component and a payment order processing at house bank process component; and the supplier invoice processing process component and a customer invoice processing at supplier process component.

21. The method of claim 19, wherein each process in the set of processes is a business process transforming a defined business input into a defined business outcome.

22. The method of claim 21, wherein obtaining digital data representing the architectural design further comprises editing the design before using the design.

* * * * *